(12) United States Patent
Kwak et al.

(10) Patent No.: US 10,965,410 B2
(45) Date of Patent: *Mar. 30, 2021

(54) COMMUNICATION METHOD AND APPARATUS IN FULL-DIMENSIONAL MULTIPLE-INPUT MULTIPLE-OUTPUT MOBILE COMMUNICATION SYSTEM

(71) Applicant: Samsung Electronics Co., Ltd, Gyeonggi-do (KR)

(72) Inventors: Youngwoo Kwak, Gyeonggi-do (KR); Younsun Kim, Gyeonggi-do (KR); Jinyoung Oh, Seoul (KR); Hyojin Lee, Gyeonggi-do (KR); Hyoungju Ji, Seoul (KR); Seunghoon Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/106,256

(22) PCT Filed: Dec. 16, 2014

(86) PCT No.: PCT/KR2014/012419
§ 371 (c)(1),
(2) Date: Jun. 17, 2016

(87) PCT Pub. No.: WO2015/093829
PCT Pub. Date: Jun. 25, 2015

(65) Prior Publication Data
US 2016/0308647 A1 Oct. 20, 2016

(30) Foreign Application Priority Data

Dec. 17, 2013 (KR) .................. 10-2013-0157557
May 15, 2014 (KR) .................. 10-2014-0058600

(51) Int. Cl.
*H04L 5/00* (2006.01)
*H04W 72/04* (2009.01)
(Continued)

(52) U.S. Cl.
CPC ......... *H04L 5/0026* (2013.01); *H04B 7/0469* (2013.01); *H04B 7/0486* (2013.01);
(Continued)

(58) Field of Classification Search
CPC ... H04L 5/0026; H04L 5/0027; H04L 5/0048; H04L 5/0053; H04L 5/0023;
(Continued)

(56) References Cited

U.S. PATENT DOCUMENTS 8,774,037 B2 * 7/2014 Kim ................. H04B 7/024
370/252
8,913,682 B2 12/2014 Nam et al.
(Continued)

FOREIGN PATENT DOCUMENTS

EP 2645616 A2 10/2013
EP 2665203 A1 11/2013
(Continued)

OTHER PUBLICATIONS

Extended European Search Report for European Application No. 14871477.7, dated Jun. 21, 2017 (8 pages).
(Continued)

*Primary Examiner* — Hoang-Chuong Q Vu

(57) ABSTRACT

A method for transmitting and receiving channel state information at a terminal of a mobile communication system according to an embodiment of the preset specification comprises the steps of: determining at least one of first precoding information and first rank information corresponding to a first dimension; receiving, from a base station, a reference signal corresponding to a second dimension;
(Continued)

determining at least one of second precoding information and second rank information corresponding to the second dimension, on the basis of the reference signal; and transmitting, to the base station, channel state information which has been determined on the basis of at least one of the first precoding information, the first rank information, the second precoding information and the second rank information. According to an embodiment of the present specification, it is possible to correctly transmit and receive pre-coding information and channel state information at a terminal and a base station including a plurality of antennas, and to reduce an overhead occurring at the time of transmission and reception.

16 Claims, 30 Drawing Sheets

(51) Int. Cl.
  *H04B 7/04* (2017.01)
  *H04B 7/06* (2006.01)
  *H04B 7/0456* (2017.01)
(52) U.S. Cl.
  CPC .......... *H04B 7/063* (2013.01); *H04B 7/0639* (2013.01); *H04L 5/0023* (2013.01); *H04L 5/0048* (2013.01); *H04L 5/0053* (2013.01); *H04L 5/0091* (2013.01); *H04W 72/0413* (2013.01); *H04L 5/0057* (2013.01)
(58) Field of Classification Search
  CPC ... H04L 5/0057; H04B 7/0626; H04B 7/0486; H04B 7/0469; H04B 7/063; H04B 7/0639
  See application file for complete search history.

(56) References Cited

U.S. PATENT DOCUMENTS

| | | | | |
|---|---|---|---|---|
| 9,148,205 B2* | 9/2015 | Bhattad | ................ | H04B 7/0417 |
| 9,197,372 B2* | 11/2015 | Zhu | ................ | H04B 7/024 |
| 9,438,321 B2* | 9/2016 | Novlan | ................ | H04B 7/0417 |
| 9,755,716 B2* | 9/2017 | Prasad | ................ | H04B 7/0469 |
| 9,876,655 B2* | 1/2018 | Lan | ................ | H04L 25/0224 |
| 2008/0268862 A1* | 10/2008 | Kent | ................ | H04B 7/0632 |
| | | | | 455/452.2 |
| 2011/0032839 A1* | 2/2011 | Chen | ................ | H04B 7/024 |
| | | | | 370/252 |
| 2011/0045782 A1* | 2/2011 | Shin | ................ | H04B 7/0417 |
| | | | | 455/67.13 |
| 2011/0142147 A1 | 6/2011 | Chen et al. | | |
| 2011/0149765 A1* | 6/2011 | Gorokhov | ............ | H04L 1/0026 |
| | | | | 370/252 |
| 2012/0076028 A1 | 3/2012 | Ko et al. | | |
| 2012/0320862 A1* | 12/2012 | Ko | ................ | H04B 7/0417 |
| | | | | 370/329 |
| 2013/0022021 A1* | 1/2013 | Wild | ................ | H04B 7/0632 |
| | | | | 370/330 |
| 2013/0028225 A1* | 1/2013 | Ko | ................ | H04B 7/0486 |
| | | | | 370/329 |
| 2013/0039202 A1* | 2/2013 | Feuersanger | ........... | H04L 5/001 |
| | | | | 370/252 |
| 2013/0044624 A1* | 2/2013 | Su | ................ | H04L 1/0026 |
| | | | | 370/252 |
| 2013/0083735 A1* | 4/2013 | Nogami | ................ | H04W 24/02 |
| | | | | 370/328 |
| 2013/0114656 A1* | 5/2013 | Sayana | ................ | H04B 7/024 |
| | | | | 375/219 |
| 2013/0155897 A1* | 6/2013 | Ihm | ................ | H04B 7/024 |
| | | | | 370/252 |
| 2013/0258964 A1* | 10/2013 | Nam | ................ | H04W 72/046 |
| | | | | 370/329 |
| 2013/0265899 A1 | 10/2013 | Sayana et al. | | |
| 2013/0286884 A1* | 10/2013 | Li | ................ | H04B 7/0417 |
| | | | | 370/252 |
| 2013/0308715 A1* | 11/2013 | Nam | ................ | H04B 7/0469 |
| | | | | 375/267 |
| 2013/0322376 A1* | 12/2013 | Marinier | ............. | H04B 7/0617 |
| | | | | 370/329 |
| 2013/0343216 A1* | 12/2013 | Su | ................ | H04L 1/0026 |
| | | | | 370/252 |
| 2014/0098689 A1* | 4/2014 | Lee | ................ | H04B 7/0639 |
| | | | | 370/252 |
| 2014/0153427 A1* | 6/2014 | Seo | ................ | H04L 25/0226 |
| | | | | 370/252 |
| 2014/0169300 A1* | 6/2014 | Kim | ................ | H04L 5/0057 |
| | | | | 370/329 |
| 2014/0177744 A1* | 6/2014 | Krishnamurthy | .... | H04B 7/0469 |
| | | | | 375/267 |
| 2014/0192762 A1* | 7/2014 | Li | ................ | H04L 25/03929 |
| | | | | 370/329 |
| 2014/0205031 A1* | 7/2014 | Nammi | ................ | H04B 7/0413 |
| | | | | 375/267 |
| 2014/0362938 A1* | 12/2014 | Krishnamurthy | .... | H04B 7/0456 |
| | | | | 375/267 |
| 2015/0043673 A1 | 2/2015 | Lee et al. | | |
| 2015/0049702 A1* | 2/2015 | Cheng | ................ | H04B 7/024 |
| | | | | 370/329 |
| 2015/0109949 A1* | 4/2015 | Xia | ................ | H04B 7/063 |
| | | | | 370/252 |
| 2015/0172024 A1* | 6/2015 | Kim | ................ | H04B 7/024 |
| | | | | 370/329 |
| 2015/0195071 A1* | 7/2015 | Lunttila | ................ | H04L 5/0053 |
| | | | | 370/329 |
| 2015/0222347 A1* | 8/2015 | Xia | ................ | H04B 7/024 |
| | | | | 370/329 |
| 2015/0341092 A1* | 11/2015 | Park | ................ | H04B 7/0469 |
| | | | | 370/329 |
| 2015/0358060 A1* | 12/2015 | Park | ................ | H04B 7/0473 |
| | | | | 370/329 |
| 2015/0382223 A1* | 12/2015 | Ko | ................ | H04B 7/0456 |
| | | | | 370/252 |
| 2016/0087701 A1* | 3/2016 | Wu | ................ | H04B 7/0417 |
| | | | | 375/267 |
| 2016/0192229 A1* | 6/2016 | Liu | ................ | H04L 1/0026 |
| | | | | 455/423 |
| 2016/0211904 A1 | 7/2016 | Kim | ................ | H04L 27/34 |
| 2016/0277081 A1* | 9/2016 | Wei | ................ | H04B 7/0639 |
| 2017/0238323 A1* | 8/2017 | Marinier | ............ | H04W 72/06 |
| | | | | 370/329 |

FOREIGN PATENT DOCUMENTS

| | | |
|---|---|---|
| KR | 10-2012-0033283 A | 4/2012 |
| KR | 10-2015-0017793 | 2/2015 |
| WO | WO 2013/024350 A2 | 2/2013 |

OTHER PUBLICATIONS

International Search Report dated Mar. 18, 2015 in connection with International Patent Application No. PCT/KR2014/012419, 5 pages.
Written Opinion of the International Searching Authority dated Mar. 18, 2015 in connection with International Patent Application No. PCT/KR2014/012419, 7 pages.
Office Action dated Nov. 20, 2020 in connection with Korean Patent Application No. 10-2014-0058600, 10 pages.

* cited by examiner

COMMUNICATION METHOD AND APPARATUS IN FULL-DIMENSIONAL MULTIPLE-INPUT MULTIPLE-OUTPUT MOBILE COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2014/012419 filed Dec. 16, 2014, entitled "COMMUNICATION METHOD AND APPARATUS IN FULL-DIMENSIONAL MULTIPLE-INPUT MULTIPLE-OUTPUT MOBILE COMMUNICATION SYSTEM", and, through International Patent Application No. PCT/KR2014/012419, to Korean Patent Application No. 10-2013-0157557 filed Dec. 17, 2013, and to Korean Patent Application No. 10-2014-0058600 filed May 15, 2014, each of which are incorporated herein by reference into the present disclosure as if fully set forth herein.

TECHNICAL FIELD

The present disclosure relates to a wireless mobile communication system, and more particularly, to a method of transmitting and receiving a PMI and channel status information, through which a User Equipment (UE) measures a channel quality (radio channel status) to operate as a Hybrid MIMO system, and report the same to an evolved Node B (eNB) in the wireless mobile communication system to which a multi-access scheme using multiple carriers, such as Orthogonal Frequency Division Multiple Access (OFDMA) or the like, is applied.

BACKGROUND ART

From the early stage of providing voice-oriented services, a mobile communication system has evolved into a high-speed, high-quality wireless packet data communication system to provide data and multimedia services. To this end, various standardization organizations such as 3GPP, 3GPP2, IEEE, and the like have been working on the standardization of the 3rd evolved mobile communication system to which a multi-access scheme that uses multiple carriers is applied. Recently, various mobile communication standards such as Long Term Evolution (LTE) of 3GPP, Ultra Mobile Broadband (UMB) of 3GPP2, 802.16m of IEEE, and the like have been developed to support a high-speed and high-quality wireless packet data communication system based on the multi-access scheme using multiple carriers.

The currently existing 3rd evolved mobile communication system, such as, LTE, UMB, 802.16m, and the like, is based on the multi-carrier multi-access scheme. To improve the transmission efficiency, the system applies Multiple Input Multiple Output (MIMO (multiple antennas)), and uses various technologies, such as beam-forming, Adaptive Modulation and Coding (AMC), channel sensitive scheduling, and the like. The various technologies may enhance the transmission efficiency and improve the system throughput through a method of concentrating a transmission power that is transmitted from multiple antennas or adjusting an amount of transmitted data based on a channel quality or the like, and selectively transmitting data to a user having a good channel quality, or the like. Most of those schemes are operated based on channel status information of a channel between an eNB (or Base Station (BS)) and a UE (or a Mobile Station (MS)) and thus, the eNB or the UE may need to measure a channel status between the eNB and the UE. In this instance, Channel status indication reference signal (CSI-RS) is used. Then eNB mentioned above refers to a downlink transmission and uplink reception device located at a predetermined place, and one eNB can perform transmission or reception for multiple cells. In a single mobile communication system, a plurality of eNBs are geographically distributed and each eNB performs transmission and reception for a plurality of cells.

The existing 3rd and 4th mobile communication system, such as, LTE, LTE-A, or the like, utilizes the MIMO technology that executes transmission using a plurality of transmitting and receiving antennas to improve the data transmission rate and the system throughput. Generally, the number of information streams to which spatial multiplexing is to be applied may vary based on the number of antennas included in a transmitter and a receiver. Generally, the number of information streams to which spatial multiplexing can be applied is referred to as a rank of a corresponding transmission. In the case of the MIMO technology supported in the standards up to LTE/LTE-A Release 11, spatial multiplexing with respect to the case in which the number of transmission antennas and the number of reception antennas are respectively 8, is supported, and a rank is supported up to 8. In contrast, the FD-MIMO system, which has been evolved from the existing LTE/LTE-A MIMO technology, may use 32 or more transmission antennas, which are more than 8 transmission antennas. Such an FD-MIMO system as described above requires a method and an apparatus for transferring the channel state.

DESCRIPTION OF THE INVENTION

Technical Problem

Embodiments of the present disclosure are to provide a method and an apparatus for measuring a reference signal, generating channel state information, and transmitting channel state information by a UE for a hybrid MIMO of a new concept having advantages of both an open-loop MIMO and a closed-loop MIMO in an FD-MIMO transmission and reception. Further, embodiments of the present disclosure are to provide a method and an apparatus for, by an eNB, transmitting a reference signal to a UE and receiving channel state information transmitted by the UE.

Solution to Problem

A method for transmitting and receiving channel state information by a UE of a mobile communication system according to an embodiment of the present disclosure includes: determining at least one of first precoding information and first rank information corresponding to a first dimension; receiving a reference signal corresponding to a second dimension from an evolved Node B (eNB); determining at least one of second precoding information and second rank information corresponding to the second dimension, on the basis of the reference signal; and transmitting, to the eNB, channel state information which has been determined on the basis of the at least one of the first precoding information, the first rank information, the second precoding information, and the second rank information.

A method for transmitting and receiving channel state information by an eNB of a mobile communication system according to another embodiment of the present disclosure includes: identifying at least one of first precoding information and first rank information corresponding to a first dimension; transmitting, to a UE, a reference signal corresponding to a second dimension; and receiving, from the UE, channel state information which has been determined on the basis of at least one of the first precoding information, the first rank information, second precoding information, and second rank information, wherein at least one of the second precoding information and the second rank information corresponding to the second dimension is determined on the basis of the reference signal.

A UE for transmitting and receiving channel state information in a mobile communication system according to another embodiment of the present disclosure includes: a transmission/reception unit configured to transmit and receive a signal; and a controller configured to control the transmission/reception unit, determine at least one of first precoding information and first rank information corresponding to a first dimension, receive, from an eNB, a reference signal corresponding to a second dimension, determine at least one of second precoding information and second rank information corresponding to the second dimension, on the basis of the reference signal, and transmit, to the eNB, channel state information which has been determined on the basis of at least one of the first precoding information, the first rank information, the second precoding information, and the second rank information.

An eNB for transmitting and receiving channel state information in a mobile communication system according to another embodiment of the present disclosure includes: a transmission/reception unit configured to transmit and receive a signal; and a controller configured to control the transmission/reception unit, identify at least one of first precoding information and first rank information corresponding to a first dimension, transmit, to a UE, a reference signal corresponding to a second dimension, and receive, from the UE, channel state information which has been determined on the basis of at least one of the first precoding information, the first rank information, second precoding information, and second rank information, wherein at least one of the second precoding information and the second rank information corresponding to the second dimension is determined on the basis of the reference signal.

Advantageous Effects of Invention

Embodiments of the present disclosure enable exact transmission and reception of precoding information and channel state information by a UE or an eNB including a plurality of antennas and can reduce the overhead generated during the transmission or reception.

MODE FOR THE INVENTION

Figure 1:
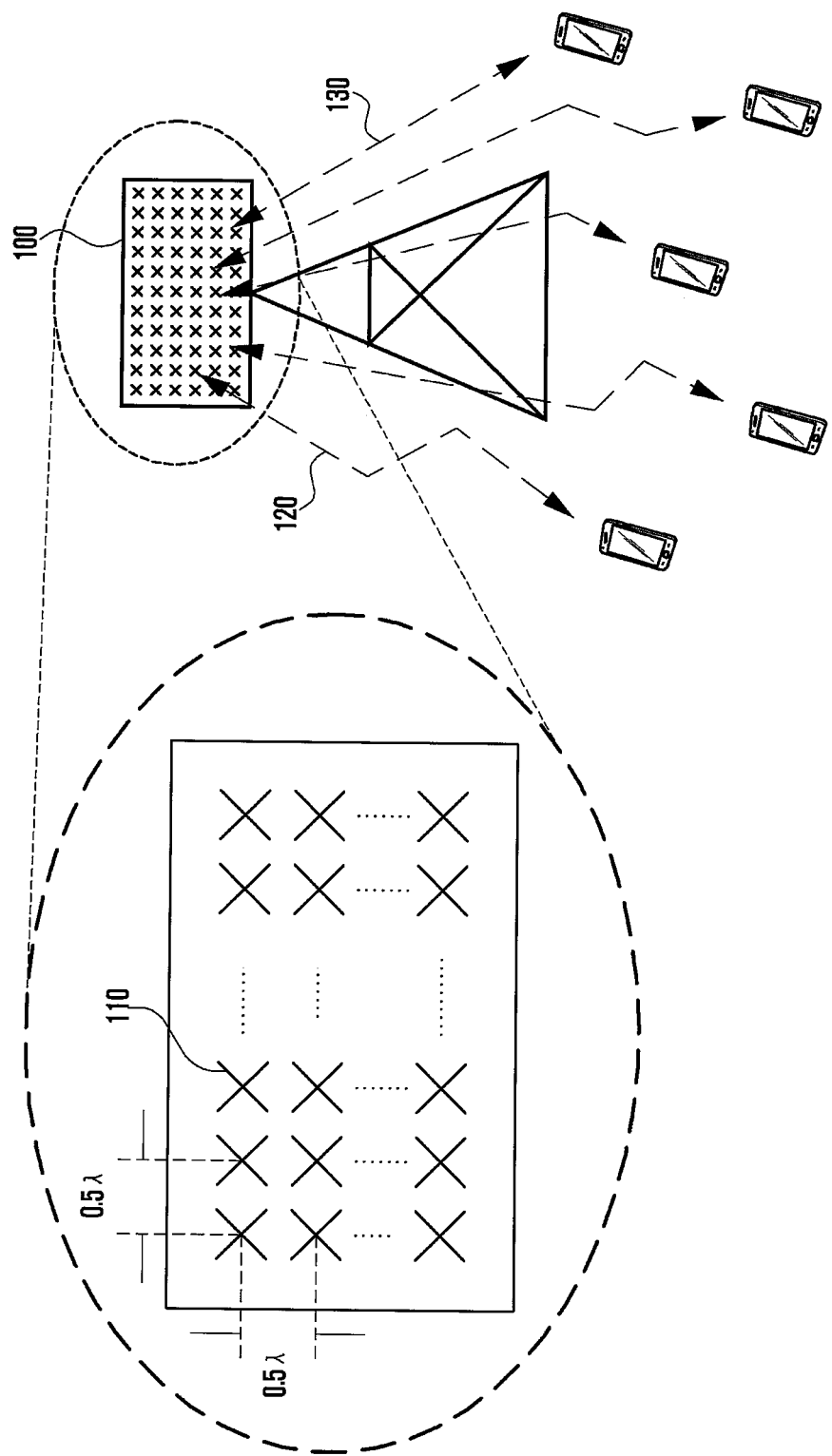
FIG. 1 illustrates an FD-MIMO system according to an embodiment of the present disclosure.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

Hereinafter, an embodiment of the present disclosure will be described in detail with reference to the accompanying drawings. Further, in describing embodiments of the present disclosure, a detailed description of known functions or configurations incorporated herein will be omitted when it may make the subject matter of the present disclosure unnecessarily unclear. The terms which will be described below are terms defined in consideration of the functions in the present disclosure, and may be different according to users, intentions of the users, or customs. Therefore, the definitions of the terms should be made based on the contents throughout the specification.

Further, the detailed description of embodiments of the present disclosure is mainly directed to an OFDM-based communication system, particularly 3GPP EUTRA standard, but the subject matter of the present disclosure may be applied to other communication systems having similar technical backgrounds and channel types through a slight modification without departing from the scope of embodiments of the present disclosure, which can be determined by those skilled in the art.

A reference signal is a signal that is used for measuring the state of channels between an eNB and users in a wireless mobile communication system, such as a strength or distortion of a channel, a strength of an interference, a Gaussian noise, or the like, so as to help the demodulation and decoding of a received data symbol. Another use of the reference signal is to measure the state of a wireless channel. A receiver may determine the state of a wireless channel between the receiver and a transmitter by measuring the reception strength of a reference signal that is received via the wireless channel after being transmitted from the transmitter at an agreed transmission power. The state of a wireless channel determined as described above may be used to determine the data rate which the receiver will request from the transmitter.

In the recent 3rd evolved wireless mobile communication system standard, such as 3GPP LTE(-A), IEEE 802.16m, or the like, a multi-access scheme using multiple subcarriers, such as OFDM(A) (orthogonal frequency division multiplexing (multi-access)), is employed mostly. In the case of the wireless mobile communication system that uses the multi-access scheme using the multiple subcarriers, the performance of channel estimation and measurement may vary based on the number of time symbols and subcarriers that the reference signal occupies on the time and frequency axes. Furthermore, the performance of channel estimation and measurement may be affected by an amount of power that is allocated to the reference signal. Therefore, as an amount of wireless resources, such as time, frequency, power, or the like, that is allocated to the reference signal becomes larger, the performance of channel estimation and measurement may become higher. Accordingly, the performance of demodulating and decoding a received data symbol may be also improved and the accuracy of a channel state measurement may be increased.

However, in the case of a general mobile communication system, an amount of wireless resources, such as time, frequency, transmission power, or the like, is limited, and thus, when a large amount of wireless resources is allocated to the reference signal, an amount of wireless resources allocable to a data signal may be relatively decreased. For the above reasons, the amount of wireless resources to be allocated to the reference signal may be appropriately determined by taking into consideration the system throughput. Particularly, when Multiple Input Multiple Output (MIMO) is applied, which executes transmission and reception using a plurality of antennas, allocating and measuring a reference signal is a significantly important technical item.

At the time of forming a transmission beam pattern, such a MIMO system may transmit a precoder matrix indicator (PMI) indicating a precoding which optimizes performance of a system, using channel information of the receiver obtained by the reference signal. According to whether the receiver transmits the PMI information, the MIMO system may be divided into a closed-loop MIMO system or an open-loop MIMO system.

In case of the closed-loop MIMO system, a UE identifies channel information using the reference signal and thus identifies a characteristic of a corresponding channel. The closed-loop MIMO system chooses optimal precoding among precoder sets supported by a current wireless channel, by using the channel state, obtains optimal precoding, and transmits the optimal precoding to an eNB through the PMI. In addition, assuming a current wireless channel on an assumption that derived a precoding is used, the closed-loop MIMO system obtains a maximum data transmission rate and feeds back the maximum data transmission rate to the eNB through a channel quality indicator (CQI). The eNB having received the feedback may communicate with the UE using a proper transmission/reception precoding, on the basis of corresponding information.

In case of the open-loop MIMO system, unlike the closed-loop MIMO system, the transmitter and receiver may predetermine and use a precoding used according to time and frequency resources, instead of transferring the PMI information to the transmitter by the receiver. In this case, the receiver receives the reference signal through a corresponding precoding, transfers a quality of the wireless channel to the transmitter, using a result of the reception, through the CQI, like the closed-loop MIMO system. The eNB having received the CQI determines a scheme in which the UE communicates, on the basis of corresponding information.

Generally, the closed-loop MIMO may adaptively utilize channel information. Thus the closed-loop MIMO is known to show greater system performance than the open-loop MIMO. However, this requires additional overhead like a PMI, a loss of performance caused by dynamic interference in which a beam pattern of an interference signal rapidly changes according to time may be occurred in a situation where a moving speed of the UE is very fast or a channel rapidly changes.

Meanwhile, in the case of the open-loop MIMO system, performance efficiency of the system itself is less than the closed-loop MIMO system but the open-loop MIMO system is affected less by dynamic interference and incurs less feedback overhead for such as a PMI.

As stated earlier, since both the closed-loop MIMO and the open-loop MIMO have respective advantages, recent third-generation evolution wireless mobile communication system standards such as 3GPP LTE(-A) or IEEE 802.16m support and enable selective use of the closed-loop MIMO and the open-loop MIMO. However, in a system like full dimension-MIMO (FD-MIMO) having multiple transmission antennas and operating a plurality of reference signals, each of the reference signals can selectively operate the closed-loop MIMO system or the open-loop MIMO system, respectively. In a channel state measurement method using a plurality of reference signals to enable a UE to effectively measure wireless channel state information, a technology and an apparatus using a hybrid MIMO system proposed by embodiments of the present disclosure may use a pre-defined PMI to operate some of a plurality of reference signals in an open-loop MIMO system and may find an optimum PMI and transfer the found PMI to an eNB through an uplink control channel, in order to operate the other reference signals in a closed-loop MIMO system. Also, CQI information indicating a UE-supportable data transmission rate generated on an assumption that precodings of horizontal and vertical directions are applied at the same time by combining a pre-determined PMI corresponding to the open-loop MIMO system and the optimal PMI may also be transferred to the eNB through the uplink control channel.

The FD-MIMO system refers to a wireless communication system that transmits data by utilizing several tens or more transmission antennas.

FIG. 1 illustrates a FD-MIMO system according to an embodiment of the disclosure.

Referring to FIG. 1, a transmission apparatus of an eNB 100 may include dozens or more transmission antennas and transmit a wireless signal using one or more antennas among the transmission antennas. A plurality of transmission antennas are placed to maintain the minimum distance from each other, as in a case of identification number 110. An example of the minimum distance is half of the wavelength of a wireless signal which is transmitted. Generally, when the distance corresponding to half of the wavelength of the wireless signal is maintained between the transmission antennas, a signal transmitted from each transmission antenna may be affected by a wireless channel having a low correlation. For example, if a band of a wireless signal transmitted is 2 GHz, the distance is 7.5 cm, and if the band of a wireless signal transmitted is higher than 2 GHz, the distance may be further shortened.

In FIG. 1, the dozens or more transmission antennas placed in the eNB 100 may be used to transmit a signal to one or a plurality of UEs with at least one between identification numbers 120 and 130. In an embodiment, a proper precoding is applied to the plurality of transmission antennas and thus the plurality of transmission antennas may simultaneously transmit the signal to the plurality of UEs. In this instance, a single UE may receive one or more information streams. Generally, the number of information streams that a single UE may receive may be determined based on the number of reception antennas that the UE contains, as well as the channel state.

To efficiently embody the FD-MIMO system, a UE may need to accurately measure a channel state and the scale of interference, and may need to transmit effective channel state information to an eNB using the measurement. The eNB having received the channel state information may determine a UE to which the eNB will transmit a signal, using the channel state information, in relation to downlink transmission, a data rate at which the eNB will perform the transmission, and a precoding scheme which the eNB will apply. The FD-MIMO system has a large number of transmission antennas, and thus, when the channel state information transmission/reception method of the conventional LTE/LTE-A system is applied, a large amount of control information needs to be transmitted in an uplink, which may cause an uplink overhead.

Time, frequency, and power resources are limited in a mobile communication system. Therefore, when an amount of resources allocated to a reference signal becomes larger, an amount of resources to be allocated to traffic channel (data traffic channel) transmission becomes smaller, and thus, an absolute amount of data transmitted may be reduced. Likewise, when an amount of resources allocated to a reference signal becomes larger, performance of channel measurement and estimation is improved, but entire system capacity performance may be degraded since the absolute amount of data transmitted is reduced. Accordingly, to draw an optimized performance from the perspective of the system throughput, resources for the reference signal and resources for the signal used for the traffic channel transmission need to be appropriately distributed.

Figure 2:
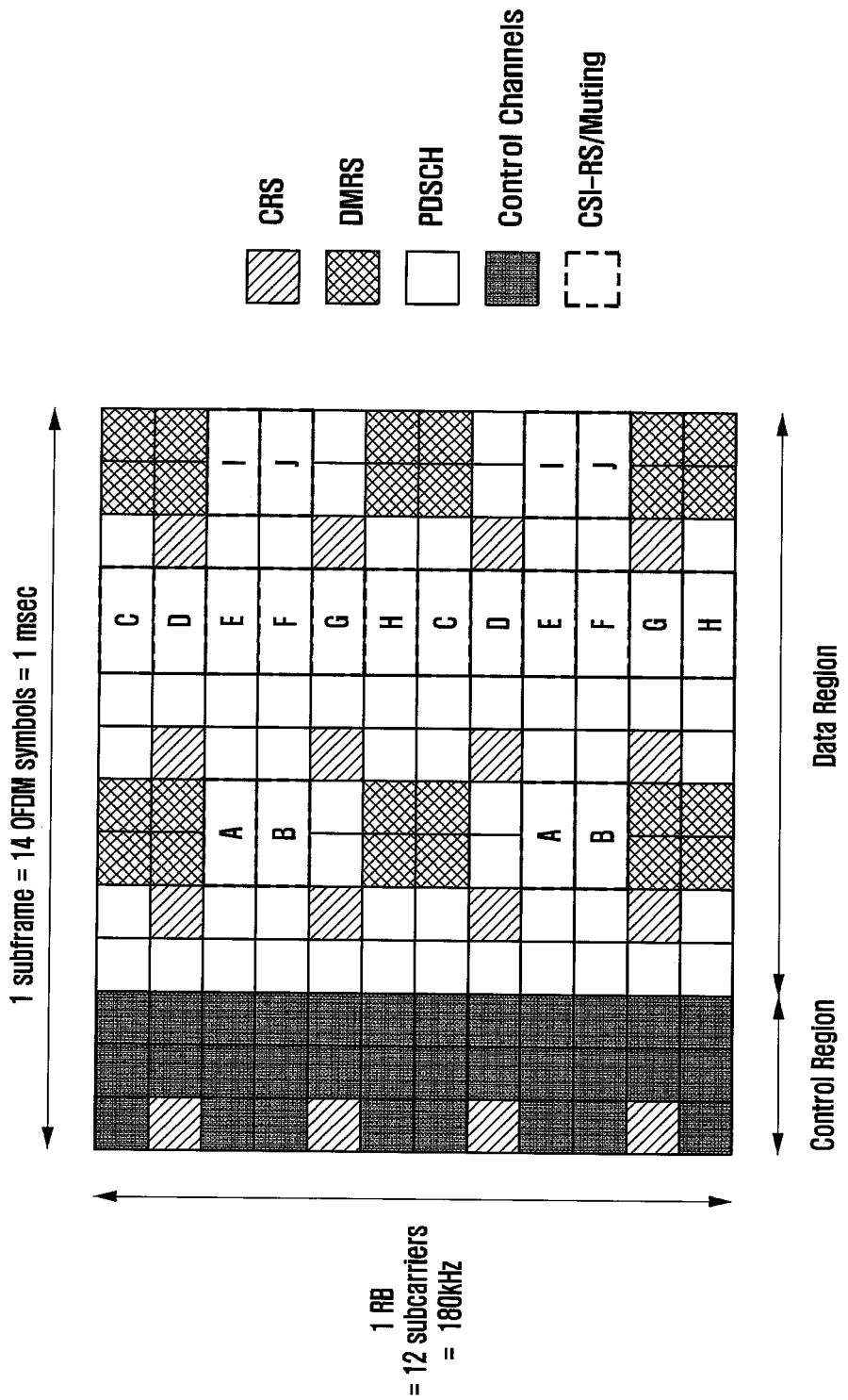
FIG. 2 illustrates a wireless resource of one subframe and one resource block (RB) in an LTE/LTE-A system.

FIG. 2 illustrates a wireless resource of one subframe and one resource block (RB) in an LTE/LTE-A system.
Referring to FIG. 2, a wireless resource includes one subframe on a time axis and one RB on a frequency axis. The wireless resource is formed of 12 subcarriers in the frequency domain, and 14 OFDM symbols in the time domain, and thus, may have a total of 168 unique frequency and time locations. In LTE/LTE-A, each unique frequency and time location of FIG. 2 is referred to as a resource element (RE).

Through the wireless resource of FIG. 2, a plurality of different types of signals may be transmitted as follows.

1. Cell specific Reference Signal (CRS): The CRS is a reference signal periodically transmitted for all UEs included in one cell, and may be used by a plurality of UEs in common.

2. DeModulation Reference Signal (DMRS): The DMRS is a reference signal transmitted for a specific UE, and is transmitted only when data is transmitted to a corresponding UE. The DMRS is formed of a total of 8 DMRS ports. In LTE/LTE-A, ports from port 7 to port 14 correspond to DMRS ports and ports maintain orthogonality in order to prevent generation of interference between them by using CDM or FDM.

3. Physical Downlink Shared Channel (PDSCH): The PDSCH is a data channel transmitted to the downlink, may be used to transmit traffic to a UE by the eNB, and may be transmitted using a RE in which a reference signal is not transmitted in a data region of FIG. 2.

4. Channel State Information Reference Signal (CSI-RS): a reference signal which is transmitted to UEs belonging to one cell is used to measure a channel state. A plurality of CSI-RSs may be transmitted in a single cell.

5. Other control channels (PHICH, PCFICH, and PDCCH): control channels for provision of control information necessary for reception of a PDSCH by a UE or for transmission of an ACK/NACK for operation of HARQ with respect to uplink data transmission.

In addition to the signal, the LTE-A system may configure muting so that UEs in a cell may receive a CSI-RS that is transmitted from another eNB without interference. Muting may be applied to a location where the CSI-RS may be transmitted, and generally, the UE may skip the corresponding wireless resources and receive a traffic signal. In the LTE-A system, muting is also referred to as zero-power CSI-RS. It is applied to the location of the CSI-RS due to the characteristic of muting, since transmission power is not transmitted.

In FIG. 2, a CSI-RS may be transmitted using some of the locations expressed as A, B, C, D, E, E, F, G, H, I, and J, based on the number of antennas that transmit a CSI-RS. Also, muting may be applied to some of the locations expressed as A, B, C, D, E, E, F, G, H, I, and J. Particularly, a CSI-RS may be transmitted through 2, 4, and 8 REs, based on the number of antenna ports that execute transmission. When the number of antenna ports is 2, a CSI-RS is transmitted through half of a predetermined pattern in FIG. 2. When the number of antenna ports is 4, a CSI-RS is transmitted through the whole of a predetermined pattern. When the number of antennas is 8, a CSI-RS is transmitted using two patterns. Conversely, muting is always executed based on a single pattern. That is, muting may be applied to a plurality of patterns but may not be applied to some of a single pattern when the location does not overlap a CSI-RS. However, when the location of muting and the location of a CSI-RS overlap, muting may be applied to some of a single pattern.

When a CSI-RS is transmitted for two antenna ports, the CSI-RS transmits a signal of each antenna port in two REs connected in a time axis, and the signal of each antenna port is classified as an orthogonal code. In the case when a CSI-RS is transmitted with respect to four antenna ports, two more REs are used in addition to the CSI-RS for two antenna ports and the signals for the two antenna ports are additionally transmitted in the same manner. In the same manner, the transmission of a CSI-RS associated with 8 antenna ports may be executed.

A reference signal may be transmitted to measure a downlink channel state in a cellular system. In the case of the LTE-A system of the 3GPP, a UE measures a channel state between an eNB and the UE using a Channel State Information Reference Signal (CSI-RS) transmitted by the eNB. In an embodiment, in the measurement of the channel state, several elements should be basically considered and the elements may include an interference amount in a downlink. The amount of interference in a downlink may include an interference signal generated by an antenna that belongs to a neighboring eNB, a thermal noise, and the like, which is important when a UE determines the channel state of the downlink. For example, when an eNB having a single transmission antenna executes transmission with respect to a UE having a single reception antenna, the UE may determine Es/Io by determining, from a reference signal received from the eNB, energy per symbol that may be received in the downlink and an amount of interference that is to be simultaneously received in the section where the corresponding symbol is received. The determined Es/Io may be converted into a data transmission speed or a value equivalent thereto, and may be reported to the eNB in the form of a CQI, so that the eNB may determine a data transmission speed to be used when the eNB executes downlink transmission with respect to the UE.

In the case of the LTE-A system, the UE feeds back information associated with a channel state of a downlink to the eNB so that the eNB utilizes the same for downlink scheduling. That is, the UE measures a reference signal that the eNB transmits, and feeds back, to the eNB, information extracted from the measured reference signal in a form defined in the LTE/LTE-A standard. In LTE/LTE-A, information that the UE feeds back briefly includes the following three types of information.

1 Rank Indicator (RI): the number in which a UE may receive spatial layers in a current channel state.

1 Precoder Matrix Indicator (PMI): an indicator to which a UE prefers in a current channel state.

1 Channel Quality Indicator (CQI): a maximum data transmission rate in which a UE may receive data in a current channel state. The CQI may be replaced with an SINR, the maximum error correction code rate, a modulation scheme, data rate per frequency, and the like, which may be utilized to be similar with the maximum data rate.

The RI, PMI, and CQI are interrelated. For example, a precoding matrix supported in LTE/LTE-A may be defined to be different for each rank. Therefore, a PMI value X when an RI is 1 and a PMI value X when an RI is 2 may be interpreted to be different. Also, when a UE determines a CQI, the UE assumes that a PMI and X that the UE reports to an eNB are applied in the eNB. That is, reporting RI_X, PMI_Y, and CQI_Z to the eNB may be identical to reporting that a data transmission rate corresponding to CQI_Z is received when a rank is RI_X and precoding is PMI_Y. As described above, when the UE calculates a CQI, the UE assumes a transmission scheme to be executed with respect to the eNB so that the UE may obtain the optimal performance when the UE actually executes transmission using the corresponding transmission scheme.

Generally, when a large number of transmission antennas are used, such as FD-MIMO, a corresponding CSI-RS needs to be transmitted. For example, when LTE/LTE-A uses 8 transmission antennas, an eNB transmits a CSI-RS corresponding to 8-ports to a UE, so that the UE measures a downlink channel state. In this instance, when the eNB transmits a CSI-RS corresponding to 8 ports, the eNB may use wireless resources including 8 REs in a single RB, as shown in A and B of FIG. 2. When the CSI-RS transmission scheme of the LTE/LTE-A is applied to FD-MIMO, as many wireless resources as the number of transmission antennas may need to be assigned to the CSI-RS. That is, when 128 transmission antennas are used, the eNB may transmit a CSI-RS using a total of 128 REs in a single RB. Such a CSI-RS transmission scheme requires excessive wireless resources, and thus has disadvantages of reducing wireless resources required for transmitting and receiving wireless data.

The eNB having many transmission antennas, such as FD-MIMO, transmits CSI-RS with the following method.

CSI-RS transmission method 1: A method of allocating and transmitting wireless resources as much as the number of antennas to a CSI-RS.

CSI-RS transmission method 2: A method of dividing a CSI-RS into a plurality of dimensions and transmitting a divided CSI-RS.

CSI-RS transmission method 3: A method of dividing a CSI-RS into a plurality of dimensions, applying precoding to each of CSI-RSs, and transmitting a precoded RS.

The CSI-RS transmission method 1 is a method of allocating as many CSI-RS resources as the number of antennas belonging to a corresponding eNB and identifying of channel state between the eNB and a UE. The method has an advantage of accurately identifying information corresponding to all antennas, but as the number of antennas increases, the amount of resources required to be allocated also increase. In addition, as noted from FIG. 2, since CSI-RS resources are limited, if the number of antennas increases, resources for transmitting a CSI-RS proportionately increase and then overhead according to the increase may be increased.

Figure 3A:
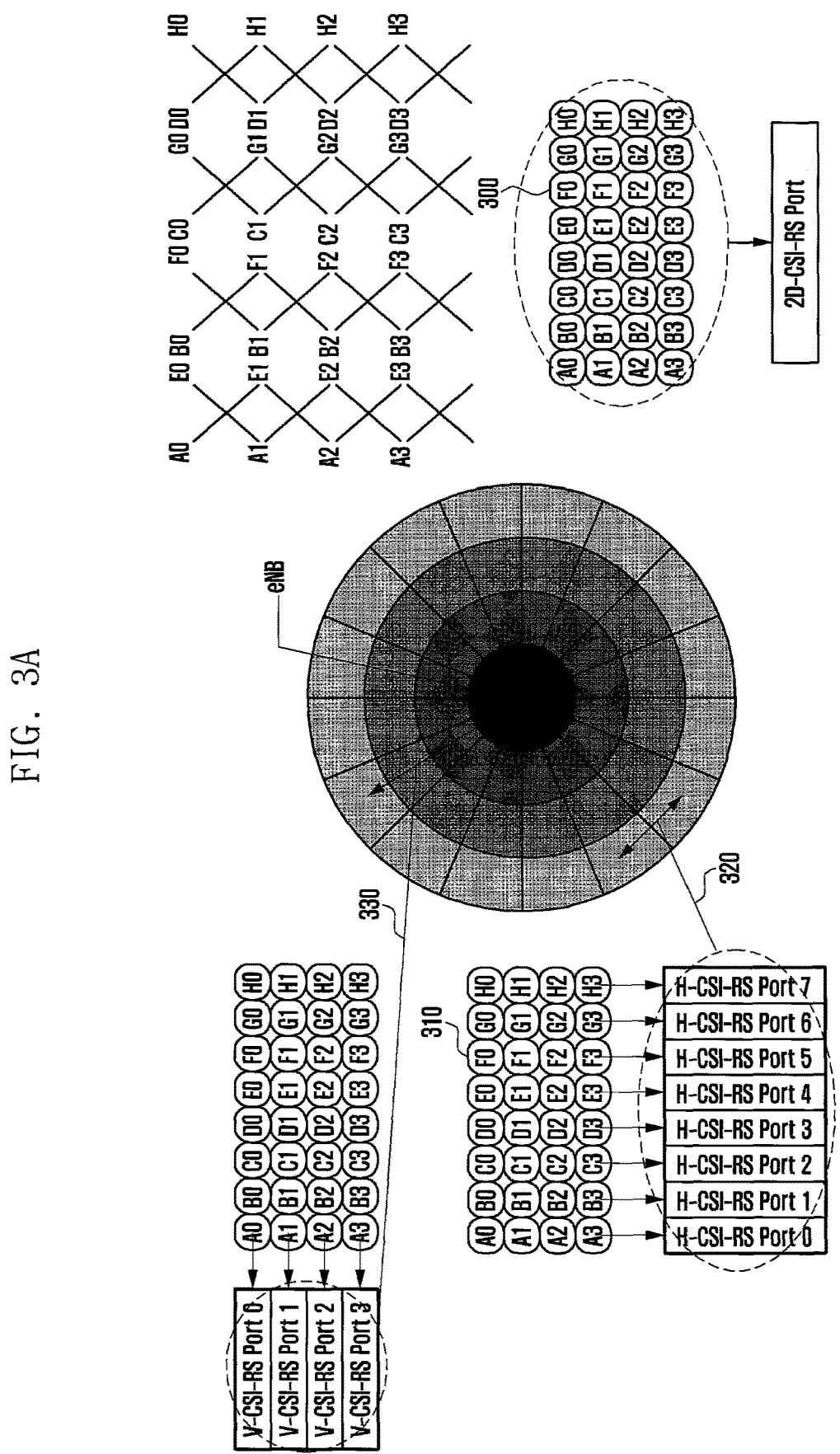
FIGS. 3A and 3B illustrate a method of transmitting a CSI-RS according to an embodiment.

FIG. 3A illustrates an eNB which transmits a CSI-RS to a UE by using a CSI-RS transmission method 2.

Referring to FIG. 3A, an eNB operating FD-MIMO according to a CSI-RS transmission method 2 may be composed of 32 antennas in total. 16 antennas among them (A0, . . . , A3, B0, . . . , B3, C0, . . . , C3, D0, . . . , D3) are arranged at a first angle with respect to a positive direction of an X axis, the remaining 16 antennas (E0, . . . , E3, F0, . . . , F3, G0, . . . , G3, H0, . . . , H3) may be arranged at a second angle with respect to the positive direction of an X axis. In an embodiment, the first angle may be 35° to 55° more specifically, it may be 45°. In an embodiment, the second angle may be −35° to −55° more specifically, it may be −45°.

An antenna shape in which N/2 antennas and the remaining N/2 antennas among N number of antennas are arranged at 90° to each other in the same position is referred to as XPOL. The XPOL may be used to obtain a large antenna gain by placing multiple antennas in a small area.

32 antennas of identification number 300 in FIG. 3A are shown as A0, . . . , A3, B0, . . . , B3, C0, . . . , C3, D0, . . . , D3, E0, . . . , E3, F0, . . . , F3, G0, . . . , G3, H0, . . . , H3, respectively. The 32 antennas of FIG. 3A may transmit two kinds of CSI-RSs.

First, H-CSI-RS enabling measurement of the horizontal channel state may include the following 8 antenna ports.

H-CSI-RS port 0: which includes a transmission signal of an antenna A3.

H-CSI-RS port 1: which includes a transmission signal of an antenna B3.

H-CSI-RS port 2: which includes a transmission signal of an antenna C3.

H-CSI-RS port 3: which includes a transmission signal of an antenna D3.

H-CSI-RS port 4: which includes a transmission signal of an antenna E3.

H-CSI-RS port 5: which includes a transmission signal of an antenna F3.

H-CSI-RS port 6: which includes a transmission signal of an antenna G3.

H-CSI-RS port 7: which includes a transmission signal of an antenna H3.

As described above, generating a single CSI-RS port by aggregating a plurality of antennas indicates antenna virtualization, which is generally executed through linear coupling of a plurality of antennas.

In addition, V-CSI-RS enabling measurement of the vertical channel state may include the following 4 antenna ports.

V-CSI-RS port 0: which includes a transmission signal of the antenna A0.

V-CSI-RS port 1: which includes a transmission signal of the antenna A1.

V-CSI-RS port 2: which includes a transmission signal of the antenna A2.

V-CSI-RS port 3: which includes a transmission signal of the antenna A3.

When a plurality of antennas are arranged in two dimensions in M×N (vertical direction×horizontal direction), a channel of FD-MIMO may be measured by using N number of CSI-RS ports in the horizontal direction and M number of CSI-RS ports in the vertical direction. That is, when two kinds of CSI-RSs are used, channel state information may be identified by utilizing M+N number of CSI-RS ports, for M×N number of transmission antennas. Likewise, identifying information on a larger number of transmission antennas using a fewer number of CSI-RS ports has an advantage of reducing CSI-RS overhead.

When transmitting a CSI-RS by using a CSI-RS transmission method 2 as described above, overhead for transmitting the CSI-RS and reporting channel state information is reduced, compared a CSI-RS with CSI-RS transmission method 1. However, exact channel information for an antenna in which the CSI-RS is not transmitted cannot be identified, estimation may be required with a method such as a Kronecker product to be described later.

Figure 3B:
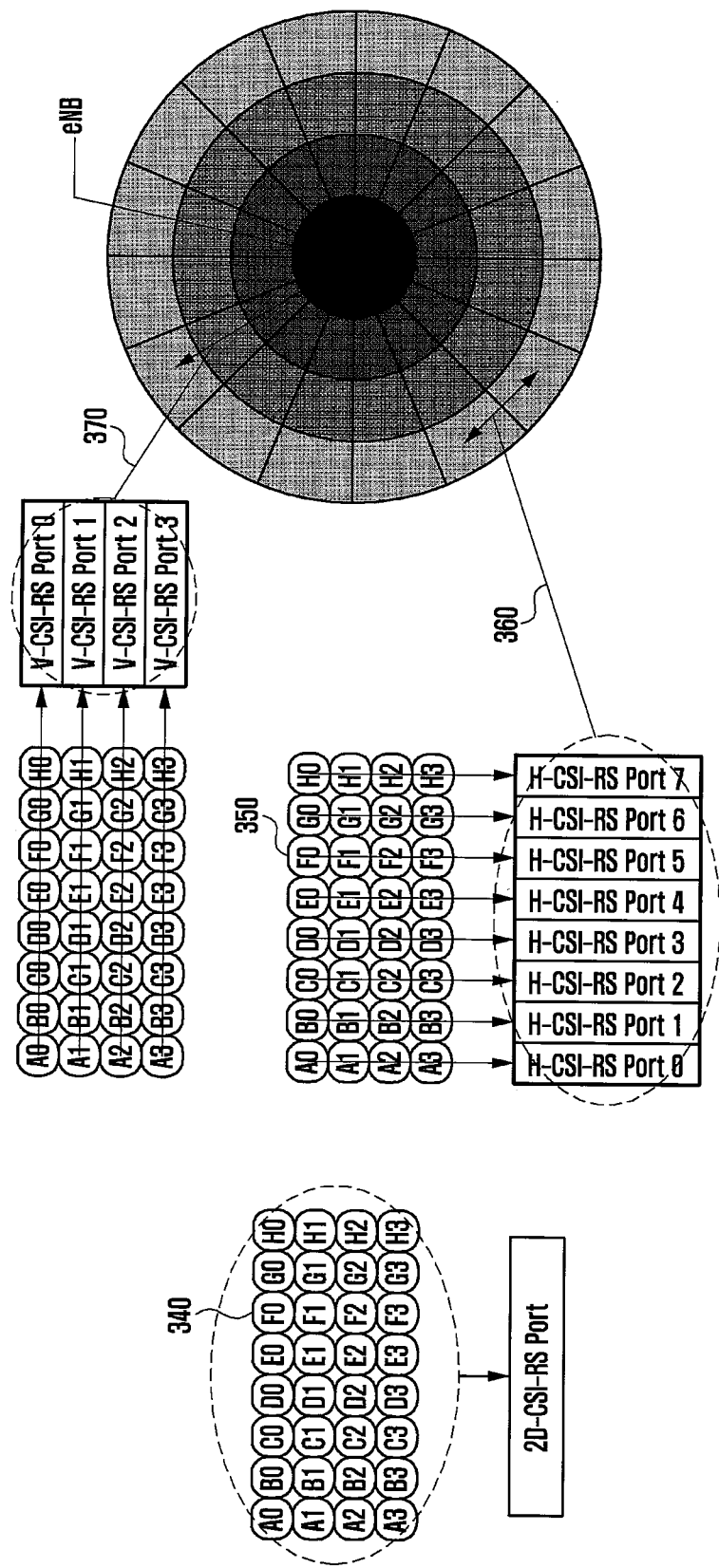

FIG. 3B illustrates an eNB, which transmits a CSI-RS to a UE by using a CSI-RS transmission method 3.

The 32 antennas in identification number 340 are transmitted as a single two-dimensional (2D) CSI-RS, and the 2D CSI-RS that enables measuring the channel state of all antennas in the horizontal and vertical directions may be formed of 32 antenna ports shown in the above. A transmission employing a sequence determined through a cell ID and the like to each of antenna ports corresponds to CSI-RS transmission method 1, and a precoding may be applied to a sequence of transmission method 1 in transmission. The method may allocate a wireless resource for each antenna so that the accuracy of channel information may increase. However, a relatively larger amount of wireless resources is used for control information or data, and thus, it is not efficient from the perspective of resource efficiency, which is a drawback.

Identification numbers 350 and 360 in FIG. 3B are a method for enabling channel measurement with respect to a plurality of transmission antennas by a UE while allocating relatively fewer wireless resources, even though identification numbers 350 and 360 may have relatively low accuracy of channel information using a CSI-RS transmission 3. As a CSI-RS transmission method 2 described above, there is a method for dividing a CSI-RS corresponding to an entire antenna port into N number of dimensions and transmitting a divided CSI-RS, for example, when a transmission antenna of an eNB is arranged in two dimensions as shown in FIG. 1, the method divides the CSI-RS into two dimensions and transmits the divided CSI-RS. In this instance, one CSI-RS is operated as a Horizontal CSI-RS that enables measuring channel information in the horizontal direction, and the other CSI-RS is operated as a Vertical CSI-RS that enables measuring channel information in the vertical direction. However, it is different from the CSI-RS transmission method 2 in that, if only one signal corresponding to one antenna port is included in one CSI-RS in a case of the CSI-RS transmission method 2, signals corresponding to a plurality of antenna ports are included in one CSI-RS in a case of a CSI-RS transmission method 3. If a relationship among the plurality of antenna ports is combined by a horizontal or vertical precoding corresponding to an antenna and then is transmitted through one CSI-RS transmission resource, a UE may identify information on the plurality of antennas of a corresponding CSI-RS at once. In this instance, an H-CSI-RS that enables measuring of the channel state in the horizontal direction may be formed of 8 antenna ports as follows.

H-CSI-RS port 0: which is formed by combining A0, A1, A2, and A3 antennas.

H-CSI-RS port 1: which is formed by combining B0, B1, B2, and B3 antennas.

H-CSI-RS port 2: which is formed by combining C0, C1, C2, and C3 antennas.

H-CSI-RS port 3: which is formed by combining D0, D1, D2, and D3 antennas.

H-CSI-RS port 4: which is formed by combining E0, E1, E2, and E3 antennas.

H-CSI-RS port 5: which is formed by combining F0, F1, F2, and F3 antennas.

H-CSI-RS port 6: which is formed by combining G0, G1, G2, and G3 antennas.

H-CSI-RS port 7: which is formed by combining H0, H1, H2, and H3 antennas.

Generating a single CSI-RS port by aggregating a plurality of antennas indicates antenna virtualization, which is generally executed through linear coupling of a plurality of antennas. Also, a V-CSI-RS that enables measuring the channel state in the vertical direction may be formed of 4 antenna ports as follows.

V-CSI-RS port 0: which is formed by combining A0, B0, C0, D0, E0, F0, G0, and H0 antennas.

V-CSI-RS port 1: which is formed by combining A1, B1, C1, D0, E1, F1, G1, and H1 antennas.

V-CSI-RS port 2: which is formed by combining A2, B2, C2, D2, E2, F2, G2, and H2 antennas.

V-CSI-RS port 3: which is formed by combining A3, B3, C3, D3, E3, F3, G3, and H3 antennas.

When a plurality of antennas are arranged in two dimensions in M×N (vertical direction×horizontal direction), a channel of FD-MIMO may be measured by using N number of CSI-RS ports in horizontal direction and M number of CSI-RS ports in vertical direction. That is, when two CSI-RSs are used, channel state information may be recognized using M+N CSI-RS ports, for M×N transmission antennas. Likewise, identifying information on a larger number of transmission antennas using a fewer number of CSI-RS ports may reduce CSI-RS overhead. Precoding for combining a plurality of antennas into a single CSI-RS port may be a sequence which is determined through a cell ID, CSI-RS RNTI, a symbol index, a subframe index, or a frame index. In FIGS. 3A and 3B, the 32 transmission antennas are allocated to 8 H-CSI-RS ports and 4 V-CSI-RS ports for transmission, so as to cause a UE to measure a wireless channel of a FD-MIMO system. An H-CSI-RS enables the UE to measure information on a horizontal angle between the UE and a transmission antenna of an eNB as identification numbers 320 and 360. On the other hand, a V-CSI-RS enables the UE to measure information on a vertical angle between the UE and the transmission antenna of the eNB as identification numbers 330 and 370.

The following abbreviations may be used to explain an embodiment of the present disclosure.

$RI_H$: a rank indicator in which a UE reports a rank of a channel obtained by applying a vertical precoding to 2D-CSI-RS or a channel obtained by measuring a horizontal CSI-RS (H-CSI-RS) to an eNB.

$RI_V$: a rank indicator in which a UE notifies of a rank of a channel obtained by applying a horizontal precoding to 2D-CSI-RS or a channel obtained by measuring a vertical CSI-RS (V-CSI-RS) to an eNB.

$PMI_H$: a precoding matrix indicator in which a UE reports to an eNB by obtaining an optimal precoding based on a channel obtained by applying a horizontal precoding to a 2D-CSI-RS or a channel obtained by measuring a horizontal CSI-RS (H-CSI-RS).

$PMI_V$: a precoding matrix indicator that a UE reports to an eNB by obtaining an optimal precoding based on a channel obtained by applying a horizontal precoding to a 2D-CSI-RS or a channel obtained by measuring a vertical CSI-RS (V-CSI-RS).

$CQI_H$: a transmission rate of UE-supportable data generated on an assumption that only a horizontal precoding is applied.

$CQI_V$: a transmission rate of UE-supportable data generated on an assumption that only a vertical precoding is applied.

$CQI_{HV}$: a transmission rate of UE-supportable data generated on an assumption that horizontal and vertical precodings are applied at the same time.

The horizontal channel state information and vertical channel state information described in an embodiment of the present disclosure may be described using general terms, such as channel state information 1 and channel state information 2, in another embodiment.

On the basis of a transmitted 2D-CSI-RS or a plurality of CSI-RSs as shown in FIG. 3, a UE may notify of a wireless channel of the FD-MIMO system to an eNB by transmitting a RI, PMI, and CQI to the eNB.

Figure 4:
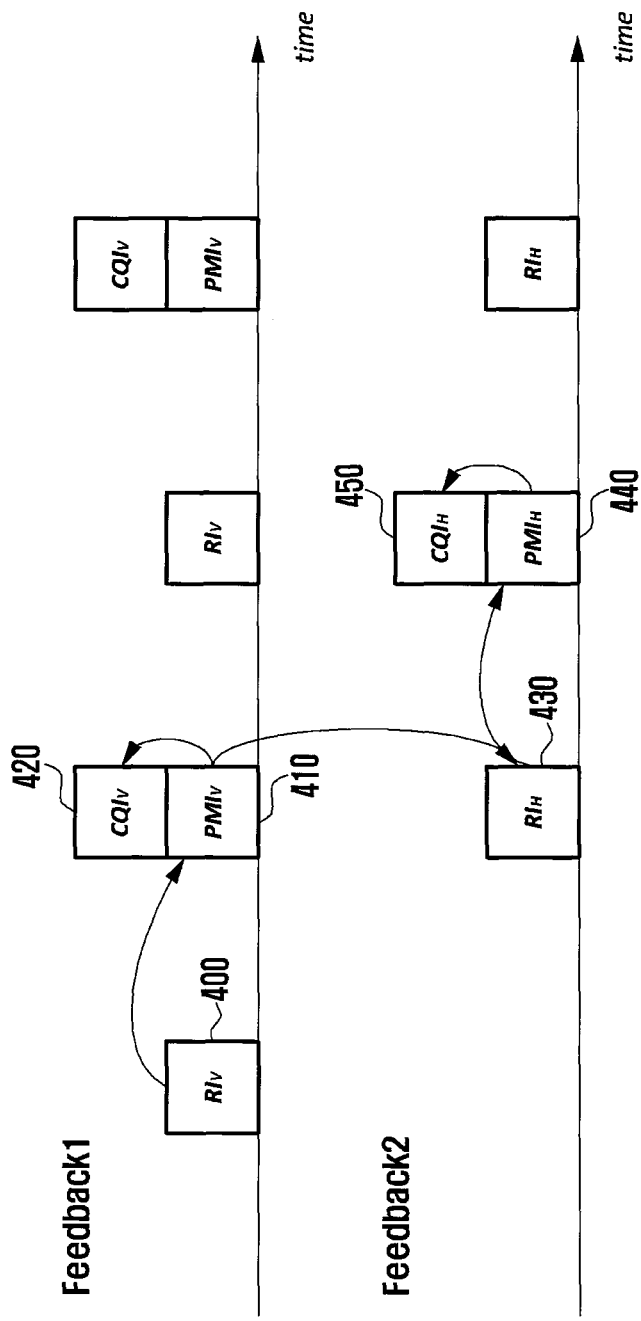
FIG. 4 illustrates a UE which transmits RI, PMI, and CQI for a 2D-CSI-RS.

FIG. 4 illustrates a UE, which transmits RI, PMI, and CQI for a 2D-CSI-RS.

Referring to FIG. 4, an arrow in the figure indicates how one kind of channel state information is associated with interpreting another kind of channel state information.

That is, terminating the arrow started from an $RI_V$ 400 at a $PMI_V$ 410 means that an interpretation of $PMI_V$ is dependent on a value of the $RI_V$ 400.

In FIG. 4, a UE measures a 2D-CSI-RS and then transmits channel state information such as feedback 1 to an eNB. In addition, the UE obtains channel information corresponding to horizontality by using information on an obtained optimal vertical precoding, obtains a rank such as an $RI_H$ 430, obtains an optimal precoding $PMI_H$ 440 corresponding to a horizontal direction, and then transmits channel state information such as feedback 2 including a $CQI_H$ 450 to the eNB.

In an embodiment, at least two among a RI, a PMI, and a CQI are associated with each other and transmitted. That is, in a case of feedback 1, an $RI_V$ 400 indicates a precoding matrix of a rank which is designated by a $PMI_V$ 410 to be transmitted later. In addition, when an eNB transmits a signal to a UE using the rank indicated by the $RI_V$ 400, if a precoding matrix of a corresponding rank designated by the $PMI_V$ 410 is applied to the signal transmission, a $CQI_V$ 420 may include a data transmission speed which can be received by the UE or corresponding information.

In an embodiment, in a case of feedback 2 also, at least two among RI, PMI, and CQI are associated with each other and transmitted as is in feedback 1.

Figure 5:
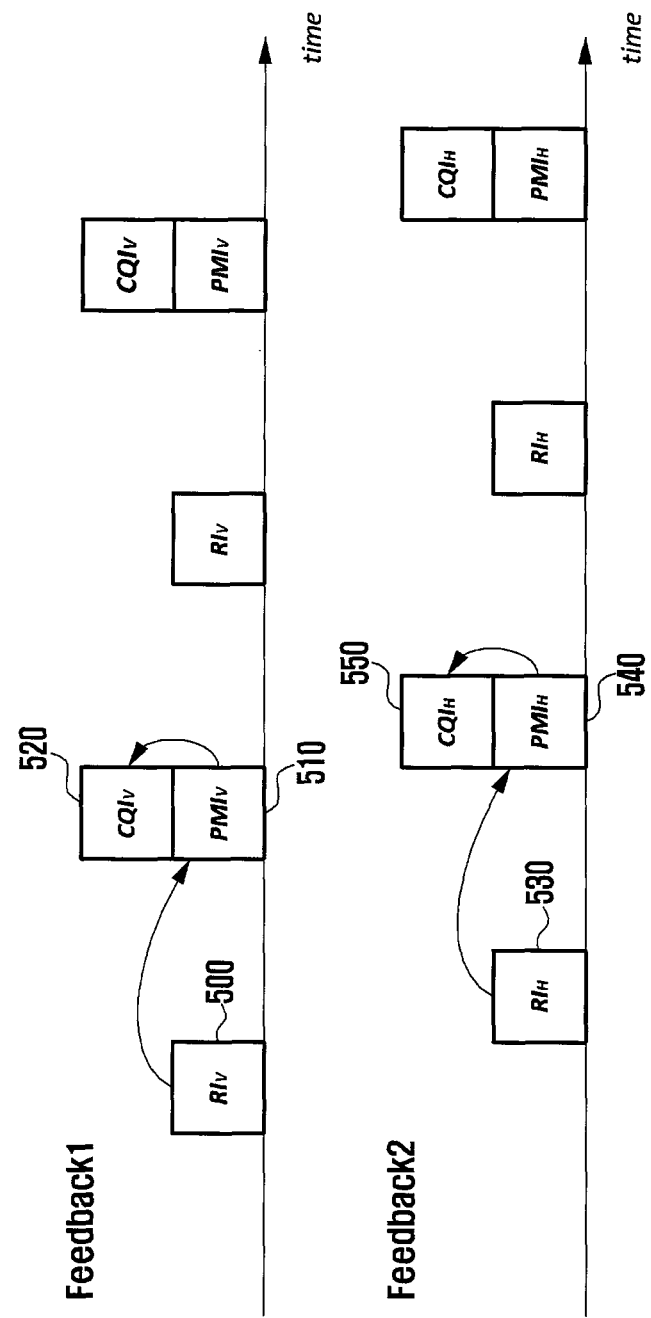
FIG. 5 illustrates a UE, which transmits a RI, PMI, and CQI with respect to a plurality of CSI-RSs.

FIG. 5 illustrates a UE, which transmits a RI, PMI, and CQI with respect to a plurality of CSI-RSs.

Referring to FIG. 5, a UE measures a V-CSI-RS and then transmits channel state information such as feedback 1 to an eNB. In addition, the UE measures an H-CSI-RS and transmits channel state information such as feedback 2 to the eNB.

In an embodiment, a RI, a PMI, and a CQI may be associated with each other and transmitted. That is, in a case of feedback 1, an $RI_V$ 500 indicates a precoding matrix of a rank which is indicated by a $PMI_V$ 510 to be transmitted later. In addition, when an eNB transmits a signal to a UE using the rank designated by the $RI_V$ 500, if a precoding matrix of a corresponding rank designated by the $PMI_V$ 510 is applied, a $CQI_V$ 520 may include data transmission speed which can be received by the UE or corresponding information.

In a case of feedback 2 also, RI, PMI, and CQI are associated with each other and transmitted as is in feedback 1.

The method of configuring, for a plurality of transmission antennas of a FD-MIMO eNB, a 2D-CSI-RS or a plurality of feedbacks to cause a UE to report channel state information to an eNB as shown in FIG. 4 and FIG. 5 may be one channel state information report method for FD-MIMO. In this method, additional implementation is not necessary for generating and reporting channel state information for FD-MIMO by a UE. Meanwhile, when using a channel state information report method as shown in FIG. 4, performance of the FD-MIMO system is not sufficiently obtained. The reason why performance of the FD-MIMO system is not sufficiently obtained is that, as shown in FIG. 4, only the method of configuring a 2D-CSI-RS or a plurality of feedbacks to cause a UE to report channel state information to eNB is insufficient to cause a UE to report a CQI based on an assumption of precoding in the case of applying FD-MIMO.

In the FD-MIMO system, when a plurality of transmission antennas are arranged in two dimensions as shown in FIG. 3, precoding of both the vertical and horizontal directions is applied to a signal transmitted to a UE. That is, the UE does not receives a signal to which one of precodings corresponding to $PMI_H$, and $PMI_V$ is applied but receives a signal to which the precodings corresponding to $PMI_H$, and $PMI_V$ are applied at the same time.

As shown in FIG. 4 and FIG. 5, when only a $CQI_H$ and $CQI_V$ to which the precodings corresponding to $PMI_H$ and $PMI_V$ are separately applied are reported to an eNB, the eNB cannot receive a CQI to which precoding of both the vertical and horizontal directions is applied, and thus should autonomously determine the same. If the eNB randomly determines a CQI determination to which both vertical and horizontal precodings are applied, on the basis of CQIs to which vertical and horizontal precodings are respectively applied, such a determination may degrade the system performance.

A definition for how to determine a CQI to which a plurality of precodings is applied is necessary. When calculating a CQI to which only one precoding is applied, the UE calculates the CQI on an assumption that a precoding which is indicated by RI and PMI notified of by the UE itself is applied to a downlink. However, in a case of the $CQI_{HV}$, the UE may calculate the CQI on an assumption that two precodings are applied to the downlink at the same time. At this time, the UE may interpret that two precodings are applied at the same time in various methods, and a Kronecker product may be one of such interpretation methods. The Kronecker product is defined with respect to two matrices as follows.

$$A \otimes B = \begin{bmatrix} a_{11}B & \cdots & a_{1n}B \\ \vdots & \ddots & \vdots \\ a_{m1}B & \cdots & a_{mn}B \end{bmatrix} \quad \text{[Equation 1]}$$

In the equation 1, A and B are replaced by a precoding matrix to which $PMI_H$ and $PMI_V$ are indicated, respectively, such that a precoding to which two precodings are applied at the same time can be obtained. When the UE calculates CQI$_{HV}$ 550, the UE calculates a CQI by assuming that a precoding obtained by applying the equation to a precoding matrix indicated by PMI$_H$ and PMI$_V$ is applied to a downlink.

In order to obtain a precoding to which two precodings are applied at that same time, by using the Kronecker product in the equation 1, a UE and an eNB need different operations, depending on the rank reported by the UE.

A MIMO system may be divided into a closed-loop MIMO system and an open-loop MIMO system, according to whether PMI information of a receiver is used, when forming a transmission beam pattern.

In a case of the closed-loop MIMO system, the UE identifies information of a channel by using a CSI-RS, obtains a rank of a corresponding channel based on the identified information, notifies of the rank to an eNB through an RI. In addition, the UE may select an optimal precoding among a precoder set corresponding to a determined rank and transfer a PMI corresponding to a selected precoding to the eNB. In addition, the UE feeds back a transmission rate which can be supported by the UE to the eNB through a CQI, on the basis of a current channel obtained by assuming that the optimal precoding is applied. The eNB having received the feedback, on the basis of corresponding information, designates the UE to use proper transmission/reception precoding for communication.

On the contrary, in a case of the open-loop MIMO system, unlike the closed-loop MIMO system, a receiver does not transfer PMI information to a transmitter. Instead, when the receiver of the open-loop MIMO system generates a CQI according to time and frequency resources, obtains a supportable transmission rate by assuming a pre-determined precoding by a higher signaling or a specified scheme in a standard using a precoding to be assumed with respect to a corresponding time and frequency space, and transfers the transmission rate to the transmitter through the CQI. The transmitter having received the CQI from the receiver, on the basis of corresponding information, determines a scheme in which the UE communicates.

Generally, the closed-loop MIMO may adaptively utilize channel information. Thus the closed-loop MIMO is known to show greater system performance than the open-loop MIMO. This is because, in a case of the closed-loop MIMO, there is a process of selecting and notifying of a precoding which the UE prefers, while, in a case of the open-loop MIMO, since the process is not included, whenever the eNB transmits a precoding to the UE, it is difficult to apply a precoding which the UE prefers. However, in order to transmit and receive a signal through the closed-loop MIMO, an additional overhead of transmitting a PMI to the eNB by the UE is required. In addition, when transmitting and receiving a signal by using the closed-loop MIMO, in a situation in which a moving speed of the UE is very fast or a channel rapidly changes, a beam pattern of an interference signal is rapidly changed according to time and thus a loss of performance, due to a change of the interference signal, may occur. Such interference is referred to as dynamic interference.

Meanwhile, in the case of the open-loop MIMO system, performance efficiency of the system itself is lower than the closed-loop MIMO system but the open-loop MIMO system has low effect of dynamic interference and low feedback overhead for such as a PMI. The feedback overhead for a PMI is especially importantly affected in FD-MIMO in which the number of antennas of the eNB is increased. This is because, the more the transmission antennas of the eNB, the more the number of bits configuring a PMI for notification of preferred precoding by a UE.

An embodiment of the present disclosure may be based on an assumption that a precoding corresponding to the open-loop MIMO are designated together with corresponding rank-related information and the precoding and the information are shared by the eNB and the UE. Accordingly, the UE notifies of an RI with respect to a channel corresponding to the closed-loop MIMO to the eNB through an uplink control signal, and the eNB may identify a rank of a corresponding precoding based on the notification.

As mentioned above, a CSI-RS may be operated in various methods in the FD-MIMO system. The method for operating a CSI-RS includes a method for allocating the CSI-RS to all antennas and enabling the UE to measure a plurality of CSI-RSs capable of effectively measuring a large number of transmission antennas in order to reduce use of wireless resources.

When a 2D-CSI-RS is allocated to all antennas, the 2D-CSI-RS may generate a 1D channel by applying a 1D precoding to a channel having a plurality of dimensions. When enabling the UE to measure a plurality of CSI-RSs, each CSI-RS may be used to measure a channel state with respect to one of the plurality of dimensions for measuring one wireless channel. This requires relatively few wireless resources for CSI-RS transmission, compared with allocating a unique CSI-RS port to each transmission antennas.

For example, it enables the UE to effectively measure a channel state, by operating two CSI-RSs which are vertical and horizontal for a transmission antenna of the FD-MIMO system arranged in a rectangular shape.

An embodiment of the present disclosure proposes a selective operation of each CSI-RS for one or more of the closed-loop MIMO system and the open-loop MIMO system in a system such as FD-MIMO having multiple transmission antennas and operating a 2D-CSI-RS or a plurality of CSI-RSs.

In addition, in a channel state measurement method using a 2D-CSI-RS or a plurality of CSI-RSs to enable a UE to effectively measure wireless channel state information, a technology and an apparatus using a hybrid MIMO system proposed by embodiments of the present disclosure may use a pre-defined PMI to operate a 1D channel derived based on some of 1D channels which are based on a 2D-CSI-RS or a plurality of CSI-RSs in an open-loop MIMO system and may find an optimum PMI and transfer the found PMI to an eNB through an uplink control channel, in order to operate the other CSI-RSs in a closed-loop MIMO system. Also, CQI$_{HV}$ indicating a UE-supportable data transmission rate generated on an assumption that a pre-determined precoding corresponding to the open-loop MIMO system and an optimal precoding corresponding to the closed-loop MIMO system are applied at the same time, may also be transferred to the eNB through the uplink control channel. In the entire present disclosure, such a MIMO transmission/reception method may be referred to as Hybrid MIMO.

In a system such as FD-MIMO operating a 2D-CSI-RS or a plurality of CSI-RSs and supporting a Hybrid MIMO system, an eNB may notify a UE of whether to operate each CSI-RS in the open-loop or the closed-loop, using at least one of the following methods.

Method 1 for defining a CSI-RS operated in an open-loop MIMO system: when the number of CSI-RS port in one dimension is 1, a dimension corresponding to a corresponding CSI-RS (vertical or horizontal) is operated in an open-loop. The number of ports of a CSI-RS may be changed according to an embodiment, but if the number of specific CSI-RSs is a pre-determined value, a feedback method in a dimension corresponding to a corresponding CSI-RS may be determined Method 2 for defining a CSI-RS operated in an open-loop MIMO system: when PMI/RI reporting has not been configured in a corresponding CSI-RS, a dimension corresponding to the corresponding CSI-RS (vertical or horizontal) is operated in an open-loop.

Method 3 for defining a CSI-RS operated in an open-loop MIMO system: whether to operate in an open-loop or a closed-loop in a corresponding CSI-RS is configured using a higher signaling and it operates in an open-loop or a closed-loop according to the configuration.

In a case of method 2 for defining a CSI-RS operated in an open-loop MIMO system, a mode of operating without transmitting a PMI and an RI may be set by an eNB in transmission modes 8, 9, and 10 in Rel. 10 LTE system, and when using the mode, each of dimensions may be configured to effectively operate in an open-loop system or a closed-loop system.

As mentioned above, in a communication system using a Hybrid MIMO system, a UE feeds back only an RI and a CQI for a precoding in a state of operating for an open-loop MIMO system. A method of defining precoding operating in the open-loop MIMO system may include at least one method of the following methods.

Method 1 for defining precoding operated in an open-loop MIMO system: which defines one precoding according to time and frequency resources.

Method 2 for defining precoding operated in an open-loop MIMO system: which defines a plurality of precodings as a set according to time and frequency resources.

Basically, the methods 1 and 2 for defining precoding operated in an open-loop MIMO system are the same for operating by transmitting a $CQI_{HV}$ indicating a UE-supportable data transmission rate generated on an assumption that precodings operated in the closed-loop MIMO and the open-loop MIMO system are applied at the same time. However, a procedure for determining open-loop precoding used in a $CQI_{HV}$ may be changed, according to a method for deriving an optimal precoding applied to a UE-supportable data transmission $CQI_{HV}$ and a PMI has transferred a precoding in which an eNB operate in the closed-loop MIMO transmitted by a UE. In an embodiment, when performing an operation according to method 1 for defining precoding operated in an open-loop MIMO system, precoding may be defined according to time and frequency resources as follows.

Method 1 for defining one precoding according to a resource: which allocates precoding corresponding to a $PMI_H$ to an open-loop MIMO and defines the precoding corresponding to a $PMI_H$ according to time and frequency resources.

Method 2 for defining one precoding according to a resource: which allocates precoding corresponding to a $PMI_V$ to an open-loop MIMO and defines the precoding corresponding to a $PMI_V$ according to time and frequency resources.

Figure 6:
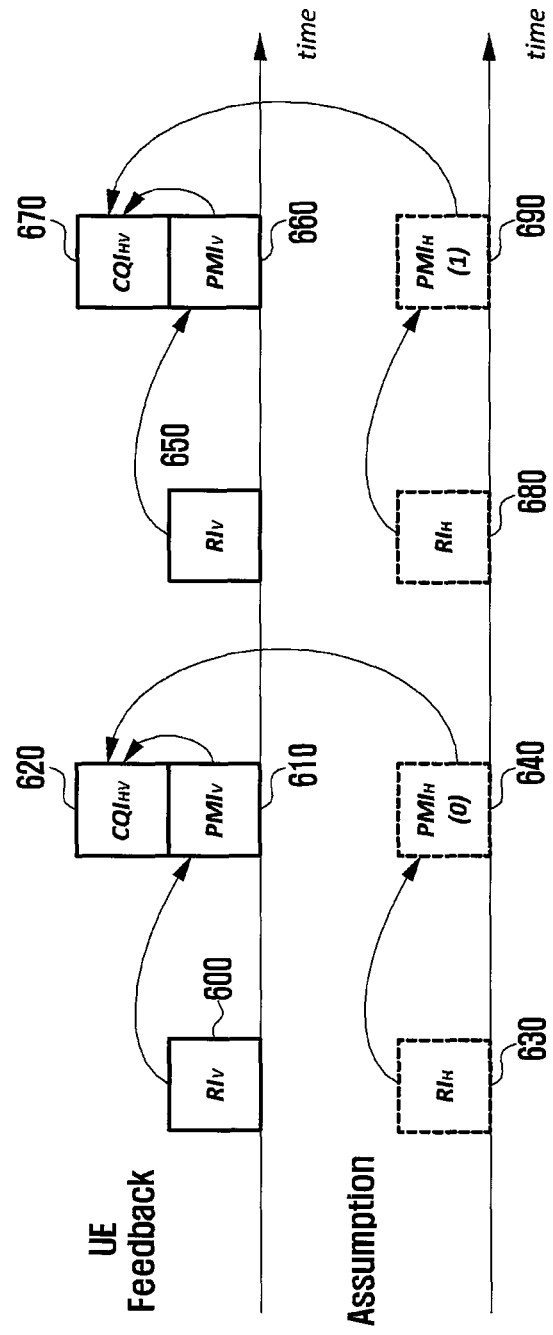
FIG. 6 illustrates precoding corresponding to a $PMI_H$ according to an embodiment, which is allocated to an open-loop MIMO and is defined according to time and frequency resources.

FIG. 6 illustrates precoding corresponding to a $PMI_H$ according to an embodiment, which is allocated to an open-loop MIMO and is defined according to time and frequency resources. More specifically, according to method 1 for defining one precoding according to a resource, when precoding corresponding to a $PMI_H$ 640, 690 used in time and frequency resources is defined based on an open-loop MIMO system assumption, a UE obtains an optimal precoding on the assumption of, accordingly, transmitting a $PMI_V$ 610, 660 corresponding to a closed-loop MIMO system assumption and a $CQI_{HV}$ 620, 670 which is a maximum data transmission rate of a composite channel to an eNB is illustrated.

In FIG. 6, a UE feedback refers to information included in a signal transmitted to an eNB by a UE, and the assumption refers to information, which is not transmitted to an eNB by a UE and is recognized by both the eNB and the UE through definitions made in advance.

In FIG. 6, the UE assumes that the UE receives a 2D-CSI-RS or two CSI-RSs (a V-CSI-RS and an H-CSI-RS). The 2D-CSI-RS is a CSI-RS for transmitting by allocating a wireless resource to all antennas, and the V-CSI-RS and the H-CSI-RS are CSI-RSs transmitted to provide other information with respect to a two dimensional antenna arrangement constituting FD-MIMO. A technology proposed by an embodiment of the present disclosure may include a process in which a UE generates channel state information for a two dimensional antenna arrangement using a 2D-CSI-RS or a plurality of CSI-RSs and notifies of the channel state information to an eNB.

In an embodiment, a UE generates vertical channel state information 600, 610, 620, etc. and notifies of the vertical channel state information to an eNB. However, the UE may not separately generate horizontal channel state information and may not notify of the horizontal channel state information to the eNB.

The UE may not separately generate horizontal channel state information. In an embodiment, the UE may determine the horizontal channel state information on the basis of information notified through higher signaling to the UE by the eNB or a rule promised between the eNB and the UE.

For example, the UE may not generate a horizontal PMI and not notify of the horizontal PMI to the eNB. Instead, the UE may assume that vertical precoding indicated by a $PMI_V$ 610 notified of by the UE to the eNB and precoding 640 pre-configured by the eNB are applied to a horizontal direction, and determine $CQI_{HV}$ 620 based on the assumption.

In an embodiment, the UE obtains a rank of a vertical channel obtained by applying a pre-determined horizontal precoding or a channel obtained by measuring a vertical CSI-RS (V-CSI-RS), and notifies of the obtained rank information to the eNB through an RIV 600.

In an embodiment, it may be assumed that an $RI_H$ 630 which is a rank of a channel for a horizontal CSI-RS (H-CSI-RS) is shared between the eNB and the UE through a higher signaling and pre-defined between the UE and the eNB.

After notification of $RI_V$ 600, in order to determine an optimal precoding, the UE may derive two channel state information and use a combination thereof, based on a 2D-CSI-RS or two CSI-RSs, as shown in FIGS. 4 and 5. The UE transfers an optimal precoding through a $PMI_V$ 610, based on a result derived by combining available precoding corresponding to the $RI_V$ 600, precoding corresponding to an $RI_H$ 630 and a $PMI_H(0)$ 640 pre-defined in the open-loop MIMO system through a channel combined based on a 2D-CSI-RS or a plurality of CSI-RSs. In an embodiment, the eNB may identify a $PMI_H(0)$ on the basis or a received $PMI_V$ 610.

At this time, a $PMI_H(0)$ 640 corresponding to a pre-determined precoding operated in the open-loop MIMO system is not notified of through an uplink control channel. In contrast, in the case of a CQI indicating a maximum data transmission rate, a maximum data transmission rate $CQI_{HV}$ 620 obtained through a channel derived on an assumption of a $PMI_V$ 610 derived through a CSI-RS and a pre-defined $PMI_H(0)$ 640 is notified of to the eNB. In an embodiment, it is illustrated that horizontal precoding assumed by a UE is changed according to a change of a time resource. Thus, a precoding assumed by a UE according to a time resource can be changed and also a precoding assumed by a UE according to a frequency resource can be changed.

The UE notifies the eNB of an RIV 650 for the next time and frequency resources, as for previous time and frequency resources, and assumes that an $RI_H$ 680 is shared through a higher signaling or is pre-defined between the UE and the eNB, as for previous time and frequency resources. The UE transfers an optimal precoding through a $PMI_V$ 660, on the basis of a result derived by combining a precoding corresponding to a pre-defined $RI_H$ 680 and $PMI_H$ (1) 690 and available precodings corresponding to the $RI_V$ 650.

At this time, the UE does not notify of a $PMI_H$ (1) 690 corresponding to precoding pre-defined for the next time and frequency resources through an uplink control channel, as identification number 630, but notifies of a maximum data transmission rate $CQI_{HV}$ 670 obtained through a channel derived on an assumption of a $PMI_V$ 660 derived through a CSI-RS and a pre-defined $PMI_H$ (1) 690 to the eNB.

Figure 7:
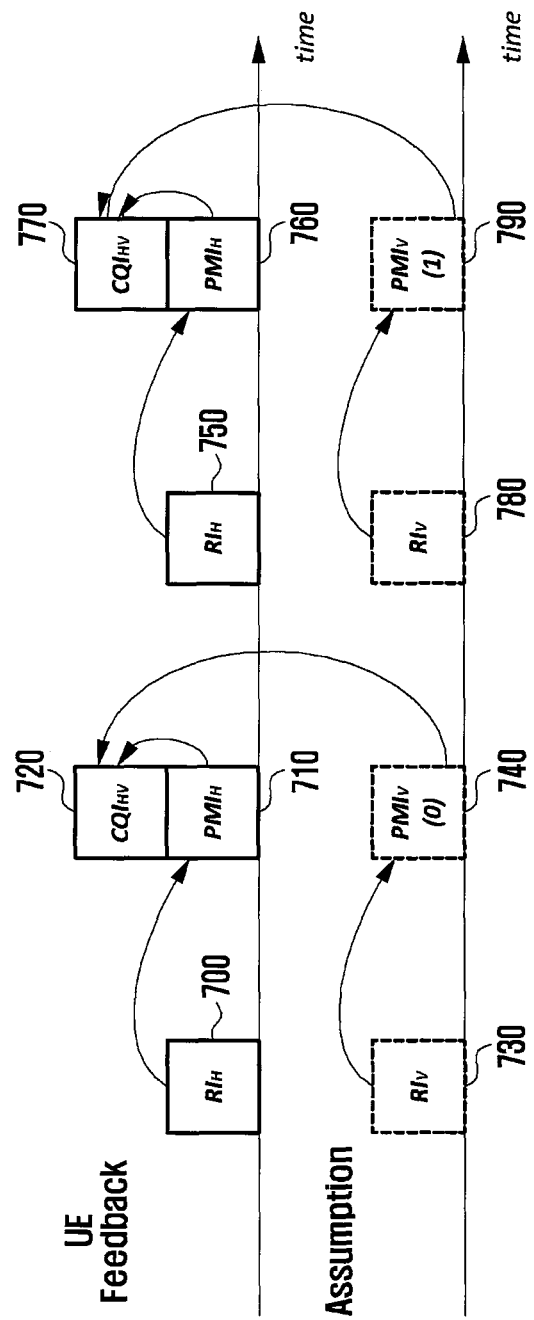
FIG. 7 illustrates precoding corresponding to $PMI_H$ according to an embodiment, which is allocated to an open-loop MIMO and is defined according to time and frequency resources.

FIG. 7 illustrates precoding corresponding to $PMI_H$ according to an embodiment, which is allocated to an open-loop MIMO and is defined according to time and frequency resources. More specifically, in FIG. 7, according to method 2 for defining one precoding according to a resource, when precoding corresponding to a $PMI_H$ 740, 790 used in time and frequency resources is defined based on an open-loop MIMO system assumption, a UE obtains an optimal precoding on the assumption of, accordingly, transmitting a $PMI_V$ 710, 760 corresponding to a closed-loop MIMO system assumption and $CQI_{HV}$ 720, 770 which is a maximum data transmission rate of a composite channel to an eNB is illustrated.

In an embodiment, as shown in FIG. 6, a UE feedback refers to signals transmitted to an eNB by a UE, and the assumption refers to a signal, which is not transmitted to an eNB by a UE and is recognized by both the eNB and the UE through definitions made in advance.

In FIG. 7, contrary to FIG. 6, the UE obtains a rank of a channel obtained by applying a vertical precoding to a 2D-CSI-RS or a channel obtained by measuring a horizontal CSI-RS (H-CSI-RS), and notifies of the obtained rank to the eNB through $RI_H$ 700. It may be assumed that an $RI_V$ 730 which is a rank of a channel with respect to a vertical CSI-RS (V-CSI-RS) is shared between the eNB and the UE through a higher signaling and pre-defined between the UE and the eNB.

After notification of $RI_H$ 700, in order to determine an optimal precoding, the UE may derive two channel state information and use a combination thereof, based on a 2D-CSI-RS or two CSI-RSs, as shown in FIGS. 4 to 6.

The UE transfers an optimal precoding through $PMI_H$ 710, based on a result derived by combining available precoding corresponding to an $RI_H$ 700, precoding corresponding to an $RI_V$ 730 and a $PMI_V(0)$ 740 pre-defined in the open-loop MIMO system through a channel combined based on a 2D-CSI-RS or a plurality of CSI-RSs.

At this time, a $PMI_V(0)$ 740 corresponding to a pre-determined precoding operated in the open-loop MIMO system is not notified of through an uplink control channel. In contrast, in the case of a CQI indicating a maximum data transmission rate, a maximum data transmission rate $CQI_{HV}$ 720 obtained through a channel derived on an assumption of a $PMI_V$ 710 derived through a CSI-RS and a pre-defined $PMI_H(0)$ 740 is notified of to the eNB.

The UE notifies the eNB of an $RI_H$ 750 for the next time and frequency resources, as for previous time and frequency resources, and may assume that an $RI_V$ 780 is shared through a higher signaling or pre-defined between the UE and the eNB, as for previous time and frequency resources. The UE transfers an optimal precoding through a $PMI_H$ 760, on the basis of a result derived by combining a precoding corresponding to a pre-defined $RI_V$ 780 and $PMI_V$ (1) 790 and available precodings corresponding to $PMI_H$ 760.

At this time, the UE does not notify of a $PMI_V(1)$ 790 corresponding to precoding pre-defined for the next time and frequency resources through an uplink control channel, as identification number 730, but notifies of a maximum data transmission rate $CQI_{HV}$ 770 obtained through a channel derived on an assumption of a $PMI_H$ 760 derived through a CSI-RS and a pre-defined $PMI_{HV}(1)$ 790 to the eNB.

When operated according to method 2 for defining precoding operated in an open-loop MIMO system, according to time and frequency resources based on a 2D-CSI-RS or a plurality of CSI-RSs, it may be assumed that a set of a plurality of precodings is defined based on an open-loop MIMO system assumption.

At this time, the UE obtains one optimal precoding set among the pre-defined plurality of precoding sets, assumes PMIs of $\{PMI_H, PMI_V\}$ corresponding to the obtained precoding set, and transmits a PMI and a $CQI_{HV}$ corresponding to a closed-loop MIMO system assumption to the eNB. In method 2 for defining precoding operated in an open-loop MIMO system, the UE selects PMIs corresponding to an optimal precoding set among a plurality of precoding sets pre-defined as the following and transfers one of the PMIs to the eNB. The eNB receives notification of one PMI from the UE and operates in a hybrid MIMO system analogizing precoding corresponding to a whole set from a received PMI and using the precoding.

Method 1 for defining a precoding set according to a resource: to transfer an $RI_V$ and a $PMI_V$ to an eNB.

Method 2 for defining a precoding set according to a resource: to transfer an $RI_H$ and a $PMI_H$ to an eNB.

Figure 8:
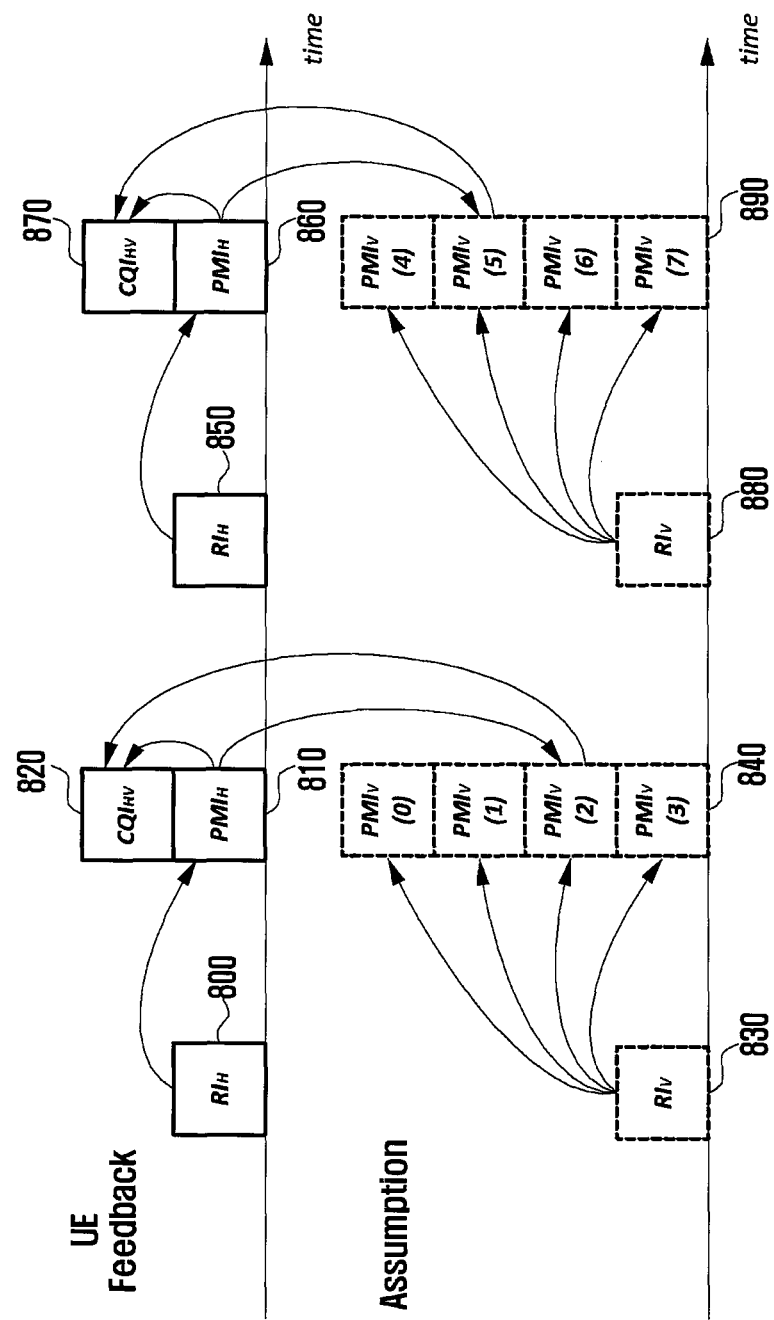
FIG. 8 illustrates a UE, which transfers an $RI_V$ and a $PMI_V$ to an eNB according to method 1 for defining a precoding set according to a resource, according to an embodiment.

FIG. 8 illustrates a UE, which transfers an RIV and a $PMI_V$ to an eNB according to method 1 for defining a precoding set according to a resource, according to an embodiment.

Referring to FIG. 8, a UE feedback refers to signals transmitted to an eNB by a UE, and the assumption refers to a signal, which is not transmitted to an eNB by a UE and is recognized by both the eNB and the UE through definitions made in advance.

In an embodiment, it is assumed that an $RI_V$ 830 which is a rank of a channel with respect to a vertical CSI-RS (V-CSI-RS) is shared through a higher signaling and is pre-defined. As shown in FIG. 6 to FIG. 7, the UE obtains a rank of a channel obtained by measuring a horizontal CSI-RS (H-CSI-RS) or a channel obtained by using a precoding set corresponding to a precoding corresponding to a pre-defined $RI_V$ 830, 880 and notifies of the rank to the eNB through $RI_H$ 800. After notification of $RI_H$ 800, in order to derive a PMI, the UE may derive two channel state information and use a combination thereof, based on a 2D-CSI-RS or two CSI-RSs, as described above.

In an embodiment, the UE derives a precoding set $\{PMI_H, PMI_V(2)\}$ showing an optimal performance, by considering a pre-defined set of precodings corresponding to an $RI_V$ 830 and an $RI_H$ 800 in an open-loop MIMO system, through a channel combined based on a 2D-CSI-RS and or a plurality of CSI-RSs (identification number 840). The UE transfers precoding corresponding to an H-CSI-RS of a derived result to an eNB through a $PMI_H$ 810. In addition, in a case of a CQI indicating a maximum data transmission rate, the UE notifies of a maximum data transmission rate $CQI_{HV}$ 820 obtained through a channel derived by assuming the optimal precoding set $\{PMI_H, PMI_V(2)\}$ determined through a channel state to the eNB.

The eNB may identify a rank of each of precodings through an $RI_H$ 800 transmitted by the UE and a pre-defined $RI_V$ 830, and identify a precoding set $\{PMI_H, PMI_V(2)\}$ corresponding to corresponding time and frequency resources through a received $PMI_H$ 810. The eNB identifies that a received maximum data transmission rate $CQI_{HV}$ 820 is obtained based on an assumption of a precoding set $\{PMI_H, PMI_V(2)\}$, by using the information.

For the next time and frequency resources, also, the UE assumes that an $RI_V$ 880 which is a rank of a channel with respect to a vertical CSI-RS (V-CSI-RS) is shared between the eNB and the UE through a higher signaling, and pre-defined between the UE and the eNB.

After notification of $RI_H$ 880, in order to derive a PMI, the UE may derive two channel state information and use a combination thereof, based on two CSI-RSs, as described above. The UE derives a precoding set $\{PMI_H, PMI_V(5)\}$ 890 showing an optimal performance, by considering a pre-defined set of precodings corresponding to an $RI_V$ 880 and an $RI_H$ 850 in an open-loop MIMO system, through a channel combined based on a plurality of CSI-RSs. The UE transfers precoding corresponding to an H-CSI-RS of a derived result to an eNB through a $PMI_H$ 860.

In a case of a CQI indicating a maximum data transmission rate, the UE notifies of a maximum data transmission rate $CQI_{HV}$ 870 obtained through a channel derived by assuming the optimal precoding set $\{PMI_H, PMI_V(5)\}$ determined through a channel state to the eNB.

The eNB may identify a rank of each of precodings through an $RI_H$ 850 transmitted by the UE and a pre-defined $RI_V$ 880, and identify a precoding set $\{PMI_H, PMI_V(5)\}$ corresponding to corresponding time and frequency resources through a received $PMI_H$ 860. The eNB identifies that a received maximum data transmission rate $CQI_{HV}$ 880 is formed by assuming a precoding set $\{PMI_H, PMI_V(5)\}$, by using the information.

Figure 9:
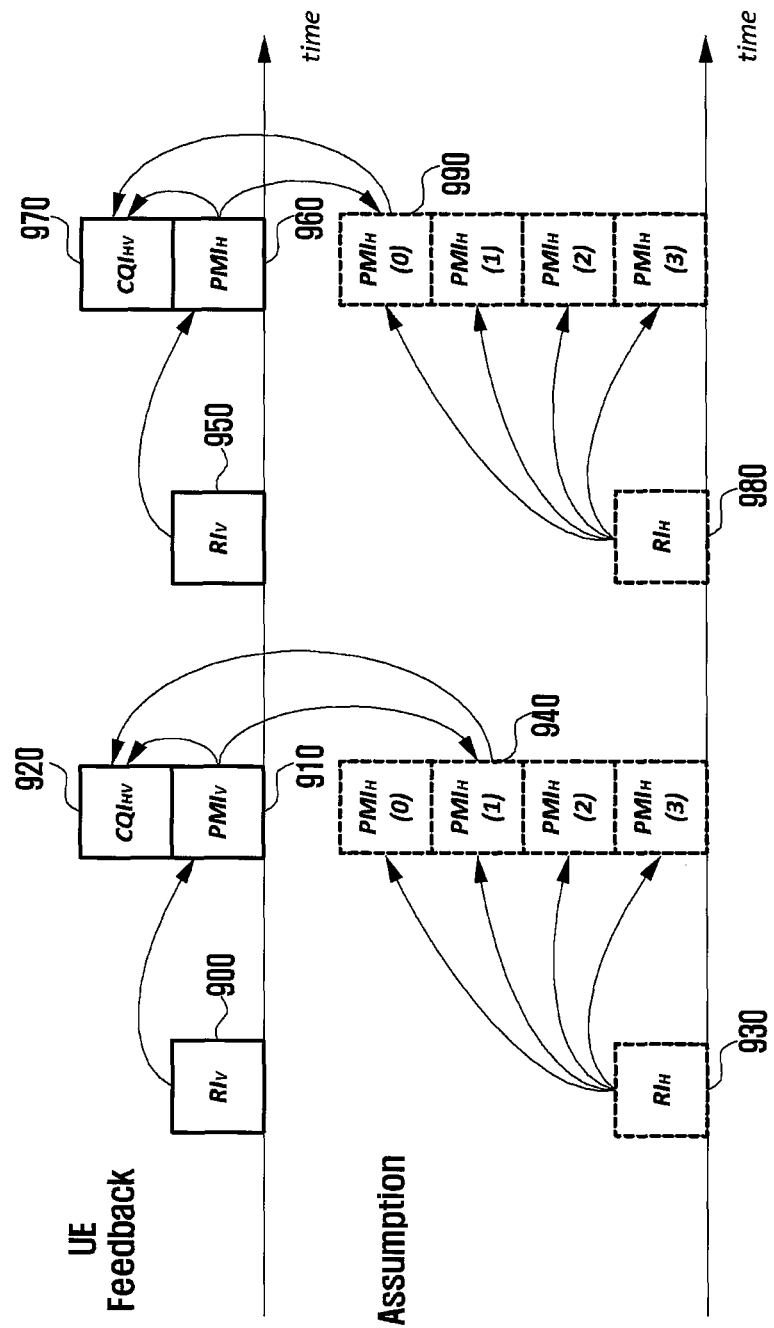
FIG. 9 illustrates a UE, which transfers an RIV and a $PMI_V$ to an eNB, using method 2 for defining a precoding set according to a resource depending on an embodiment.

FIG. 9 illustrates a UE, which transfers an RIV and a $PMI_V$ to an eNB, using method 2 for defining a precoding set according to a resource depending on an embodiment.

Referring to FIG. 9, a UE feedback refers to signals transmitted to an eNB by a UE, and the assumption refers to a signal, which is not transmitted to an eNB by a UE and is recognized by both the eNB and the UE through definitions made in advance.

In an embodiment, it is assumed that an $RI_H$ 930 which is a rank of a channel with respect to a horizontal CSI-RS (H-CSI-RS) may be shared between the eNB and the UE through a higher signaling and pre-defined between the UE and the eNB. The UE obtains a rank of a channel obtained by applying a pre-defined horizontal precoding to 2D-CSI-RS or a channel obtained by measuring a vertical CSI-RS (V-CSI-RS), and notifies of the rank to the eNB through an $RI_H$ 900. After notification of $RI_H$ 900, in order to derive a PMI, the UE may derive two channel state information and use a combination thereof, based on two CSI-RSs, as described above.

The UE derives a precoding set $\{PMI_H(1), PMI_V\}$ 940 showing an optimal performance, by considering a pre-defined set of precodings corresponding to an $RI_H$ 930 and an $RI_V$ 900 in an open-loop MIMO system, through a channel combined based on a 2D-CSI-RS and or a plurality of CSI-RSs.

The UE transfers precoding corresponding to a V-CSI-RS of a derived result to an eNB through a $PMI_V$ 910 in an embodiment. In a case of a CQI indicating a maximum data transmission rate, the UE notifies of a maximum data transmission rate $CQI_{HV}$ 920 obtained through a channel derived by assuming the optimal precoding set $\{PMI_H(1), PMI_V\}$ 940 determined through a channel state to the eNB.

The eNB may identify a rank of each of precodings through an $RI_V$ 900 transmitted by the UE and a pre-defined $RI_H$ 930, and identify a precoding set $\{PMI_H(1), PMI_V\}$ 910 corresponding to corresponding time and frequency resources through a received $PMI_V$ 910. The eNB identifies that a received maximum data transmission rate $CQI_{HV}$ 920 is formed by assuming a precoding set $\{PMI_H(1), PMI_V\}$ 940, by using the information.

For the next time and frequency resources, the UE assumes that an $RI_H$ 980 which is a rank of a channel with respect to a horizontal CSI-RS (H-CSI-RS) is shared between the eNB and the UE through a higher signaling, and pre-defined between the UE and the eNB.

After notification of $RI_V$ 950, the UE may use two channel state information, in order to derive a PMI, by deriving and combining the two channel state information on the basis of a 2D-CSI-RS or two CSI-RSs as described above.

In an embodiment, the UE derives a precoding set $\{PMI_H(0), PMI_V\}$ 990 showing an optimal performance, by considering a set of precodings corresponding to a pre-defined $RI_H$ 980 and $RI_V$ 950 in an open-loop MIMO system, through a channel combined based on a 2D-CSI-RS and or a plurality of CSI-RSs. The UE transfers precoding corresponding to a V-CSI-RS of a derived result to an eNB through a $PMI_V$ 960. In an embodiment, in a case of a CQI indicating a maximum data transmission rate, the UE notifies of a maximum data transmission rate $CQI_{HV}$ 970 obtained through a channel derived by assuming the optimal precoding set $\{PMI_H(0), PMI_V\}$ 990 determined through a channel state to the eNB.

The eNB may identify a rank of each of precodings through an RIV 950 transmitted by the UE and a pre-defined $RI_H$ 980, and identify a precoding set $\{PMI_H(0), PMI_V\}$ 990 corresponding to corresponding time and frequency resources through a received $PMI_V$ 960.

The eNB identifies that a received maximum data transmission rate $CQI_{HV}$ 980 is formed by assuming a precoding set $\{PMI_H(0), PMI_V\}$ 990, by using the information.

In an embodiment, an operation in an open-loop MIMO system as described above requires previous determination of a precoding in which a UE and an eNB operate according to time and frequency resources. Such a method for defining precoding according to a resource is as follows.

Method 1 for defining precoding according to time and frequency resources: to define by a subband.

Method 2 for defining precoding according to time and frequency resources: to define by a wideband.

When defining by subband as method 1 for defining precoding according to time and frequency resources, it may be defined by a subband as follows.

Method 1 for defining precoding by a subband: to define a $PMI_H$ in advance.

Method 2 for defining precoding by a subband: to define a $PMI_V$ in advance.

Method 3 for defining precoding by a subband: to define a $PMI_H$ and a $PMI_V$ by a UE in advance.

Method 4 for defining precoding by a subband: to define a $PMI_V$ and a $PMI_H$ by a UE in advance.

Method 5 for defining precoding by a subband: to define a plurality of PMI sets {$PMI_H$, $PMI_V$} in advance.

Defining precoding by a subband is described in an embodiment but, in a similar structure, precoding may be defined by a resource block (RB).

Figure 10:
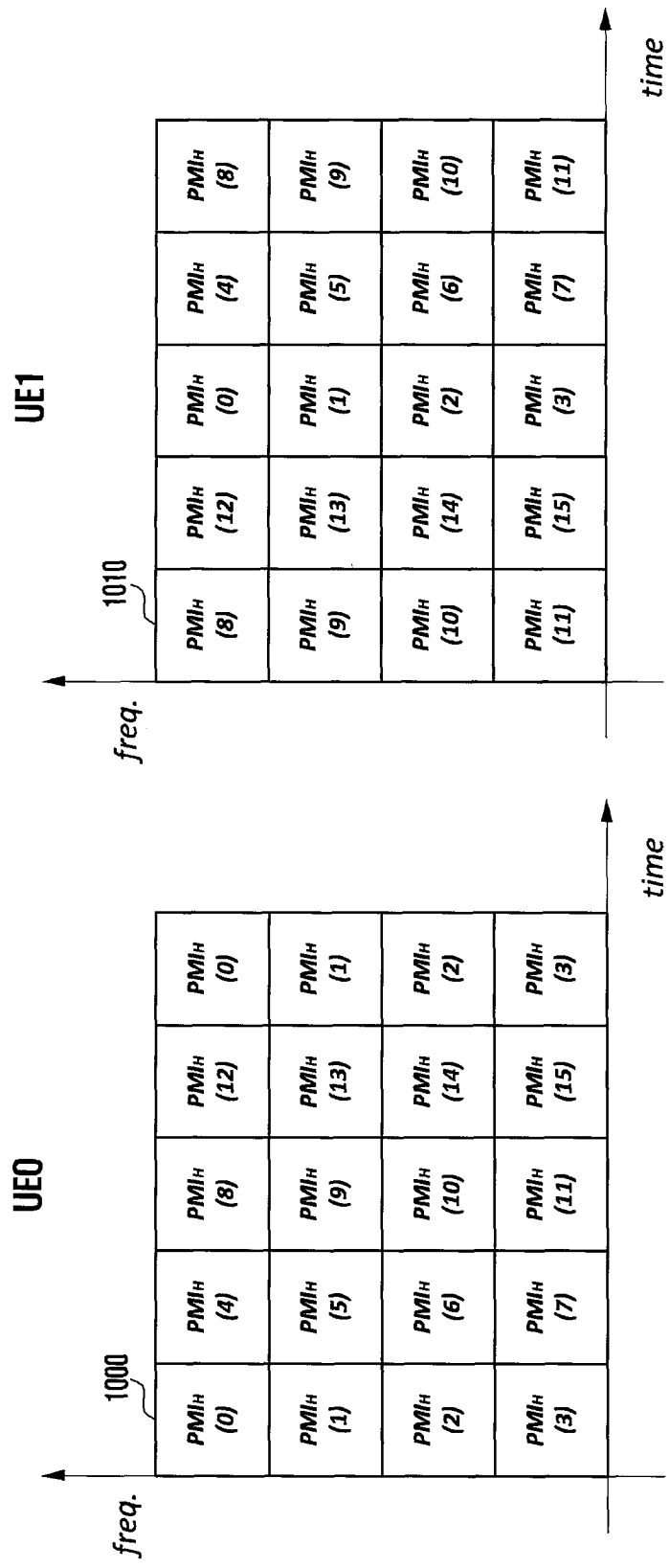
FIG. 10 illustrates an example of an assumption of method 1 for defining precoding for each subband by an eNB and two UEs according to an embodiment.

FIG. 10 illustrates an example of an assumption of method 1 for defining precoding for each subband by an eNB and two UEs according to an embodiment.

Referring to FIG. 10, a $PMI_H$ is pre-defined through method 1 for defining precoding by a subband.

In an embodiment, when assuming to use a PMI of a 4 bit width, precoding corresponding to a $PMI_H$ (0), ..., a $PMI_H$ (15) may be pre-defined according to time and frequency resources as shown in FIG. 10. A $PMI_H$ as defined above and one precoding are operated in Hybrid MIMO, using method 1 for defining precoding according to a resource. At least one value among a subband index, a subframe index, C-RNTI mod N and a cell id which are included in a UE may be used for allocation according to a user, and time and frequency resources. In an entire embodiment, for convenience of explanation, even though it is assumed that a PMI of a 4 bit width is used, it is obvious that a PMI having other width may be used.

At this time, when allocating a precoding, such as identification numbers 1000 and 1010, another UE using neighboring time and frequency resources may be designed to minimize the amount of signal inference caused by each UE on counterpart UEs. In addition, in an open-loop MIMO system such as a transmit diversity and a large-delay CDD which are used in an existing LTE, it is assumed that one UE communicates. However, in order to support multiple-users in a hybrid MIMO situation as described in the example, allocating a precoding for multi-user, as shown in FIG. 10, is required.

Figure 11:
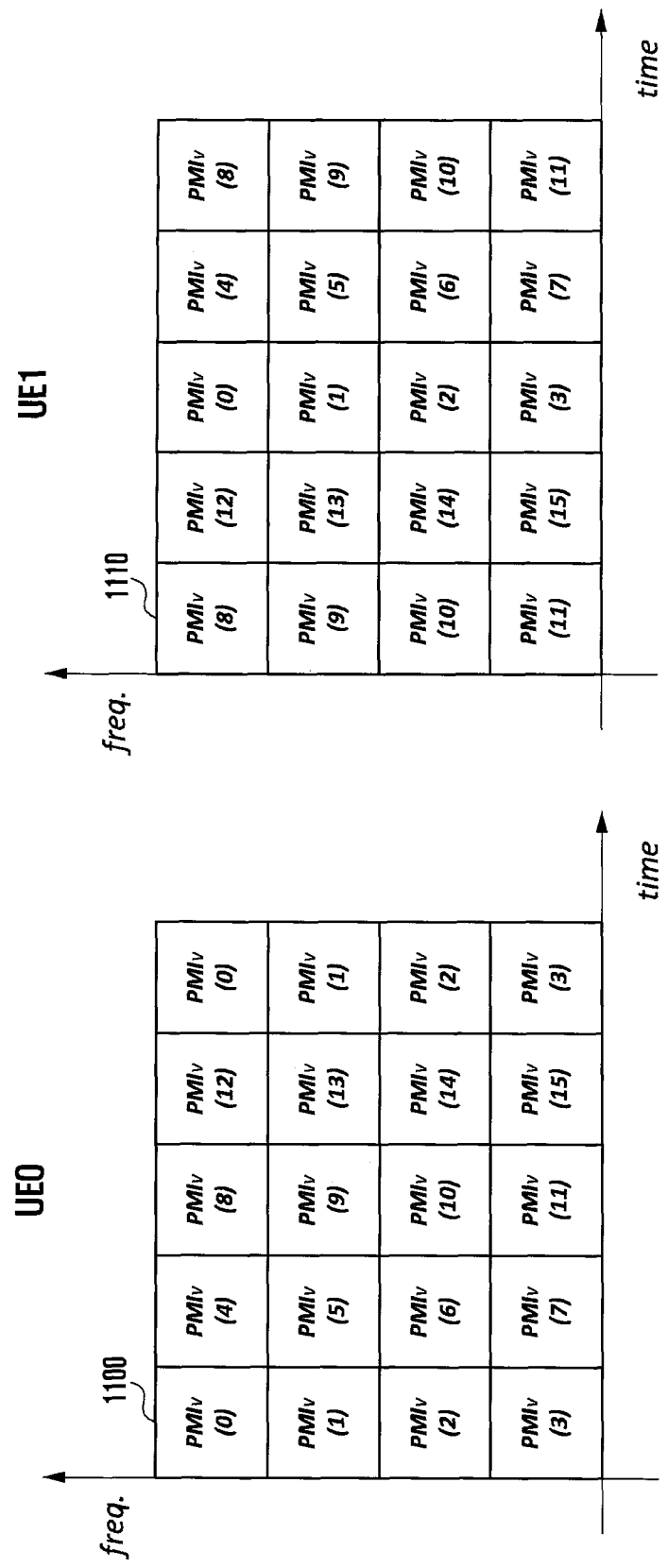
FIG. 11 illustrates an example of an assumption of method 2 for defining a precoding for each subband by an eNB and two UEs according to an embodiment.

In the example, it is described that two UEs communicate in open-loop MIMO using a $PMI_H$ provided by an eNB, but it is similarly applicable to a plurality of more than two UEs. In this case, unlike when two UEs communicate using multi-user MIMO, when a plurality of UEs operate together in a hybrid MIMO system, more carefully designing a precoding definition by considering interference which is caused to each other by each of UEs is required, unlike the existing system. FIG. 11 illustrates an example of an assumption of method 2 for defining a precoding for each subband by an eNB and two UEs according to an embodiment.

Referring to FIG. 11, a $PMI_V$ may be pre-defined using method 2 for defining a precoding by a subband. When assuming that a PMI of a 4 bit width is used, precodings to $PMI_V$(0), $PMI_V$(15) may be pre-defined according to time and frequency resources, as shown in FIG. 11. Hybrid MIMO communication may be used by using method 2 for defining one precoding according to a resource and a $PMI_V$ as defined above. At least one value among a subband index, a subframe index, C-RNTI mod N and a cell id which are possessed by, a UE may be used for allocation according to a user, time, and frequency resources.

At this time, when allocating a precoding, such as identification numbers 1100 and 1110, another UE using neighboring time and frequency resources may be designed to minimize the amount of signal inference caused by each UE on counterpart UEs. In addition, in an open-loop MIMO system such as a transmit diversity and a large-delay CDD which are used in an existing LTE, it is assumed that one UE communicates. However, in order to support multiple-users in a hybrid MIMO situation as described in the example, allocating a precoding for multi-user is required, as shown in FIG. 11.

In the example, it is described that two UEs communicate in open-loop MIMO using a $PMI_H$ provided by an eNB, but it is similarly applicable to a plurality of more than two UEs. In this case, unlike when two UEs communicates using multi-user MIMO, when a plurality of UEs operate together in a hybrid MIMO system, more carefully designing a precoding definition by considering interference which is caused by each UE on one another is required, unlike the existing system.

Figure 12:
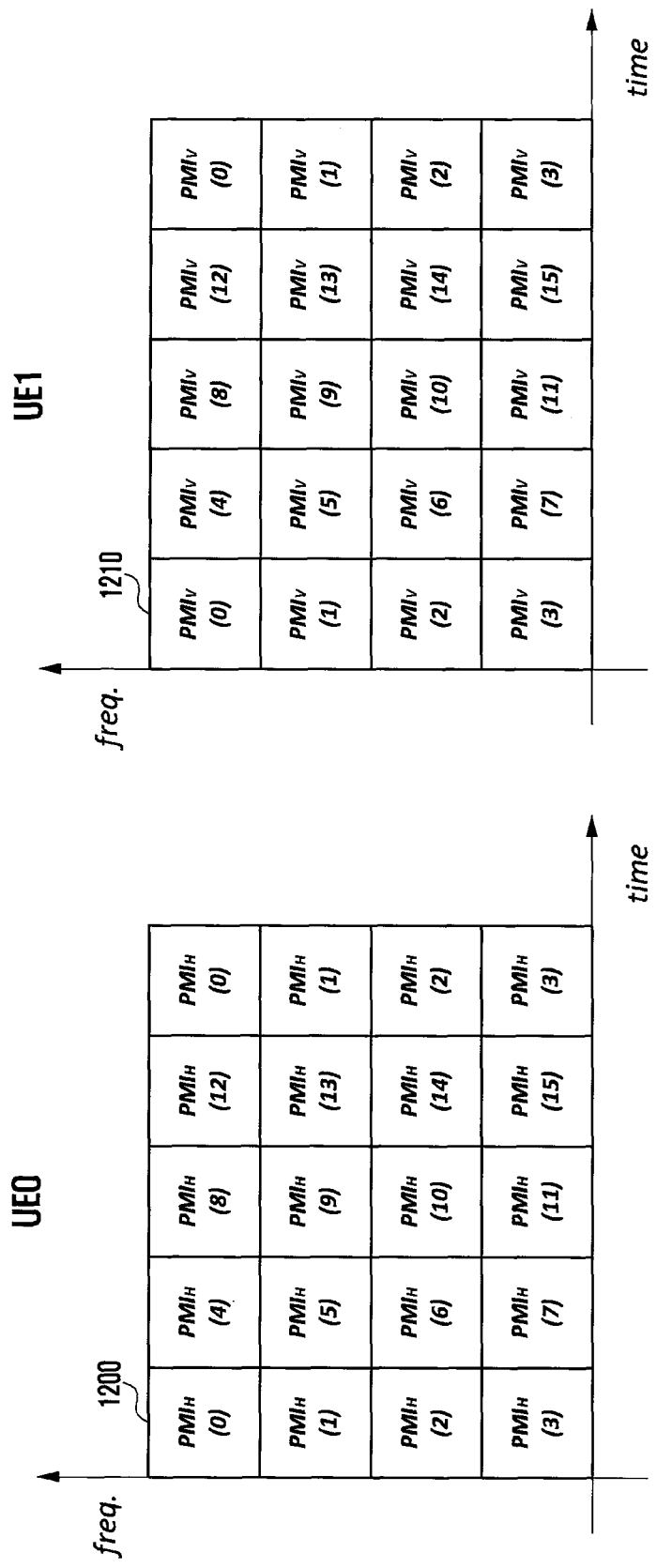
FIG. 12 illustrates an example of an assumption of method 3 for defining a precoding for each subband by an eNB and two UEs according to an embodiment.

FIG. 12 illustrates an example of an assumption of method 3 for defining a precoding for each subband by an eNB and two UEs according to an embodiment.

Referring to FIG. 12, a $PMI_H$ and a $PMI_V$ may be pre-defined using method for defining a precoding by a subband. When assuming the use of a PMI of a 4 bit width, precodings corresponding to a $PMI_H$ (0), ..., a $PMI_H$ (15), a $PMI_V$ (0), ..., a $PMI_V$ (15) may be pre-defined according to time and frequency resources, as shown in FIG. 12. Hybrid MIMO communication may be used by respectively using methods 1 and 2 for defining one precoding according to a resource and a $PMI_H$ and $PMI_V$ as defined above for each UE. As in definition methods 1 and 2, various values such as a subband index, a subframe index, C-RNTI mod N, and a cell id, which are included in a UE, may be used for allocation according to a user, time, and frequency resources.

In the case of method 3 for defining a precoding by a subband, UE0 uses $PMI_H$ for an open-loop MIMO system and UE1 uses a $PMI_V$ for an open-loop MIMO system, so as to minimize the interference caused to each other by the precodings allocated to $PMI_H$ and $PMI_V$. In addition, as described above, in an open-loop MIMO system such as transmit diversity and a large-delay CDD which are used in an existing LTE, it is assumed that one UE communicates. However, in order to support multiple-users in a hybrid MIMO situation as described in the example, allocating a precoding for multi-user, as shown in FIG. 12, is required. In the example, it is illustrated that two UEs communicate in open-loop MIMO using a $PMI_H$ and $PMI_V$ provided by an eNB, but it is similarly applicable to a plurality of more than two UEs. In this case, unlike when two UEs communicate using multi-user MIMO, when a plurality of UEs operate together in a hybrid MIMO system, more carefully designing a precoding definition by considering interference, which is caused by each UE on one another is required, unlike the existing system.

Figure 13:
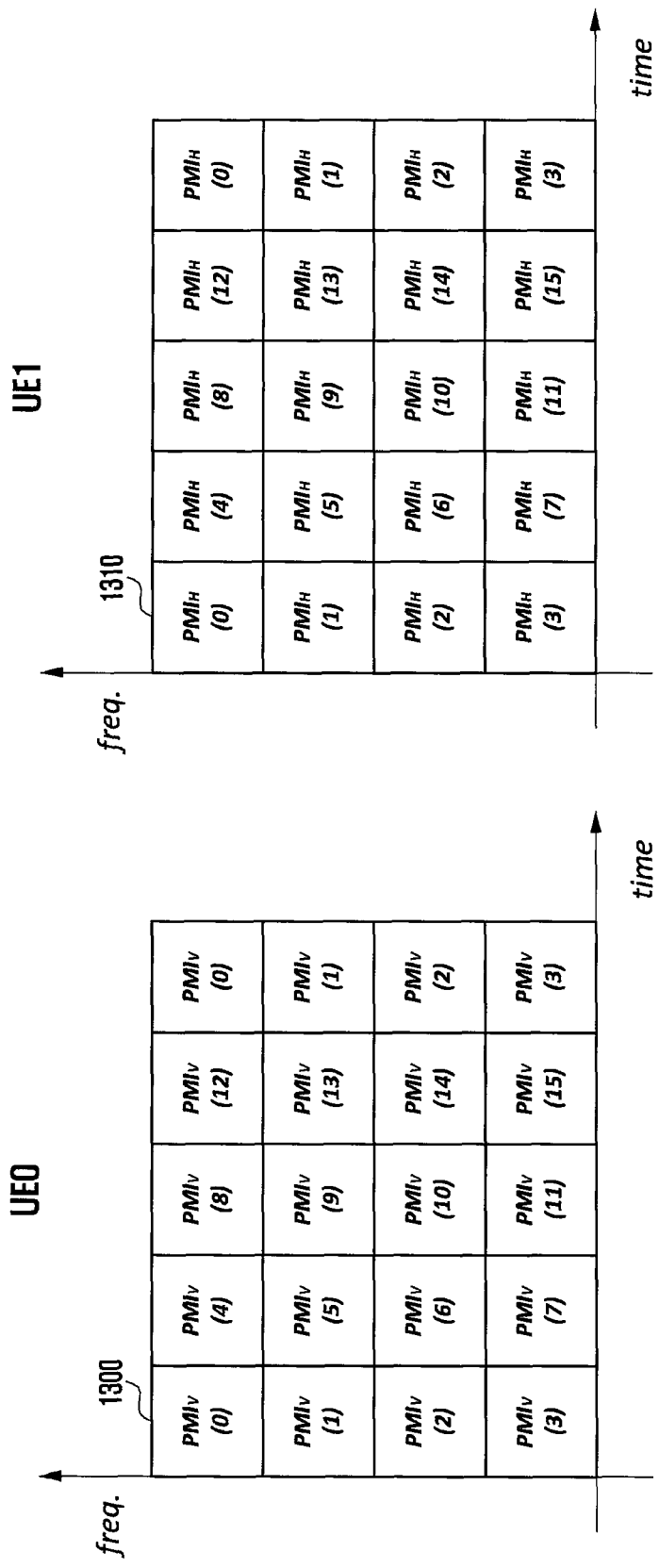
FIG. 13 illustrates an example of an assumption of method 4 for defining a precoding for each subband by an eNB and two UEs according to an embodiment.

FIG. 13 illustrates an example of an assumption of method 4 for defining a precoding for each subband by an eNB and two UEs according to an embodiment.

Referring to FIG. 13, a $PMI_V$ and $PMI_H$ may be pre-defined using method 4 for defining a precoding by a subband. When assuming the use of a PMI of a 4 bit width, precodings corresponding to a $PMI_H$ (0), ..., a $PMI_H$ (15), a $PMI_V$ (0), ..., a $PMI_V$ (15) may be pre-defined according to time and frequency resources, as shown in FIG. 13. Hybrid MIMO communication may be used by respectively using methods 1 and 2 for defining one precoding according to a resource and a $PMI_H$ and $PMI_V$ as defined above for each UE. As definition methods 1 and 2, various values such as a subband index, a subframe index, C-RNTI mod N, and a cell id, which are included in a UE, may be used for allocation according to a user, time, and frequency resources. In the case of method 4 for defining a precoding by a subband, UE0 uses $PMI_V$ for an open-loop MIMO system and UE1 uses a $PMI_H$ for an open-loop MIMO system, so as to minimize the interference caused to each other by the precodings allocated to $PMI_H$ and $PMI_V$. In addition, as described above, in an open-loop MIMO system such as a transmit diversity and a large-delay CDD which are used in an existing LTE, it is assumed that one UE communicates. However, in order to support multiple-users in a situation of hybrid MIMO as described in the example, allocating a precoding for multi-user, as shown in FIG. 13, is required. In the example, it is described that two UEs communicate in open-loop MIMO using a $PMI_H$ and $PMI_V$ provided by an eNB, but it is similarly applicable to a plurality of more than two UEs. In this case, unlike when two UEs communicates using multi-user MIMO, when a plurality of UEs operate together in a hybrid MIMO system, more carefully designing a precoding definition by considering interference, which is caused by each UE on one another, is required, unlike the existing system.

Figure 14:
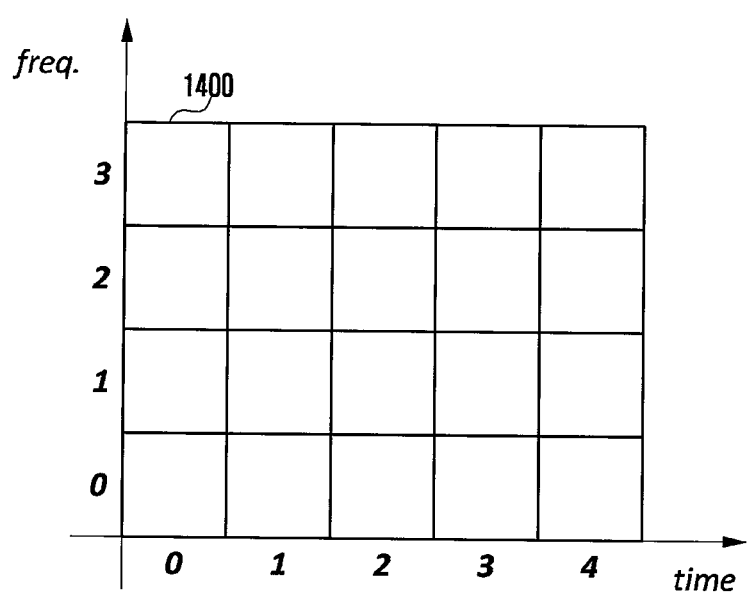
FIG. 14 illustrates an example of pre-defining time and frequency resources for defining a plurality of precoding sets $\{PMI_H, PMI_V\}$, using method 5 for defining a precoding by a subband according to an embodiment.

FIG. 14 illustrates an example of pre-defining time and frequency resources for defining a plurality of precoding sets $\{PMI_H, PMI_V\}$, using method 5 for defining a precoding by a subband according to an embodiment.

Referring to FIG. 14, when time and frequency resources are allocated in order to apply method 3 for defining a precoding by a subband, a precoding set $\{PMI_H, PMI_V\}$ may be defined for each time and frequency resource, as shown in Table 1 bellow.

Table 1 indicates a precoding set $\{PMI_H, PMI_V\}$ definition by a subband.

Similar to the previous embodiment, the combination of $\{PMI_H, PMI_V\}$ may be allocated based on at least one value among a subband index, a subframe index, C-RNTI mod N, and a cell id, which are included in a UE, for allocation according to a user, time, and frequency resources. In the case of method 5 for defining a precoding by a subband, each of UEs combines a precoding set with a 2D-CSI-RS or reference signals H-CSI-RS and V-CSI-RS, using at least one method between methods 1 and 2 for defining a precoding set according to a resource as descried above, using a pre-defined precoding set, derives an optimal precoding set, and transfers a rank of a channel corresponding to a precoding of a derived precoding set and an optimal precoding to an eNB through at least one of a RI and a PMI.

The eNB identifies a precoding set pre-defined based on information received from a UE, identifies a precoding set corresponding to the received PMI, and identifies the precoding considered to determine $CQI_{HV}$ as the maximum data transmission rate in which both 2D-CSI-RS or H-CSI-RS and V-CSI-RS are taken into consideration.

In addition, as an example above, in order to support multiple-users by pre-defining a precoding set in a situation of hybrid MIMO, it may be considered that a precoding set defined in table 1 is allocated for each user.

According to an embodiment, when allocating a precoding by a wideband as in method 2 for allocating a precoding according to time and frequency resources, a precoding allocation method may be defined using at least one method of the following methods.

TABLE 1

| | freq. | | | | |
|---|---|---|---|---|---|
| time | 0 | 1 | 2 | 3 | ... |
| 0 | $\{PMI_H(0), PMI_V(0)\}$ | $\{PMI_H(0), PMI_V(1)\}$ | $\{PMI_H(0), PMI_V(2)\}$ | $\{PMI_H(0), PMI_V(3)\}$ | ... |
| | $\{PMI_H(1), PMI_V(1)\}$ | $\{PMI_H(1), PMI_V(2)\}$ | $\{PMI_H(1), PMI_V(3)\}$ | $\{PMI_H(1), PMI_V(0)\}$ | |
| | $\{PMI_H(2), PMI_V(2)\}$ | $\{PMI_H(2), PMI_V(3)\}$ | $\{PMI_H(2), PMI_V(0)\}$ | $\{PMI_H(2), PMI_V(1)\}$ | |
| | $\{PMI_H(3), PMI_V(3)\}$ | $\{PMI_H(3), PMI_V(0)\}$ | $\{PMI_H(3), PMI_V(1)\}$ | $\{PMI_H(3), PMI_V(2)\}$ | |
| 1 | $\{PMI_H(0), PMI_V(1)\}$ | $\{PMI_H(0), PMI_V(2)\}$ | $\{PMI_H(0), PMI_V(3)\}$ | $\{PMI_H(0), PMI_V(0)\}$ | ... |
| | $\{PMI_H(1), PMI_V(2)\}$ | $\{PMI_H(1), PMI_V(3)\}$ | $\{PMI_H(1), PMI_V(0)\}$ | $\{PMI_H(1), PMI_V(1)\}$ | |
| | $\{PMI_H(2), PMI_V(3)\}$ | $\{PMI_H(2), PMI_V(0)\}$ | $\{PMI_H(2), PMI_V(1)\}$ | $\{PMI_H(2), PMI_V(2)\}$ | |
| | $\{PMI_H(3), PMI_V(0)\}$ | $\{PMI_H(3), PMI_V(1)\}$ | $\{PMI_H(3), PMI_V(2)\}$ | $\{PMI_H(3), PMI_V(3)\}$ | |
| 2 | $\{PMI_H(0), PMI_V(2)\}$ | $\{PMI_H(0), PMI_V(3)\}$ | $\{PMI_H(0), PMI_V(0)\}$ | $\{PMI_H(0), PMI_V(1)\}$ | ... |
| | $\{PMI_H(1), PMI_V(3)\}$ | $\{PMI_H(1), PMI_V(0)\}$ | $\{PMI_H(1), PMI_V(1)\}$ | $\{PMI_H(1), PMI_V(2)\}$ | |
| | $\{PMI_H(2), PMI_V(0)\}$ | $\{PMI_H(2), PMI_V(1)\}$ | $\{PMI_H(2), PMI_V(2)\}$ | $\{PMI_H(2), PMI_V(3)\}$ | |
| | $\{PMI_H(3), PMI_V(1)\}$ | $\{PMI_H(3), PMI_V(2)\}$ | $\{PMI_H(3), PMI_V(3)\}$ | $\{PMI_H(3), PMI_V(0)\}$ | |
| 3 | $\{PMI_H(0), PMI_V(3)\}$ | $\{PMI_H(0), PMI_V(0)\}$ | $\{PMI_H(0), PMI_V(1)\}$ | $\{PMI_H(0), PMI_V(2)\}$ | ... |
| | $\{PMI_H(1), PMI_V(0)\}$ | $\{PMI_H(1), PMI_V(1)\}$ | $\{PMI_H(1), PMI_V(2)\}$ | $\{PMI_H(1), PMI_V(3)\}$ | |
| | $\{PMI_H(2), PMI_V(1)\}$ | $\{PMI_H(2), PMI_V(2)\}$ | $\{PMI_H(2), PMI_V(3)\}$ | $\{PMI_H(2), PMI_V(0)\}$ | |
| | $\{PMI_H(3), PMI_V(2)\}$ | $\{PMI_H(3), PMI_V(3)\}$ | $\{PMI_H(3), PMI_V(0)\}$ | $\{PMI_H(3), PMI_V(1)\}$ | |
| ... | ... | ... | ... | ... | |

Table 1 above is a definition of number of cases with respect to available precoding set $\{PMI_H, PMI_V\}$ for each time and frequency resource of a UE allocated to an eNB. When assuming the use of a PMI of a 4 bit width, precoding sets corresponding to $\{PMI_H(0), PMI_V(0)\}$, $\{PMI_H(1), PMI_V(0)\}$, $\{PMI_H(15), PMI_V(14)\}$, $\{PMI_H(15), PMI_V(15)\}$ may be pre-defined according to appointed time and frequency resources, as shown in FIG. 14. Hybrid MIMO communication may be used by respectively using methods 1 and 2 for defining a precoding set according to a resource and a precoding set $\{PMI_H, PMI_V\}$ as defined above for each UE. In an embodiment, a combination of $\{PMI_H, PMI_V\}$ in each resource region indicated in Table 1 may be differently applied according to an embodiment.

Method 1 for defining a precoding by a wideband: to define a $PMI_H$ in advance.

Method 2 for defining a precoding by a wideband: to define a $PMI_V$ in advance.

Method 3 for defining a precoding by a wideband: to define a $PMI_H$ and a $PMI_V$ by a UE in advance.

Method 4 for defining a precoding by a wideband: to define a $PMI_V$ and a $PMI_H$ by a UE in advance.

Method 5 for defining a precoding by a wideband: to define a precoding set $\{PMI_H, PMI_V\}$ in advance.

Figure 15:
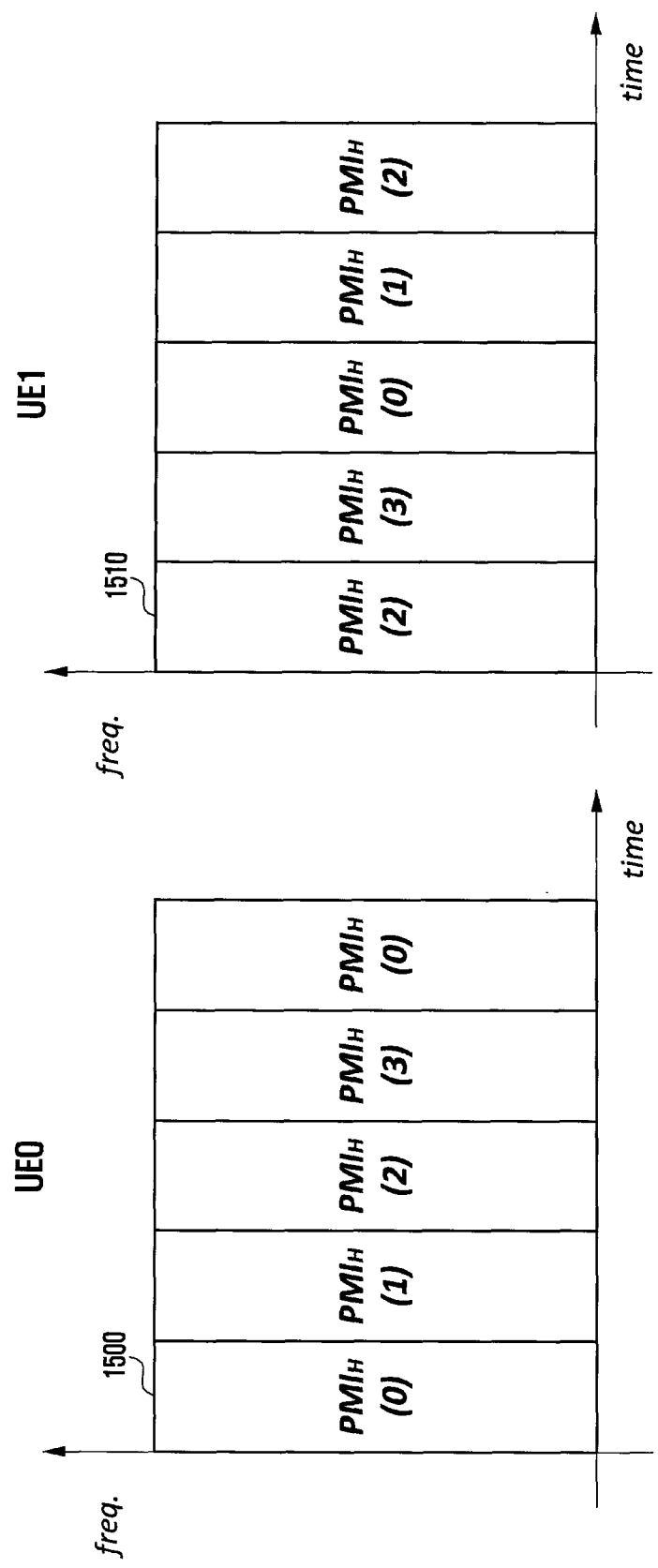
FIG. 15 illustrates a method for pre-defining a $PMI_H$ for each time and frequency resource, according to method 1 for defining a precoding by a wideband to each UE according to an embodiment.

FIG. 15 illustrates a method for pre-defining a $PMI_H$ for each time and frequency resource, according to method 1 for defining a precoding by a wideband to each UE according to an embodiment.

Referring to FIG. 15, a $PMI_H$ may be pre-defined using method 1 for defining precoding by a wideband.

In an embodiment, when assuming the use of a PMI of a 4 bit width, precoding corresponding to a $PMI_H$ (0), . . . , a $PMI_H$ (15) may be pre-defined according to time and frequency resources as shown in FIG. 15. Hybrid MIMO communication may be used by using method 1 for defining one precoding according to a resource and a $PMI_H$ as defined above. At least one value among a subband index, a subframe index, C-RNTI mod N and a cell id which are included in a UE may be used for allocation according to a user, time, and frequency resources.

At this time, when allocating a precoding, such as identification numbers 1500 and 1510, another UE using neighboring time and frequency resources may be designed to minimize the amount of signal inference caused by each UE on counterpart UEs. In addition, in an open-loop MIMO system such as a transmit diversity and a large-delay CDD which are used in an existing LTE, it is assumed that one UE communicates. However, in order to support multiple-users in a hybrid MIMO situation as described in the example, allocating a precoding for multi-user, as shown in FIG. 15, is required. In the example, it is illustrated that two UEs communicate in open-loop MIMO using a $PMI_H$ provided by an eNB, but it is similarly applicable to a plurality of more than two UEs. In this case, unlike when two UEs communicate using multi-user MIMO, when a plurality of UEs operate together in a hybrid MIMO system, more carefully designing a precoding definition by considering interference caused by each UE on one another is required, unlike the existing system.

Figure 16:
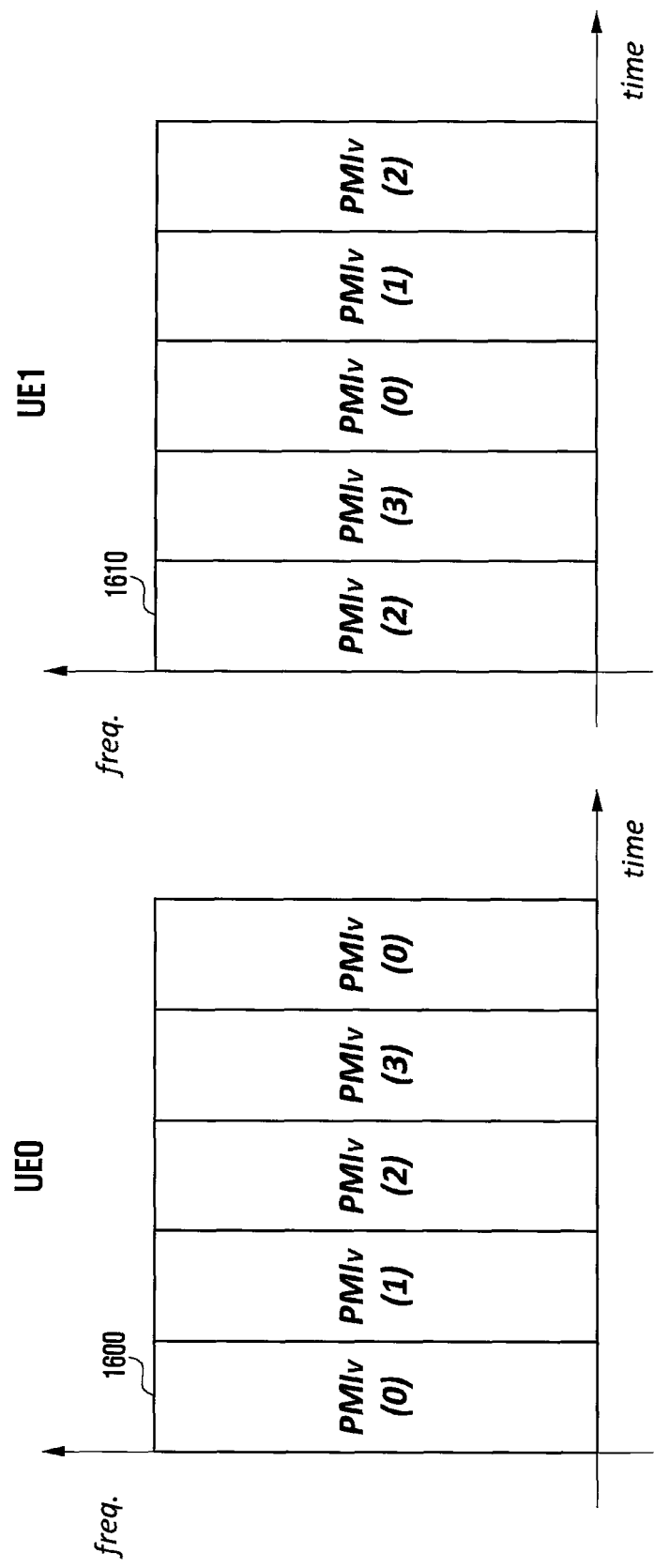
FIG. 16 illustrates a method for pre-defining a $PMI_V$ for each time and frequency resource, according to method 2 for defining a precoding by a wideband to each UE according to an embodiment.

FIG. 16 illustrates a method for pre-defining a $PMI_V$ for each time and frequency resource, according to method 2 for defining a precoding by a wideband to each UE according to an embodiment.

Referring to FIG. 16, a $PMI_V$ may be pre-defined using method 2 for defining precoding by a wideband, in an embodiment.

In an embodiment, when assuming the use of a PMI of a 4 bit width, precoding corresponding to a $PMI_H$ (0), . . . , a $PMI_H$ (15) may be pre-defined according to time and frequency resources as shown in FIG. 16. Hybrid MIMO communication may be used by using method 2 for defining one precoding according to a resource and a $PMI_V$ as defined above. At least one value among a subband index, a subframe index, C-RNTI mod N and a cell id which are included in a UE may be used for allocation according to a user, time, and frequency resources.

At this time, when allocating a precoding, such as identification numbers 1600 and 1610, another UE using neighboring time and frequency resources may be designed to minimize an amount of signal inference which is caused by each UE on counterpart UEs.

In addition, in an open-loop MIMO system such as a transmit diversity and a large-delay CDD which are used in an existing LTE, it is assumed that one UE communicates. However, in order to support multiple-users in a hybrid MIMO situation as described in the example, allocating a precoding for multi-user, as shown in FIG. 16, is required. In the example, it is illustrated that two UEs communicate in open-loop MIMO using a $PMI_V$ provided by an eNB, but it is similarly applicable to a plurality of more than two UEs. In this case, unlike when two UEs communicate using multi-user MIMO, when a plurality of UEs operate together in a hybrid MIMO system, more carefully designing a precoding definition by considering interference caused by each UE on one another is required, unlike the existing system.

Figure 17:
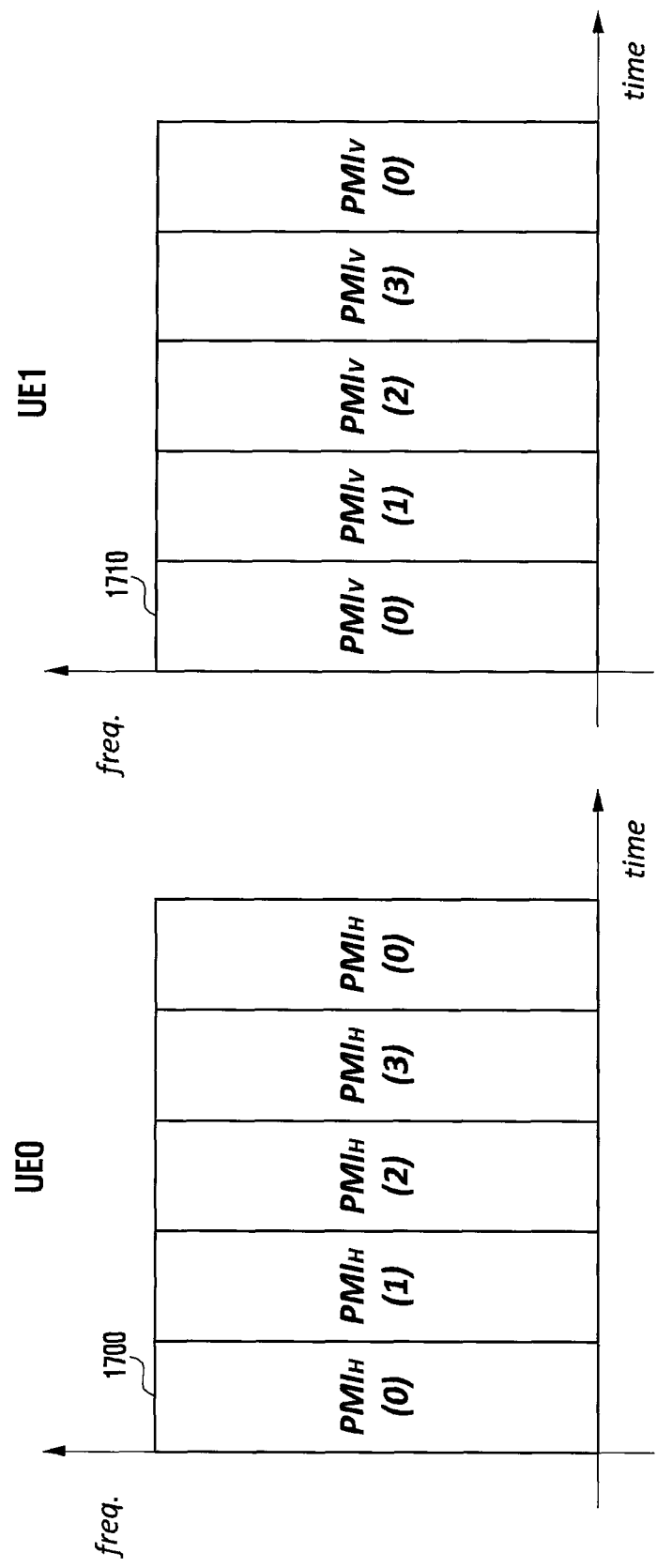

FIG. 17 illustrates a method for pre-defining a $PMI_H$ and a $PMI_V$ for each UE, according to method 3 for defining a precoding by a wideband to each UE according to an embodiment.

Referring to FIG. 17, a $PMI_H$ and a $PMI_V$ may be pre-defined using method 3 for defining precoding by a wideband.

When assuming the use of a PMI of a 4 bit width, precodings corresponding to a $PMI_H$ (0), . . . , a $PMI_H$ (15) may be pre-defined according to time and frequency resources, as shown in FIG. 17. Hybrid MIMO communication may be used by respectively using methods 1 and 2 for defining one precoding according to a resource and a $PMI_H$ and $PMI_V$ as defined above for each UE. As definition methods 1 and 2, various values such as a subband index, a subframe index, C-RNTI mod N, and a cell id, which are included in a UE, may be used for allocation according to a user, time, and frequency resources. In the case of method 3 for defining a precoding by a wideband, UE0 uses $PMI_H$ for an open-loop MIMO system and UE1 uses a $PMI_V$ for an open-loop MIMO system, so as to minimize the interference caused to each other by the precodings allocated to $PMI_H$ and $PMI_V$.

In addition, similar to the previous embodiment, in an open-loop MIMO system such as a transmit diversity and a large-delay CDD which are used in an existing LTE, it is assumed that one UE communicates. However, in order to support multiple-users in a hybrid MIMO situation as described in the example, allocating a precoding for multi-user, as shown in FIG. 17, is required. In the example, it is described that two UEs communicate in open-loop MIMO using a $PMI_H$ and $PMI_V$ provided by an eNB, but it is similarly applicable to a plurality of more than two UEs. In this case, unlike when two UEs communicate using multi-user MIMO, when a plurality of UEs operate together in a hybrid MIMO system, more carefully designing a precoding definition by considering interference caused by each UE on one another is required, unlike the existing system.

Figure 18:
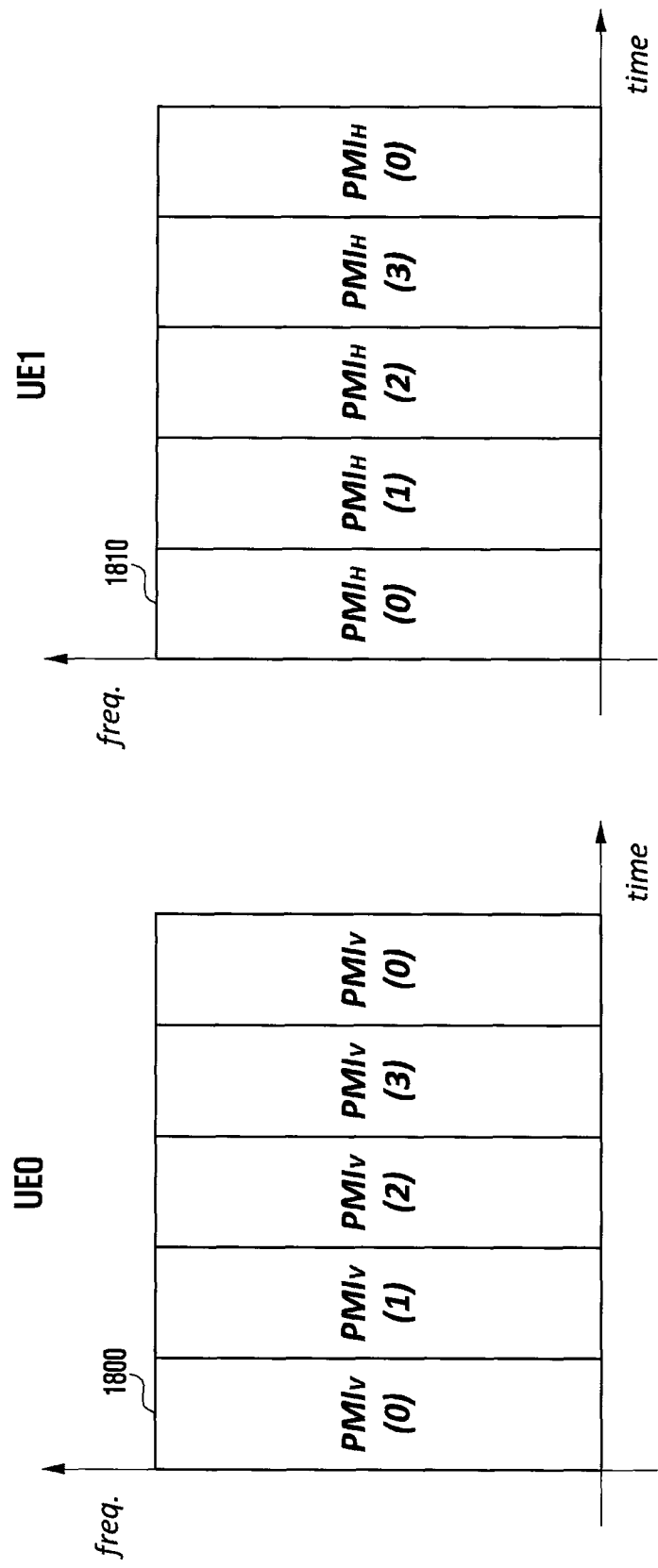
FIG. 18 illustrates a method for pre-defining a $PMI_V$ and a $PMI_H$ for each UE, according to method 4 for defining a precoding by a wideband to each UE according to an embodiment.

FIG. 18 illustrates a method for pre-defining a $PMI_V$ and a $PMI_H$ for each UE, according to method 4 for defining a precoding by a wideband to each UE according to an embodiment.

Referring to FIG. 18, a $PMI_V$ and $PMI_H$ may be pre-defined using method 4 for defining precoding by a wideband.

When assuming the use of a PMI of a 4 bit width, precodings corresponding to a $PMI_H$ (0), . . . , a $PMI_H$ (15), a $PMI_V$(0), . . . , a $PMI_V$(15) may be pre-defined according to time and frequency resources, as shown in FIG. 18. Hybrid MIMO communication may be used by respectively using methods 1 and 2 for defining one precoding according to a resource and a $PMI_H$ and $PMI_V$ as defined above for each UE. As in definition methods 1 and 2, at least one value among a subband index, a subframe index, C-RNTI mod N, and a cell id, which are included in a UE, may be used for allocation according to a user, time, and frequency resources.

In the case of method 4 for defining a precoding by a wideband, UE0 uses $PMI_V$ for an open-loop MIMO system and UE1 uses a $PMI_H$ for an open-loop MIMO system, so as to minimize the interference caused to each other by the precodings allocated to $PMI_H$ and $PMI_V$. In addition, similar to the previous embodiment, in an open-loop MIMO system such as a transmit diversity and a large-delay CDD which are used in an existing LTE, it is assumed that one UE communicates. However, in order to support multiple-users in a hybrid MIMO situation as described in the example, allocating a precoding for multi-user, as shown in FIG. 18, is required. In the example, it is illustrated that two UEs communicate in open-loop MIMO using a $PMI_H$ and $PMI_V$ provided by an eNB, but it is similarly applicable to a plurality of more than two UEs. In this case, unlike when two UEs communicates using multi-user MIMO, when a plurality of UEs operate together in a hybrid MIMO system, more carefully designing a precoding definition by considering interference caused by each UE on one another is required, unlike the existing system.

Figure 19:
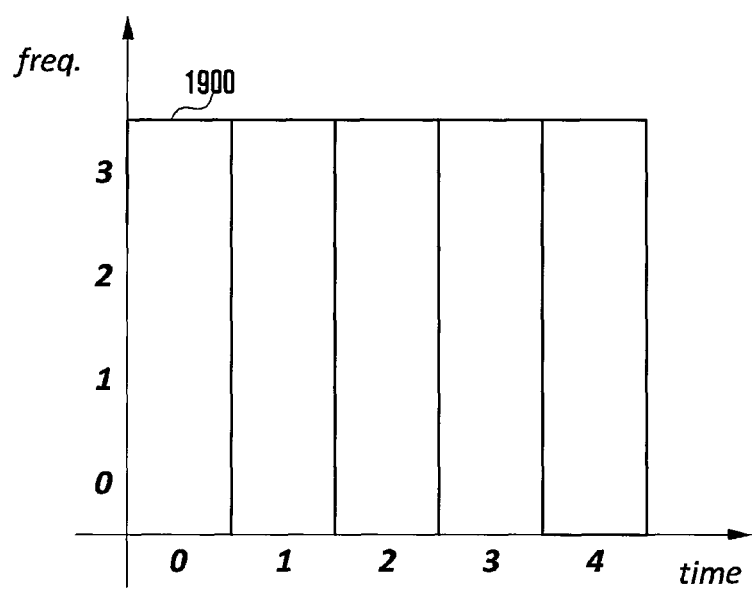
FIG. 19 illustrates an example of pre-defining time and frequency resources for defining a plurality of precoding sets $\{PMI_H, PMI_V\}$, using method 5 for defining a precoding by a wideband according to an embodiment.

FIG. 19 illustrates an example of pre-defining time and frequency resources for defining a plurality of precoding sets $\{PMI_H, PMI_V\}$, using method 5 for defining a precoding by a wideband according to an embodiment.

Referring to FIG. 19, when time and frequency resources are allocated in order to apply method 3 for defining a precoding by a wideband, a precoding set $\{PMI_H, PMI_V\}$ may be defined for each time and frequency resource, as shown in Table 2 bellow.

Table 2 indicates a precoding set $\{PMI_H, PMI_V\}$ definition by a wideband

RS and V-CSI-RS are taken into consideration. In addition, as an example above, in order to support multiple-users by pre-defining a precoding set in a hybrid MIMO situation, it may be considered that a precoding set defined in table 2 is allocated for each user.

As mentioned above, an eNB and a plurality of UEs operate in an open-loop MIMIO system, using pre-defined precodings. At this time, it is necessary to pre-define a precoding for the eNB and plurality of UEs. In an embodiment of the present disclosure, two methods as follows are proposed as a method for defining a precoding according to time and frequency resources between the eNB and plurality of UEs.

Method 1 for sharing a precoding definition according to time and frequency resources: which uses a pre-defined method (a definition of standards).

Method 2 for sharing a precoding definition according to time and frequency resources: which notifies through a RRC or a L1 signaling by an eNB.

When using a hybrid MIMO system according to method 1 for sharing a precoding definition according to time and frequency resources, a precoding is defined by a subband and a wideband, as shown in FIG. 10 to FIG. 19, according to methods 1 and 2 for defining a precoding according to

TABLE 2

| time | 0 | 1 | 2 | 3 | ... |
|---|---|---|---|---|---|
| Precoding set | $\{PMI_H(0), PMIV(0)\}$<br>$\{PMI_H(1), PMIV(1)\}$<br>$\{PMI_H(2), PMIV(2)\}$<br>$\{PMI_H(3), PMIV(3)\}$ | $\{PMI_H(0), PMI_V(1)\}$<br>$\{PMI_H(1), PMI_V(2)\}$<br>$\{PMI_H(2), PMI_V(3)\}$<br>$\{PMI_H(3), PMI_V(0)\}$ | $\{PMI_H(0), PMI_V(2)\}$<br>$\{PMI_H(1), PMI_V(3)\}$<br>$\{PMI_H(2), PMI_V(0)\}$<br>$\{PMI_H(3), PMI_V(1)\}$ | $\{PMI_H(0), PMI_V(3)\}$<br>$\{PMI_H(1), PMI_V(0)\}$<br>$\{PMI_H(2), PMI_V(1)\}$<br>$\{PMI_H(3), PMI_V(2)\}$ | ... |

Table 2 above defines a number of cases with respect to available precoding set $\{PMI_H, PMI_V\}$ for each time and frequency resource of a UE allocated to an eNB. Table 2 above indicates an example of a precoding set $\{PMI_H, PMI_V\}$ combination according to an embodiment, and a precoding set $\{PMI_H, PMI_V\}$ may be variously determined according to an embodiment.

When assuming the use of a PMI of a 4 bit width, precoding sets corresponding to $\{PMI_H(0), PMI_V(0)\}$, $\{PMI_H(1), PMI_V(0)\}$, $\{PMI_H(15), PMI_V(14)\}$, $\{PMI_H(15), PMI_V(15)\}$ may be pre-defined according to time and frequency resources appointed in FIG. 19. Hybrid MIMO communication may be used by respectively using methods 1 and 2 for defining a precoding set according to a resource and a precoding set $\{PMI_H, PMI_V\}$ as defined above for each UE. Similar to the previous embodiment, at least one value among a subband index, a subframe index, C-RNTI mod N, and a cell id, which are included in a UE, may be used for allocation according to a user, time, and frequency resources. In the case of method 5 for defining a precoding by a subband, each of UEs combines a precoding set with a 2D-CSI-RS or reference signals H-CSI-RS and V-CSI-RS, using at least one method between methods 1 and 2 for defining a precoding set according to a resource as descried above, using a pre-defined precoding set, derives an optimal precoding set, and transfers a rank of a channel corresponding to a precoding of a derived precoding set and an optimal precoding to an eNB through at least one of a RI and a PMI.

The eNB receives the at least one of RI and PMI, identifies a precoding set corresponding to the received PMI by identifying a pre-defined precoding set, and identifies the precoding considered to determine $CQI_{HV}$ as the maximum data transmission rate in which both 2D-CSI-RS or H-CSItime and frequency resources, in standards for a corresponding communication. Thus, a corresponding eNB and UE communicates a $PMI_H$ and a $PMI_V$ in a hybrid MIMO system, using a pre-defined precoding, as shown in FIG. 6 to FIG. 9.

When using a hybrid MIMO system according to method 2 for sharing a precoding definition according to time and frequency resources, an additional RRC or L1 signaling is required to define a precoding by a subband and a wideband, as shown in FIG. 10 to FIG. 19, according to methods 1 and 2 for defining a precoding according to time and frequency resources. Therefore, a corresponding eNB and UE communicate a $PMI_H$ and a $PMI_V$ in a hybrid MIMO system, using a pre-defined precoding, as shown in FIG. 6 to FIG. 9.

As shown in FIG. 6 and FIG. 7, when one precoding is defined according to time and frequency resources by using a method for defining a precoding according to a resource, and used in a hybrid MIMO system, methods for selecting an optimal precoding by a closed-loop MIMO system, according to a precoding operated in a pre-defined open-loop MIMO system, are as follows.

Method 1 for selecting a precoding of a closed-loop MIMO system according to a precoding of an open-loop MIMO system: which derives an optimal precoding by considering all available precoder matrices which are pre-defined (through standards).

Method 2 for selecting a precoding of a closed-loop MIMO system according to a precoding of an open-loop MIMO system: which restricts available types of precodings of a closed-loop MIMO system according to a precoding of an open-loop MIMO system.

Table 3 indicates a case of selecting an optimal precoding for a closed-loop MIMO system by considering all available precoder matrices which are defined in standards through method 1 for selecting a precoding of a closed-loop MIMO system according to a precoding of an open-loop MIMO system.

Table 3 shows a method of considering all available precoding matrices defined in the standards described below.

TABLE 3

| Horizontal | Vertical | | | |
|---|---|---|---|---|
| | $PMI_V(0)$ | $PMI_V(1)$ | $PMI_V(2)$ | $PMI_V(3)$ |
| $PMI_H(0)$ | ○ | ○ | ○ | ○ |
| $PMI_H(1)$ | ○ | ○ | ○ | ○ |
| $PMI_H(2)$ | ○ | ○ | ○ | ○ |
| $PMI_H(3)$ | ○ | ○ | ○ | ○ |
| $PMI_H(4)$ | ○ | ○ | ○ | ○ |
| $PMI_H(5)$ | ○ | ○ | ○ | ○ |
| $PMI_H(6)$ | ○ | ○ | ○ | ○ |
| $PMI_H(7)$ | ○ | ○ | ○ | ○ |
| $PMI_H(8)$ | ○ | ○ | ○ | ○ |
| $PMI_H(9)$ | ○ | ○ | ○ | ○ |
| $PMI_H(10)$ | ○ | ○ | ○ | ○ |
| $PMI_H(11)$ | ○ | ○ | ○ | ○ |
| $PMI_H(12)$ | ○ | ○ | ○ | ○ |
| $PMI_H(13)$ | ○ | ○ | ○ | ○ |
| $PMI_H(14)$ | ○ | ○ | ○ | ○ |
| $PMI_H(15)$ | ○ | ○ | ○ | ○ |

As described in Table 3, each of a $PMI_H$ and a $PMI_V$ may consider, with respect to all counterpart $PMI_H$ and $PMI_V$, accordingly, at the time of deriving, a wireless channel state may be derived by considering all counterpart precoder matrices.

Generally, an optimal horizontal precoding for a UE may be changed according to the precoding which is a vertical precoding. The present disclosure proposes a two-dimensional PMI restriction technique. Generally, a PMI restriction is to restrict the range of a PMI which may be selected and notified by a UE. When applying the PMI restriction as described above, in a process of selecting an optimal PMI by a UE, searching in a smaller range may decrease complexity of calculation of the UE and a PMI overhead of which an eNB is notified by the UE.

In standards according to method 2 for selecting a precoding of a closed-loop MIMO system according to a precoding of an open-loop MIMO system proposed in an embodiment of the present disclosure, a method for restricting available types of precodings of a closed-loop MIMO system according to a precoding of an open-loop MIMO system includes restricting a PMI which may be designated in a closed-loop, according to a precoding determined depending on open-loop MIMO.

That is, when assuming a $PMI_V(0)$ by a UE, a $PMI_H$ may be selected in PMI values designated for a $PMI_V(0)$. In addition, when assuming a $PMI_V(1)$, a $PMI_H$ may be selected in PMI values designated for a $PMI_V(1)$. That is, a range of a selectable $PMI_H$ value is restricted depending on a $PMI_V$ value to be assumed by a UE. When applying a PMI restriction according to an embodiment of the present disclosure, the range of a $PMI_H$ selected by a closed-loop MIMO scheme may be changed depending on a $PMI_V$ value determined by open-loop MIMO by a UE.

In standards according to method 2 for selecting a precoding of a closed-loop MIMO system according to a precoding of an open-loop MIMO system, methods for restricting available types of precodings of a closed-loop MIMO system according to a precoding of an open-loop MIMO system include at least one of the following methods.

Method 1 for restricting available types of precodings of a closed-loop MIMO system according to a precoding of an open-loop MIMO system: to restrict according to the case of a $PMI_H$ and a $PMI_V$.

Method 2 for restricting available types of precodings of a closed-loop MIMO system according to a precoding of an open-loop MIMO system: to restrict only a specific $PMI_H$.

Method 3 for restricting available types of precodings of a closed-loop MIMO system according to a precoding of an open-loop MIMO system: to restrict only a specific $PMI_V$.

Table 4 indicates restrictions according to the case of a $PMI_H$ and a $PMI_V$, based on method 1 for selecting a precoding of a closed-loop MIMO system according to a precoding of an open-loop MIMO system.

More particularly, the following Table 4 indicates restrictions according to the case of a $PMI_H$ and a $PMI_V$.

TABLE 4

| Horizontal | Vertical | | | |
|---|---|---|---|---|
| | $PMI_V(0)$ | $PMI_V(1)$ | $PMI_V(2)$ | $PMI_V(3)$ |
| $PMI_H(0)$ | ○ | X | ○ | X |
| $PMI_H(1)$ | X | ○ | ○ | X |
| $PMI_H(2)$ | X | ○ | ○ | ○ |
| $PMI_H(3)$ | ○ | ○ | X | X |
| $PMI_H(4)$ | ○ | X | X | X |
| $PMI_H(5)$ | X | X | ○ | ○ |
| $PMI_H(6)$ | ○ | X | X | ○ |
| $PMI_H(7)$ | ○ | ○ | ○ | ○ |
| $PMI_H(8)$ | X | X | X | ○ |
| $PMI_H(9)$ | X | X | ○ | ○ |
| $PMI_H(10)$ | ○ | ○ | X | X |
| $PMI_H(11)$ | X | ○ | ○ | X |
| $PMI_H(12)$ | ○ | X | X | ○ |
| $PMI_H(13)$ | ○ | ○ | ○ | X |
| $PMI_H(14)$ | X | ○ | ○ | ○ |
| $PMI_H(15)$ | ○ | ○ | ○ | ○ |

As shown in Table 4, each of a $PMI_H$ and $PMI_V$ determines whether to be considered or not when deriving a $CQI_{HV}$ for each of a counterpart $PMI_H$ and $PMI_V$. In Table 4, a combination for whether to consider with respect to each of corresponding PMIs may be variously determined according to an embodiment.

In an embodiment, a method of configuring as shown in Table 4 configures for all $PMI_H$ and $PMI_V$ and thus it is advantageous in optimizing each UE's performance. Meanwhile, when sharing such a pre-definition through standards or receiving such pre-definition through a signal, a lot of resources are required.

Table 5 below indicates how to define a precoding set $\{PMI_H, PMI_V\}$ for operation of methods 1 and 2 for defining a precoding set according to a resource, using method 1 for selecting a precoding of a closed-loop MIMO system according to a precoding of an open-loop MIMO system.

More particularly, Table 5 below indicates how to define a precoding set $\{PMI_H, PMI_V\}$.

TABLE 5

| Horizontal | Vertical | | | |
|---|---|---|---|---|
| | $PMI_V(0)$ | $PMI_V(1)$ | $PMI_V(2)$ | $PMI_V(3)$ |
| $PMI_H(0)$ | ○ | X | X | X |
| $PMI_H(1)$ | X | ○ | X | X |
| $PMI_H(2)$ | X | X | ○ | X |

TABLE 5-continued

| Horizontal | Vertical | | | |
| --- | --- | --- | --- | --- |
| | PMI$_V$(0) | PMI$_V$(1) | PMI$_V$(2) | PMI$_V$(3) |
| PMI$_H$(3) | X | ○ | X | X |
| PMI$_H$(4) | ○ | X | X | X |
| PMI$_H$(5) | X | X | ○ | X |
| PMI$_H$(6) | X | X | X | ○ |
| PMI$_H$(7) | X | X | ○ | X |
| PMI$_H$(8) | X | X | X | ○ |
| PMI$_H$(9) | X | X | X | ○ |
| PMI$_H$(10) | ○ | X | X | X |
| PMI$_H$(11) | X | ○ | X | X |
| PMI$_H$(12) | X | X | X | ○ |
| PMI$_H$(13) | X | X | ○ | X |
| PMI$_H$(14) | X | ○ | X | X |
| PMI$_H$(15) | X | X | ○ | X |

As shown in Table 5, since each PMI$_H$ and PMI$_V$ is possible to consider for only one counterpart PMI$_V$ and PMI$_H$ even though just one value of PMI$_H$ and PMI$_V$ is received, it is possible to determine the precoding considered to configure CQI$_{HV}$ as the maximum possible data transmission rate by identifying a counterpart value and considering all values. In Table 5, a combination for whether to consider with respect to each of corresponding PMIs may be variously determined according to an embodiment.

In an embodiment, in the case of such a configuration method, since it is possible to identify by finding number of cases even though just one value is reported, without assuming feedback for a specific PMI$_H$ or PMI$_V$, it is possible to flexibly handle according to a situation and actively handle a H-CSI-RS and a V-CIS-RS, and reduce overhead according to a PMI report.

Table 6 below indicates restrictions on a specific PMI$_H$ according to method 2 for restricting available types of precodings of a closed-loop MIMO system according to a precoding of an open-loop MIMO system.

More particularly, Table 6 below indicates how to restrict a specific PMI$_H$.

TABLE 6

| Horizontal | Vertical | | | |
| --- | --- | --- | --- | --- |
| | PMI$_V$(0) | PMI$_V$(1) | PMI$_V$(2) | PMI$_V$(3) |
| PMI$_H$(0) | ○ | ○ | ○ | ○ |
| PMI$_H$(1) | ○ | ○ | ○ | ○ |
| PMI$_H$(2) | ○ | ○ | ○ | ○ |
| PMI$_H$(3) | X | X | X | X |
| PMI$_H$(4) | ○ | ○ | ○ | ○ |
| PMI$_H$(5) | ○ | ○ | ○ | ○ |
| PMI$_H$(6) | ○ | ○ | ○ | ○ |
| PMI$_H$(7) | ○ | ○ | ○ | ○ |
| PMI$_H$(8) | ○ | ○ | ○ | ○ |
| PMI$_H$(9) | ○ | ○ | ○ | ○ |
| PMI$_H$(10) | ○ | ○ | ○ | ○ |
| PMI$_H$(11) | ○ | ○ | ○ | ○ |
| PMI$_H$(12) | ○ | ○ | ○ | ○ |
| PMI$_H$(13) | ○ | ○ | ○ | ○ |
| PMI$_H$(14) | ○ | ○ | ○ | ○ |
| PMI$_H$(15) | ○ | ○ | ○ | ○ |

As shown in Table 6, in method 2 for restricting available types of precodings of a closed-loop MIMO system according to a precoding of an open-loop MIMO system, an eNB configures not to use a specific PMI$_H$, and does not consider each PMI$_V$ when deriving a CQI$_{HV}$ for a specific PMI$_H$. According to an embodiment, a PMI$_H$ which is not to be used may be variously determined.

Accordingly, according to an embodiment, since such a pre-definition is shared between a UE and an eNB through standards, or only a specific PMI$_H$ which is to be excluded at the time of receiving through a signal transmission between the UE and the eNB is shared or transferred, unlike method 1 for restricting available types of precodings of a closed-loop MIMO system according to a precoding of an open-loop MIMO system, restriction is possible even using a relatively smaller downlink control resource. But, it is not possible to configure a PMI$_H$ and a PMI$_V$ in more detail compared with method 1 for restricting available types of precodings of a closed-loop MIMO system according to a precoding of an open-loop MIMO system. Thus, it may be relatively unfavorable to optimize each performance. In addition, the embodiment restricts just one PMI$_H$, but if necessary, it is possible to restrict a plurality of PMI$_H$s.

Table 7 below indicates how to restrict a specific PMI$_V$ according to method 3 for restricting available types of precodings of a closed-loop MIMO system according to a precoding of an open-loop MIMO system.

More particularly, Table 7 below indicates how to restrict a specific PMI$_V$.

TABLE 7

| Horizontal | Vertical | | | |
| --- | --- | --- | --- | --- |
| | PMI$_V$(0) | PMI$_V$(1) | PMH$_V$(2) | PMI$_V$(3) |
| PMI$_H$(0) | ○ | ○ | X | ○ |
| PMI$_H$(1) | ○ | ○ | X | ○ |
| PMI$_H$(2) | ○ | ○ | X | ○ |
| PMI$_H$(3) | ○ | ○ | X | ○ |
| PMI$_H$(4) | ○ | ○ | X | ○ |
| PMI$_H$(5) | ○ | ○ | X | ○ |
| PMI$_H$(6) | ○ | ○ | X | ○ |
| PMI$_H$(7) | ○ | ○ | X | ○ |
| PMI$_H$(8) | ○ | ○ | X | ○ |
| PMI$_H$(9) | ○ | ○ | X | ○ |
| PMI$_H$(10) | ○ | ○ | X | ○ |
| PMI$_H$(11) | ○ | ○ | X | ○ |
| PMI$_H$(12) | ○ | ○ | X | ○ |
| PMI$_H$(13) | ○ | ○ | X | ○ |
| PMI$_H$(14) | ○ | ○ | X | ○ |
| PMI$_H$(15) | ○ | ○ | X | ○ |

As shown in Table 7, in method 3 for restricting available types of precodings of a closed-loop MIMO system according to a precoding of an open-loop MIMO system, an eNB configures not to use a specific PMI$_V$, and does not consider each PMI$_H$ when deriving a CQI$_{HV}$ for a specific PMI$_H$. According to an embodiment, a PMI$_V$ which is not to be used may be variously determined.

Accordingly, in the pre-definition, since PMI information which is not to be used is shared between a UE and an eNB through standards, or only a specific PMI$_V$ which is to be excluded at the time of receiving through a signal transmission between the UE and the eNB is shared or transferred, unlike method 1 for restricting available types of precodings of a closed-loop MIMO system according to a precoding of an open-loop MIMO system, restriction is possible even using a relatively smaller downlink control resource. But, it may be difficult to configure a PMI$_H$ and a PMI$_V$ in more detail compared with method 1 for restricting available types of precodings of a closed-loop MIMO system according to a precoding of an open-loop MIMO system. In addition, the embodiment restricts just for one PMI$_V$ but, if necessary, it is possible to restrict for a plurality of PMI$_V$s.

According to a situation, at least one method among methods 1, 2, and 3 for restricting a precoding of a closed-loop MIMO system according to a precoding of an open-loop MIMO system may be applied at the same time. It may be assumed that a precoding restriction as shown in table 4 is defined through standards, by method 1 for restricting a precoding of a closed-loop MIMO system according to a precoding of an open-loop MIMO system. At this time, when assuming that a precoding restriction signal as shown in Table 7 using method 3 for restricting a precoding of a closed-loop MIMO system according to a precoding of an open-loop MIMO system is received through at least one of a RRC, a L1 signaling, and a downlink control signal, a precoding restriction of a closed-loop MIMO system according to a precoding of an open-loop MIMO system, which is recognized by a UE and an eNB, is described in Table 8 below.

More particularly, Table 8 below indicates an example of a method for restricting a precoding by combining methods 1 and 3 for restricting a precoding of a closed-loop MIMO system according to a precoding of an open-loop MIMO system.

TABLE 8

| Horizontal | Vertical | | | |
|---|---|---|---|---|
| | $PMI_V(0)$ | $PMI_V(1)$ | $PMI_V(2)$ | $PMI_V(3)$ |
| $PMI_H(0)$ | O | X | X | X |
| $PMI_H(1)$ | X | O | X | X |
| $PMI_H(2)$ | X | O | X | O |
| $PMI_H(3)$ | O | O | X | X |
| $PMI_H(4)$ | O | X | X | X |
| $PMI_H(5)$ | X | X | X | O |
| $PMI_H(6)$ | O | X | X | O |
| $PMI_H(7)$ | O | O | X | O |
| $PMI_H(8)$ | X | X | X | O |
| $PMI_H(9)$ | X | X | X | O |
| $PMI_H(10)$ | O | O | X | X |
| $PMI_H(11)$ | X | O | X | X |
| $PMI_H(12)$ | O | X | X | O |
| $PMI_H(13)$ | O | O | X | X |
| $PMI_H(14)$ | X | O | X | O |
| $PMI_H(15)$ | O | O | X | O |

As shown in Table 8, each of a $PMI_H$ and a $PMI_V$ is not considered for a specific $PMI_V$ additionally received as well as Table 5, at the time of obtaining an optimal precoding and deriving a $CQI_{HV}$, by considering both methods 1 and 3 for restricting available types of precodings of a closed-loop MIMO system according to a precoding of an open-loop MIMO system. According to an embodiment, a precoding combination which is not to be considered may be variously determined.

In this scheme, for a $PMI_H$ and a $PMI_V$ configured in detail in method 1 for restricting available types of precodings of a closed-loop MIMO system according to a precoding of an open-loop MIMO system, a $PMI_H$ or a $PMI_V$ which are to be excluded when additionally calculating a $CQI_{HV}$ according to a channel state between a UE and an eNB may be configured.

Figure 20:
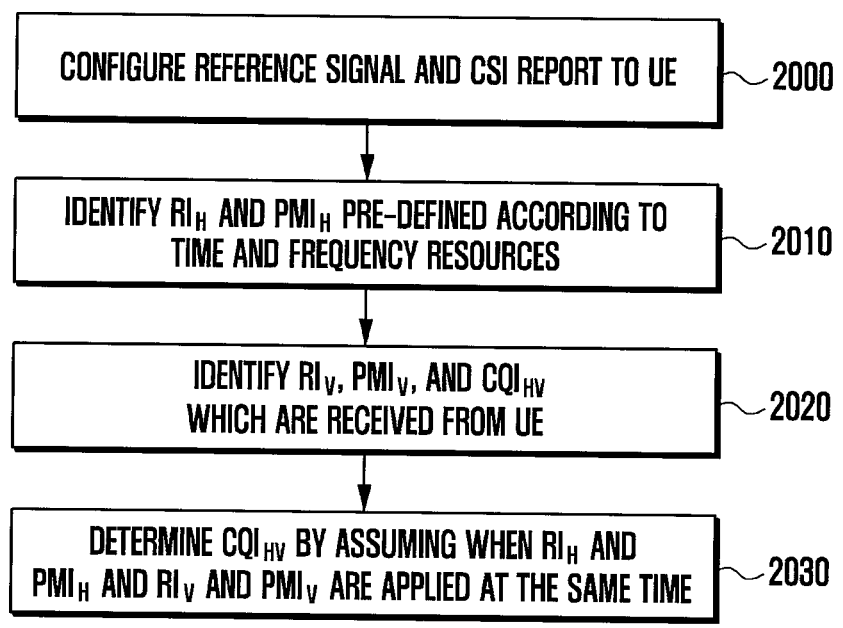
FIG. 20 illustrates an operation of an eNB using method 1 for defining one precoding according to a resource, according to an embodiment of the present disclosure.

FIG. 20 illustrates an operation of an eNB using method 1 for defining one precoding according to a resource, according to an embodiment of the present disclosure.

Referring to FIG. 20, in step 2000, an eNB transmits, to a UE, at least one of a reference signal and configuration information related to a channel information report.

In step 2010, an eNB may identify the precoding which is a precoding corresponding to an $RI_H$ and a $PMI_H$ pre-defined according to time and frequency resources in which a UE will receive a CSI-RS. According to an embodiment, step 2010 may be identified by the eNB, without a separate operation, on the basis of pre-configured information.

In step 2020, the eNB receives an $RI_V$ which is a rank of a channel obtained by measuring a vertical CSI-RS (V-CSI-RS) or a channel obtained by applying a horizontal precoding pre-defined to a 2D-CSI-RS received from the UE and identifies rank of a corresponding channel, and identifies by receiving a $PMI_V$ and a $CQI_{HV}$.

In step 2030, an eNB determines a maximum data transmission rate $CQI_{HV}$ derived by assuming a pre-defined $RI_H$ and $PMI_H$ and a received $RI_V$ and $PMI_V$ at the same time, transmits a control signal to a UE, according to the determination. In an embodiment, the eNB may determine a $CQI_{HV}$ based on at least one piece of information transmitted in step 2000. In addition, the eNB may transmit/receive a data signal with a UE, according to the determination.

Figure 21:
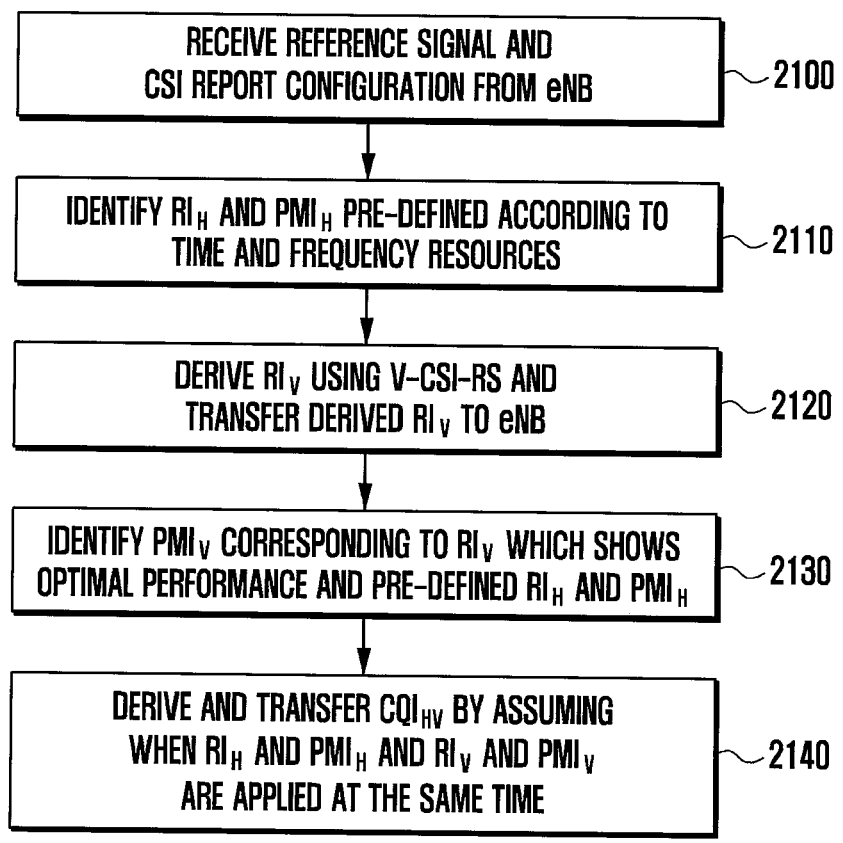
FIG. 21 illustrates an operation of a UE using method 1 for defining one precoding according to a resource, according to an embodiment of the present disclosure.

FIG. 21 illustrates an operation of a UE using method 1 for defining one precoding according to a resource, according to an embodiment of the present disclosure.

Referring to FIG. 21, in step 2100, a UE may receive, from an eNB, at least one of a reference signal and configuration information related to a channel information report.

In step 2110, a UE identifies the precoding which is a precoding corresponding to an $RI_H$ and a $PMI_H$ pre-defined according to time and frequency resources in which a CSI-RS will be received. According to an embodiment, step 2110 may be identified by the UE, without a separate operation, on the basis of pre-configured information.

In step 2120, a UE obtains a rank of a channel obtained by measuring a vertical CSI-RS (V-CSI-RS) or a channel obtained by applying a pre-defined horizontal precoding to 2D-CSI-RS, and notifies of the obtained rank to an eNB through an $RI_M$.

In step 2130, after notification of $RI_V$, in order to determine an optimal precoding, the UE may simultaneously assume a pre-defined $RI_H$ and $PMI_H$ and a derived $RI_V$ and determine an optimal precoding.

In step 2140, the UE obtains a maximum data transmission rate corresponding to the determined optimal precoding, and transfers the maximum data transmission rate to the eNB through a $PMI_V$ and a $CQI_{HV}$.

After, the UE may receive data, from the eNB, based on information transferred to the eNB.

Figure 22:
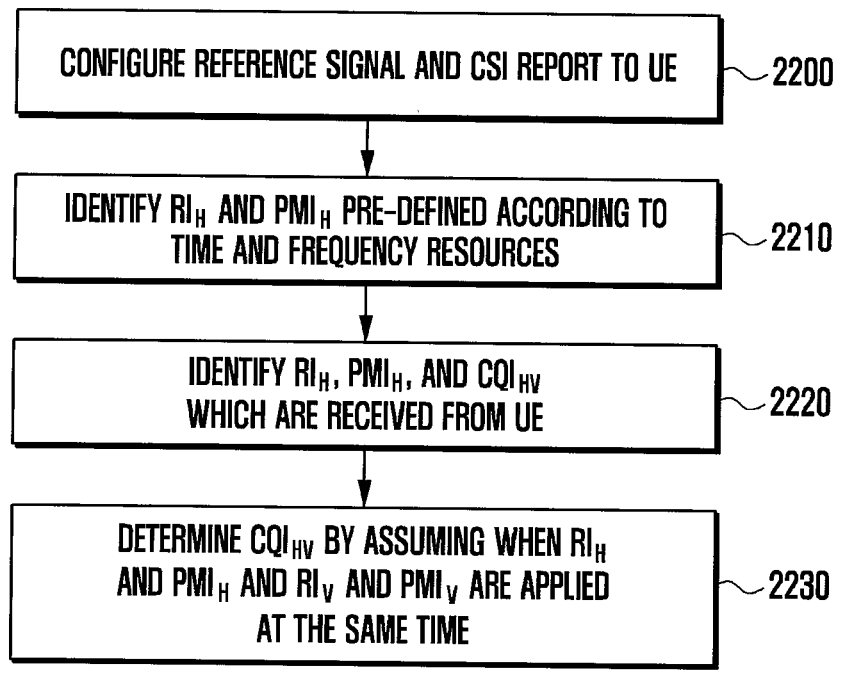
FIG. 22 illustrates an operation of an eNB using method 2 for defining one precoding according to a resource, according to an embodiment of the present disclosure.

FIG. 22 illustrates an operation of an eNB using method 2 for defining one precoding according to a resource, according to an embodiment of the present disclosure.

Referring to FIG. 22, in step 2200, an eNB notifies, to a UE, of at least one of a reference signal and configuration information related to a channel information report.

In step 2210, the eNB may identify the precoding which is a precoding corresponding to an $RI_V$ and a $PMI_V$ pre-defined according to time and frequency resources in which the UE will receive a CSI-RS. According to an embodiment, step 2210 may be identified by the eNB, without a separate operation, on the basis of pre-configured information.

In step 2220, the eNB receives an $RI_H$ which is a rank of a channel obtained by measuring a horizontal CSI-RS (H-CSI-RS) or a channel obtained by applying a vertical precoding pre-defined to a 2D-CSI-RS received from the UE and identifies rank of a corresponding channel, and identifies by receiving a $PMI_H$ and a $CQI_{HV}$.

In step 2230, the eNB determines a maximum data transmission rate $CQI_{HV}$ derived by assuming a pre-defined $RI_V$ and $PMI_V$ and a received $RI_H$ and $PMI_H$ at the same time, transmits a control signal to the UE, according to the determination. In an embodiment, the eNB may determine a $CQI_{HV}$ by additionally considering at least one piece of information transmitted in step 2200. In addition, the eNB may transmit/receive a data signal with a UE, according to the determination.

Figure 23:
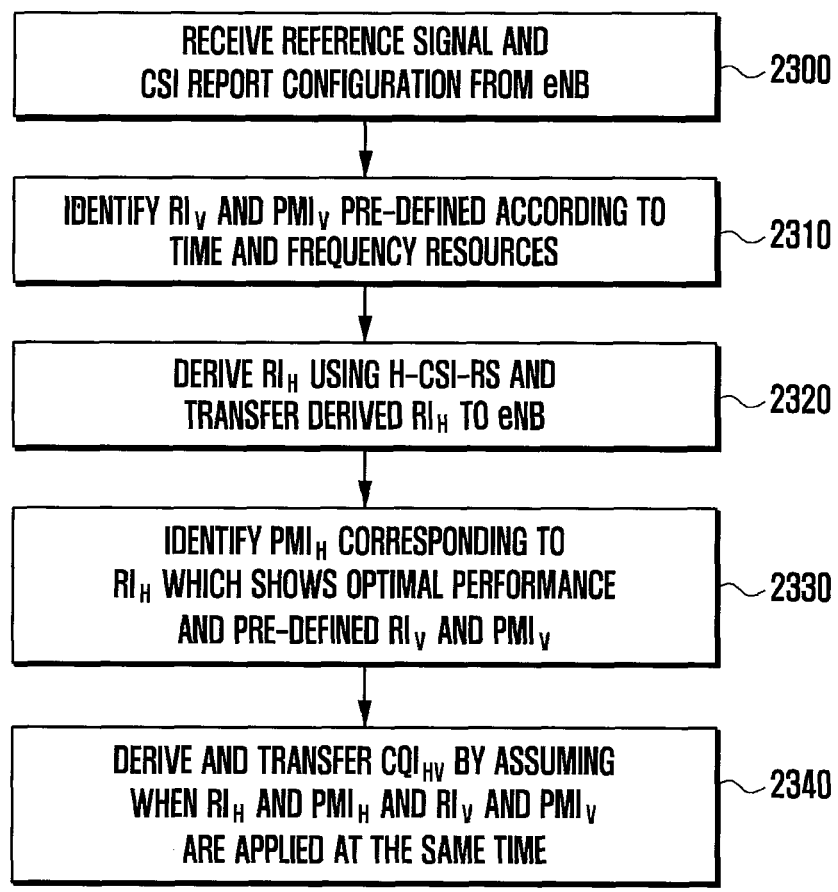
FIG. 23 illustrates an operation of a UE using method 2 for defining one precoding according to a resource, according to an embodiment of the present disclosure.

FIG. 23 illustrates an operation of a UE using method 2 for defining one precoding according to a resource, according to an embodiment of the present disclosure.

Referring to FIG. 23, in step 2300, a UE may receive, from an eNB, at least one of a reference signal and configuration information related to a channel information report.

In step 2310, a UE identifies the precoding which is a precoding corresponding to an RIV and a $PMI_V$ pre-defined according to time and frequency resources in which a CSI-RS will be received. According to an embodiment, step 2310 may be identified by the UE, without a separate operation, on the basis of pre-configured information.

In step 2320, the UE obtains a rank of a channel obtained by measuring a horizontal CSI-RS (H-CSI-RS) or a channel obtained by applying a pre-defined vertical precoding to 2D-CSI-RS, and notifies of the obtained rank to an eNB through a $RI_H$.

In step 2330, after notification of $RI_H$, in order to determine an optimal precoding, the UE may simultaneously assume a pre-defined $RI_V$ and $PMI_V$ and a derived $RI_V$ and determine an optimal precoding.

In step 2340, the UE obtains a maximum data transmission rate corresponding to the determined optimal precoding, and transfers the maximum data transmission rate to the eNB through a $PMI_H$ and a $CQI_{HV}$.

After, the UE may receive data, from the eNB, based on information transferred to the eNB.

Figure 24:
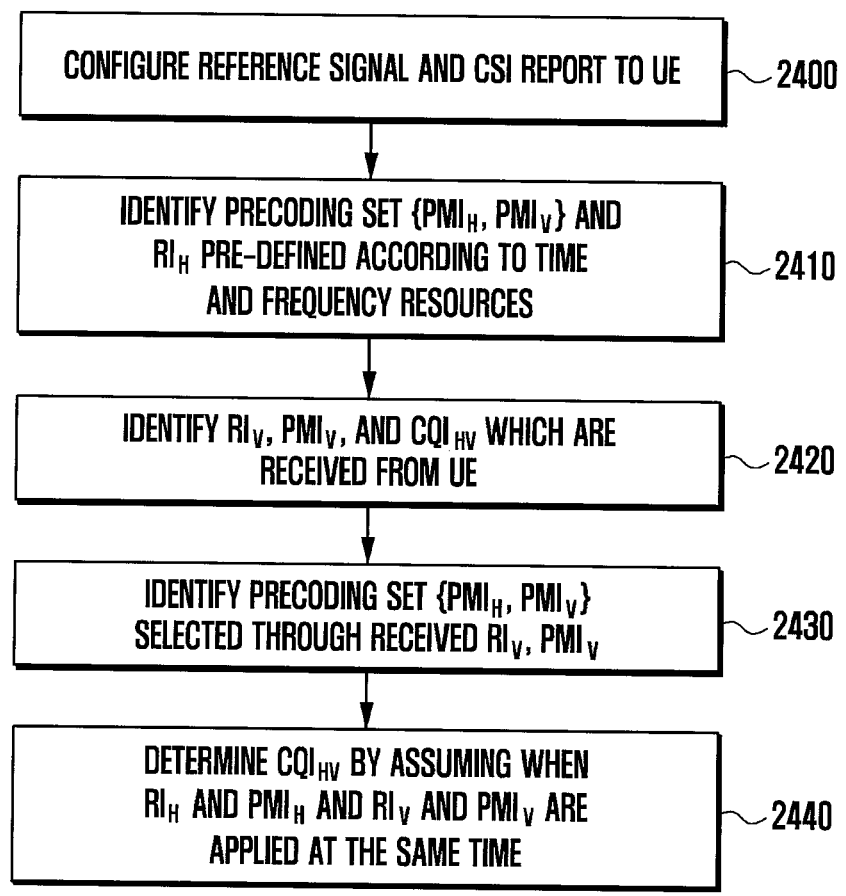
FIG. 24 illustrates an operation of an eNB using method 1 for defining a precoding set according to a resource, according to an embodiment of the present disclosure.

FIG. 24 illustrates an operation of an eNB using method 1 for defining a precoding set according to a resource, according to an embodiment of the present disclosure.

Referring to FIG. 24, in step 2400, an eNB notifies, to a UE, at least one of a reference signal and configuration information related to a channel information report.

In step 2410, the eNB may identify a corresponding precoding set $\{PMI_H, PMI_V\}$ and a $RI_H$ pre-defined according to time and frequency resources in which the UE will receive a CSI-RS. According to an embodiment, step 2410 may be identified by the eNB, without a separate operation, on the basis of pre-configured information.

In step 2420, the eNB receives an $RI_V$ which is a rank of a channel obtained by measuring a vertical CSI-RS (V-CSI-RS) or a channel obtained by applying a horizontal precoding pre-defined to a 2D-CSI-RS received from the UE and identifies the rank of a corresponding channel, and identifies by receiving a $PMI_V$ and a $CQI_{HV}$.

In step 2430, the eNB identifies a pre-defined precoding set $\{PMI_H, PMI_V\}$ corresponding a received $RI_V$ and to a pre-defined $RI_H$ through a received $PMI_V$.

In step 2440, the eNB determines a maximum data transmission rate $CQI_{HV}$ derived by assuming at least one among an $RI_H$, a $PMI_H$, an $RI_V$, and a $PMI_V$ at the same time, transmits a control signal to the UE, according to the determination. In an embodiment, the eNB may determine a $CQI_{HV}$ by additionally considering at least one piece of information transmitted in step 2400. In addition, the eNB may transmit/receive a data signal with a UE, according to the determination.

Figure 25:
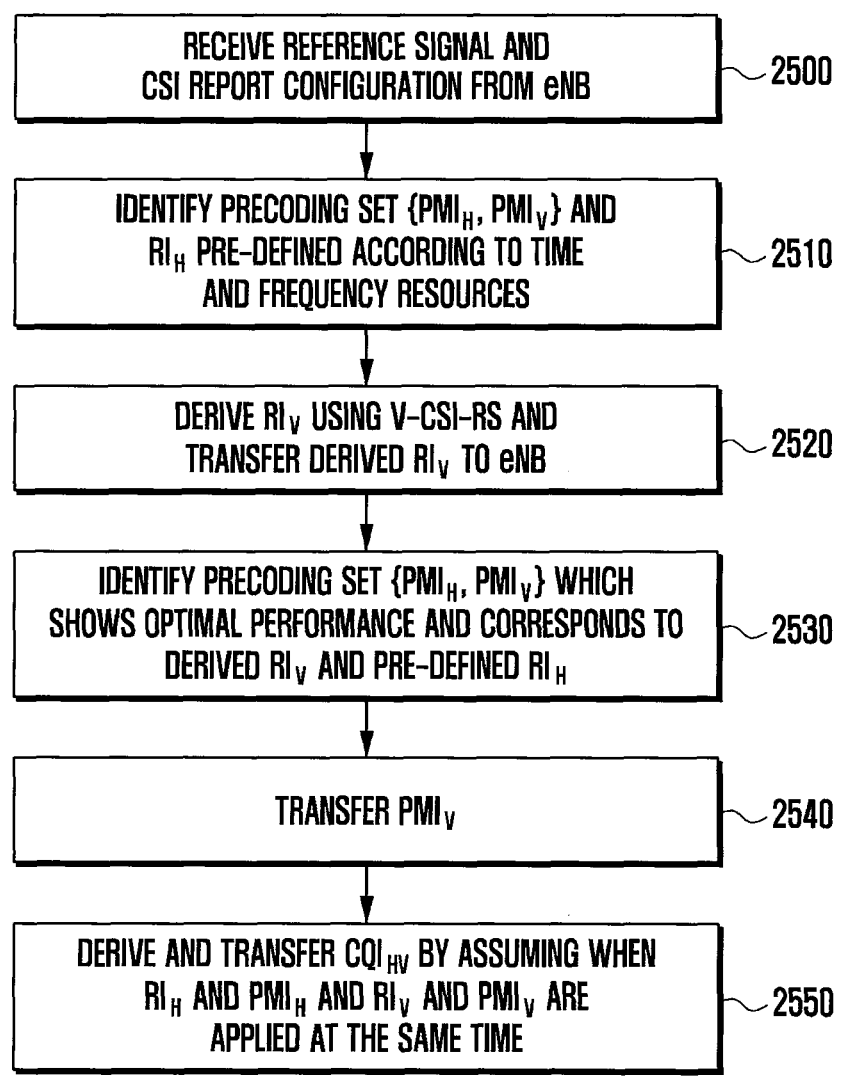
FIG. 25 illustrates an operation of a UE using method 1 for defining a precoding set according to a resource, according to an embodiment of the present disclosure.

FIG. 25 illustrates an operation of a UE using method 1 for defining a precoding set according to a resource, according to an embodiment of the present disclosure.

Referring to FIG. 25, in step 2500, a UE may receive, from an eNB, at least one of a reference signal and configuration information related to a channel information report.

In step 2510, the eNB may identify a corresponding precoding set $\{PMI_H, PMI_V\}$ and an $RI_H$ pre-defined according to time and frequency resources in which a CSI-RS will be received. According to an embodiment, step 2510 may be identified by the UE, without a separate operation, on the basis of pre-configured information.

In step 2520, the UE obtains a rank of a channel obtained by measuring a vertical CSI-RS (V-CSI-RS) or a channel obtained by applying a pre-defined horizontal precoding to 2D-CSI-RS, and notifies of the obtained rank to an eNB through an $RI_V$.

In step 2530, after notification of $RI_V$, in order to determine an optimal precoding, the UE may assume a pre-defined precoding set $\{PMI_H, PMI_V\}$ corresponding to a derived $RI_V$ and a pre-defined $RI_H$ and determine an optimal precoding.

In step 2540, the UE may transfer, to an eNB, a value corresponding to a $PMI_V$ of the optimal precoding set determined as described above.

In step 2550, the UE may obtain a maximum data transmission rate corresponding to the $PMI_V$ and transfer the maximum data transmission rate to the eNB through a $CQI_{HV}$.

After, the UE may receive data, from the eNB, based on information transferred to the eNB.

Figure 26:
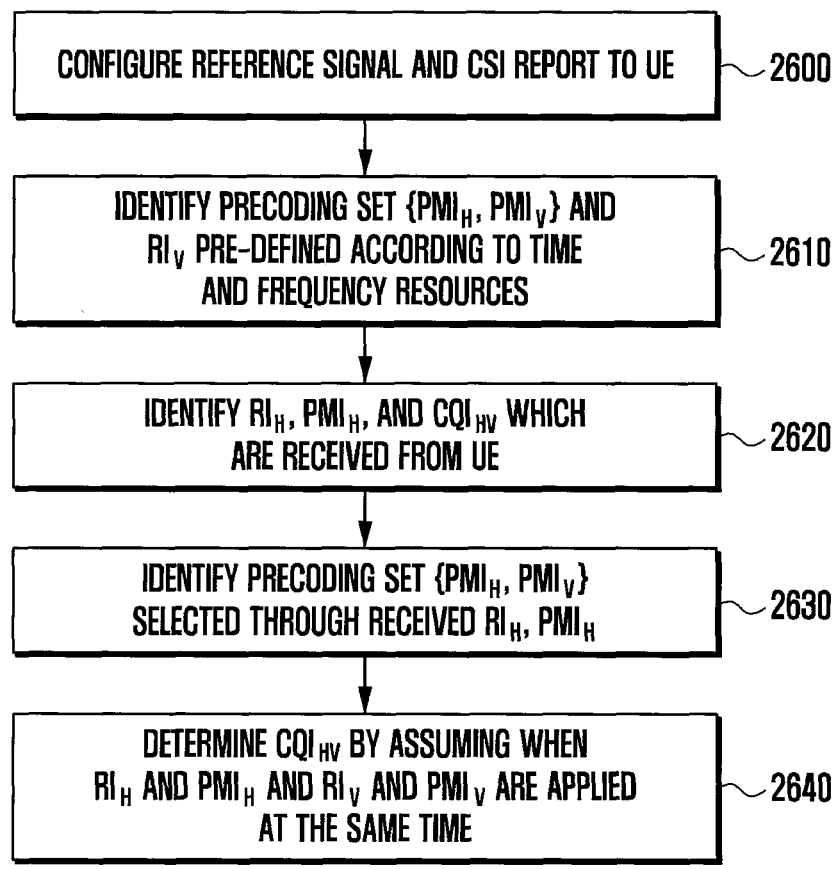
FIG. 26 illustrates an operation of an eNB using method 2 for defining a precoding set according to a resource, according to an embodiment of the present disclosure.

FIG. 26 illustrates an operation of an eNB using method 2 for defining a precoding set according to a resource, according to an embodiment of the present disclosure.

Referring to FIG. 26, in step 2600, an eNB notifies, to a UE, of at least one of a reference signal and configuration information related to a channel information report.

In step 2610, the eNB may identify a corresponding precoding set $\{PMI_H, PMI_V\}$ and an RIV pre-defined according to time and frequency resources in which the UE will receive a CSI-RS. According to an embodiment, step 2610 may be identified by the eNB, without a separate operation, on the basis of pre-configured information.

In step 2620, the eNB receives an $RI_H$ which is a rank of a channel obtained by measuring a horizontal CSI-RS (H-CSI-RS) or a channel obtained by applying a vertical precoding pre-defined to a 2D-CSI-RS received from the UE and identifies rank of a corresponding channel, and identifies by receiving a $PMI_H$ and a $CQI_{HV}$.

In step 2630, the eNB identifies a pre-defined precoding set $\{PMI_H, PMI_V\}$ corresponding to a received $RI_H$ and a pre-defined $RI_V$ through a received $PMI_V$.

In step 2640, the eNB determines a maximum data transmission rate $CQI_{HV}$ derived by assuming at least one among an $RI_H$, a $PMI_H$, an $RI_V$, and a $PMI_V$ at the same time, transmits a control signal to the UE, according to the determination. In an embodiment, the eNB may determine a $CQI_{HV}$ by additionally considering at least one piece of information transmitted in step 2600. In addition, the eNB may transmit/receive a data signal with a UE, according to the determination.

Figure 27:
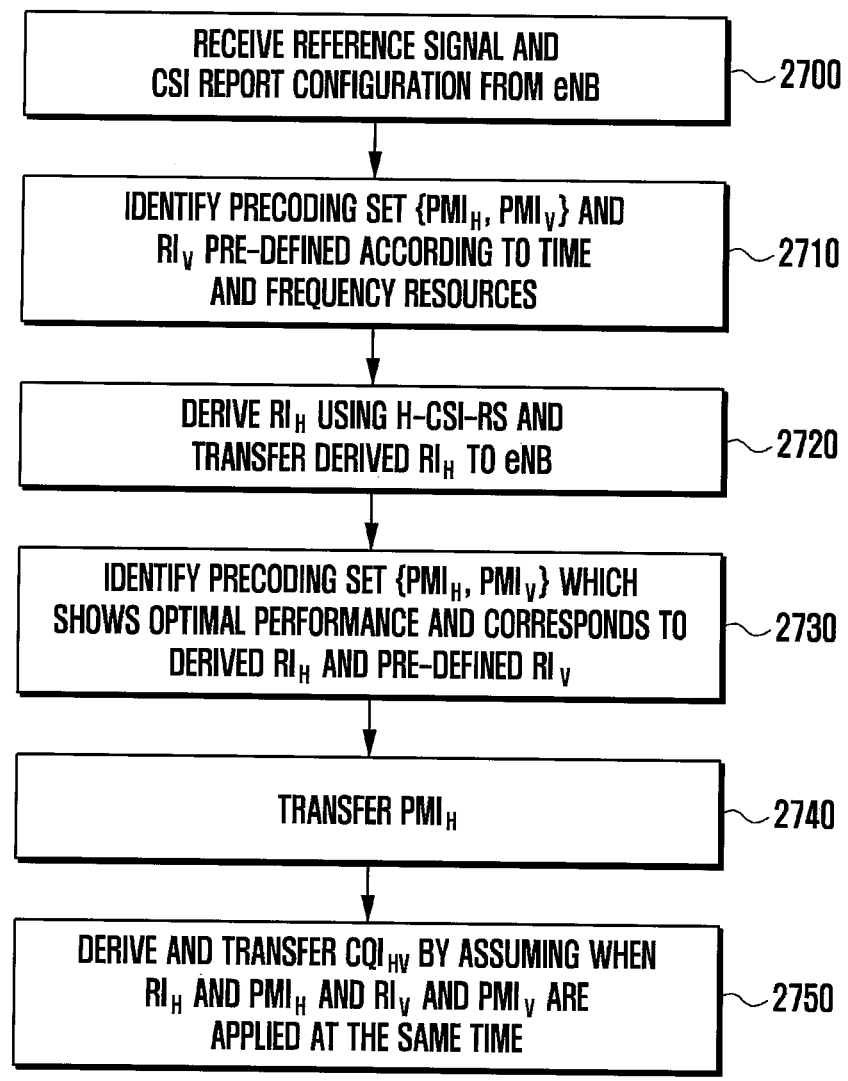
FIG. 27 illustrates an operation of a UE using method 2 for defining a precoding set according to a resource, according to an embodiment of the present disclosure.

FIG. 27 illustrates an operation of a UE using method 2 for defining a precoding set according to a resource, according to an embodiment of the present disclosure.

Referring to FIG. 27, in step 2700, a UE may receive, from an eNB, at least one of a reference signal and configuration information related to a channel information report.

In step 2710, the UE may identify a corresponding precoding set {$PMI_H$, $PMI_V$} and an $RI_V$ pre-defined according to time and frequency resources in which a CSI-RS will be received or a channel obtained by applying a pre-defined vertical precoding to 2D-CSI-RS. According to an embodiment, step 2710 may be identified by the UE, without a separate operation, on the basis of pre-configured information.

In step 2720, the UE obtains a rank of a channel obtained by measuring a horizontal CSI-RS (H-CSI-RS) or a channel obtained by applying a pre-defined vertical precoding to 2D-CSI-RS, and notifies of the obtained rank to an eNB through a $RI_H$.

In step 2730, after notification of $RI_V$, in order to determine an optimal precoding, the UE may assume a pre-defined precoding set {$PMI_H$, $PMI_V$} corresponding to a derived $RI_H$ and a pre-defined $RI_V$ and determine an optimal precoding.

In step 2740, the UE may transfer, to the eNB, a value corresponding to a $PMI_H$ of the determined optimal precoding set.

In step 2750, the UE may obtain a maximum data transmission rate corresponding to the $PMI_H$ and transfer the maximum data transmission rate to the eNB through a $CQI_{HV}$.

Figure 28:
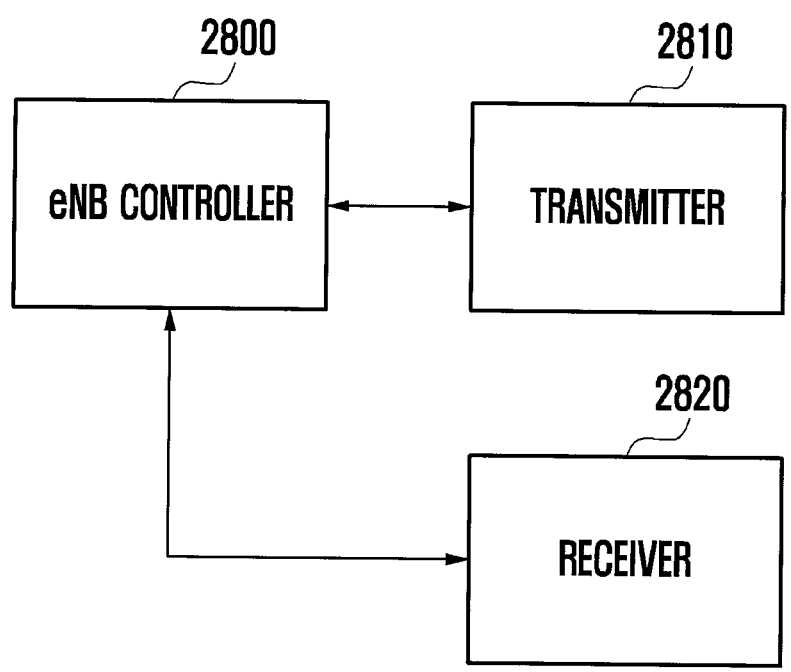
FIG. 28 illustrates an equipment drawing of an eNB in a FD-MIMO system, according to an embodiment of the present disclosure.

FIG. 28 illustrates an equipment drawing of an eNB in a FD-MIMO system, according to an embodiment of the present disclosure.

Referring to FIG. 28, an eNB according to an embodiment may include at least one of an eNB controller 2800, a transmitter 2810, and a receiver 2820. The eNB controller 2800 may control all operations of the eNB and determine a value related to an operation of the eNB, on the basis of information which is transmitted and received.

An eNB according to an embodiment may determine how to configure for a plurality of CSI-RSs or a 2D-CSI-RS, using the eNB controller 2800.

According to an embodiment, the eNB controller 2800 may notify of a signal based on the determined result to the UE by controlling a transmitter 2810.

In addition, the eNB controller 2800 may determine how to configure channel state information to be transmitted by a UE, and notify of the determined result to the UE, by controlling the transmitter 2810. In addition, the eNB controller 2800 may transmit a 2D-CSI-RS or a plurality of CSI-RSs to the UE by controlling the transmitter 2810.

In addition, in an embodiment, the eNB controller 2800 may configure a CSI-RS of a UE and channel state information, and receive channel state information notified from the UE, by controlling a receiver 2820.

Figure 29:
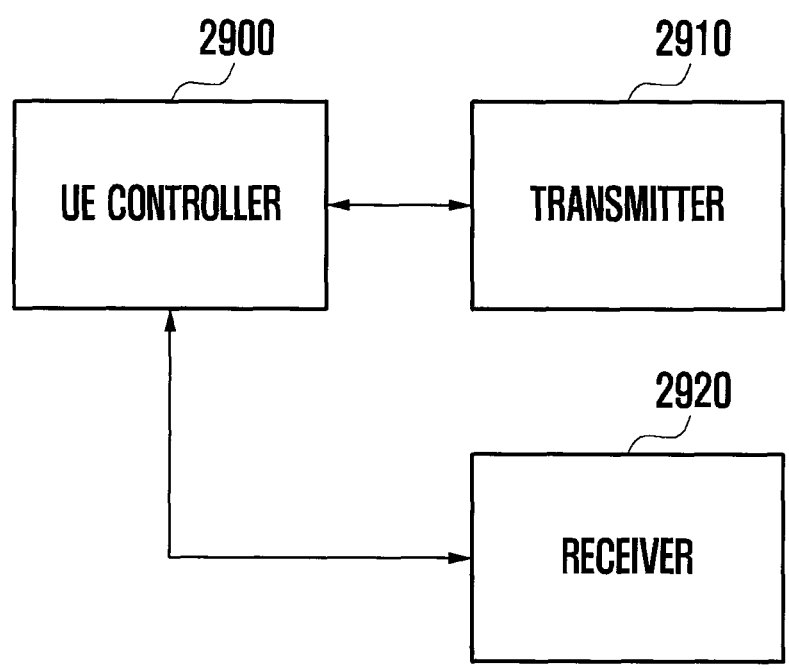
FIG. 29 illustrates an equipment drawing of a UE in a FD-MIMO system, according to an embodiment of the present disclosure.

FIG. 29 illustrates an equipment drawing of a UE in a FD-MIMO system, according to an embodiment of the present disclosure.

Referring to FIG. 29, a HE (terminal) according to an embodiment may include at least one of a UE controller 2900, a transmitter 2910, and a receiver 2920. The UE controller 2900 may control all operations of the UE and determine a value related to an operation of the UE, on the basis of information which is transmitted and received.

In an embodiment, the UE controller 2900 may receive, from the eNB, notification of at least one piece of information related to how to configure channel state information and report to an eNB and configuration information with respect to a plurality of CSI-RSs or a 2D-CSI-RS, by controlling a receiver 2920.

The UE controller 2900 may control a reception with respect to a plurality of CSI-RSs or a 2D-CSI-RS of the UE, on the basis of contents notified from an eNB.

In addition, the UE controller 2900 may receive a plurality of CSI-RSs by controlling the receiver 2920.

In addition, the UE controller 2900 may generate channel state information generated based on a plurality of received CSI-RSs, and report, to the eNB, the generated channel state information, by controlling a transmitter 2910.

Although exemplary embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments on the basis of the spirits of the present disclosure besides the embodiments disclosed herein can be carried out.

The invention claimed is:

1. A method performed by a user equipment (UE) in a wireless communication system, the method comprising:
   receiving, from a base station, information indicating a set of second precoding matrix indicators (PMIs) capable of being selected through higher layer signaling;
   obtaining a first PMI based on receiving a channel state information reference signal (CSI-RS), wherein each of one or more precoders associated with the first PMI corresponds to each of one or more second PMIs associated with the first PMI;
   obtaining a channel quality indicator (CQI) based on a precoder corresponding to the obtained first PMI and a selected second PMI of the one or more second PMIs; and
   transmitting, to the base station, the CQI and the obtained first PMI without transmitting any of the one or more second PMIs.

2. The method of claim 1, wherein a frequency region corresponding to each of the one or more precoders is configured by the higher layer signaling.

3. The method of claim 1, wherein a rank indicator (RI) is transmitted.

4. The method of claim 1, wherein the first PMI and the CQI are transmitted on an uplink control channel.

5. A method performed by a base station in a wireless communication system, the method comprising:
   transmitting, to a user equipment (UE), information indicating a set of second precoding matrix indicators (PMIs) capable of being selected through higher layer signaling;
   transmitting a channel state information reference signal (CSI-RS); and
   receiving, from the UE, a first PMI and a channel quality indicator (CQI) without receiving any of one or more of the set of second PMIs,
   wherein each of one or more precoders associated with the first PMI corresponds to each of the one or more second PMIs associated with the first PMI, and
   wherein the CQI is based on a precoder corresponding to the first PMI and a second PMI of the one or more second PMIs.

6. The method of claim 5, wherein a frequency region corresponding to each of the one or more precoders is configured by the higher layer signaling.

7. The method of claim 5, wherein a rank indicator (RI) is received.

8. The method of claim 5, wherein the first PMI and the CQI are received on an uplink control channel.

9. A user equipment (UE) in a wireless communication system, the UE comprising:
a transceiver; and
a processor coupled with the transceiver and configured to:
receive, from a base station, information indicating a set of second precoding matrix indicators (PMIs) capable of being selected through higher layer signaling,
obtain a first PMI based on receiving a channel state information reference signal (CSI-RS), wherein each of one or more precoders associated with the first PMI corresponds to each of one or more second PMIs associated with the first PMI,
obtain a channel quality indicator (CQI) based on a precoder corresponding to the obtained first PMI and a selected second PMI of the one or more second PMIs, and
transmit, to the base station, the CQI and the obtained first PMI without transmitting any of the one or more second PMIs.

10. The UE of claim 9, wherein a frequency region corresponding to each of the one or more precoders is configured by the higher layer signaling.

11. The UE of claim 9, wherein a rank indicator (RI) is transmitted.

12. The UE of claim 9, wherein the first PMI and the CQI are transmitted on an uplink control channel.

13. A base station in a wireless communication system, the base station comprising:
a transceiver; and
a processor coupled with the transceiver and configured to:
transmit, to a user equipment (UE), information indicating a set of second precoding matrix indicators (PMIs) capable of being selected through higher layer signaling,
transmit a channel state information reference signal (CSI-RS), and
receive, from the UE, a first PMI and a channel quality indicator (CQI) without receiving any of one or more of the set of second PMIs,
wherein each of one or more precoders associated with the first PMI corresponds to each of the one or more second PMIs associated with the first PMI, and
wherein the CQI is based on a precoder corresponding to the first PMI and a second PMI of the one or more second PMIs.

14. The base station of claim 13, wherein a frequency region corresponding to each of the one or more precoders is configured by the higher layer signaling.

15. The base station of claim 13, wherein a rank indicator (RI) is received.

16. The base station of claim 13, wherein the first PMI and the CQI are received on an uplink control channel.

* * * * *